(12) United States Patent
Rehal

(10) Patent No.: US 11,409,764 B2
(45) Date of Patent: Aug. 9, 2022

(54) SYSTEM FOR DATA MANAGEMENT IN A LARGE SCALE DATA REPOSITORY

(71) Applicant: Hitachi Vantara LLC, Santa Clara, CA (US)

(72) Inventor: Daljit Rehal, Coulsdon (GB)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 16/895,496

(22) Filed: Jun. 8, 2020

(65) Prior Publication Data

US 2020/0301945 A1 Sep. 24, 2020

Related U.S. Application Data

(63) Continuation of application No. 15/704,553, filed on Sep. 14, 2017, now Pat. No. 10,678,810.

(30) Foreign Application Priority Data

Sep. 15, 2016 (GB) ........................... 1615747

(51) Int. Cl.
*G06F 16/27* (2019.01)
*G06F 16/28* (2019.01)
(Continued)

(52) U.S. Cl.
CPC ............ *G06F 16/27* (2019.01); *G06F 16/213* (2019.01); *G06F 16/2423* (2019.01);
(Continued)

(58) Field of Classification Search
CPC .. G06F 16/27; G06F 16/24573; G06F 16/907; G06F 16/2428; G06F 16/288; G06F 16/213; G06F 16/2423; G06F 16/254
See application file for complete search history.

(56) References Cited

U.S. PATENT DOCUMENTS

| 5,970,490 A | 10/1999 | Morgenstern |
| 6,044,374 A | 3/2000 | Nesamoney et al. |

(Continued)

FOREIGN PATENT DOCUMENTS

| EP | 2 916 246 A1 | 9/2015 |
| EP | 2 975 535 A1 | 1/2016 |
| JP | 2008511928 A | 4/2008 |

OTHER PUBLICATIONS

The International Search Report and Written Opinion, PCT/GB2017/052713, dated Nov. 28, 2017, 14 pages.

(Continued)

*Primary Examiner* — James Trujillo
*Assistant Examiner* — Michal Bogacki
(74) *Attorney, Agent, or Firm* — Matthingly & Malur, PC

(57) ABSTRACT

A computer-implemented method of managing data in a data repository is disclosed. The method comprises maintaining a data repository, the data repository storing data imported from one or more data sources. A database entity added to the data repository is identified and a metadata object for storing metadata relating to the database entity is created and stored in a metadata repository. The metadata object is also added to a documentation queue. Metadata for the metadata object is received from user via a metadata management user interface and the received metadata is stored in the metadata repository and associated with the metadata object.

15 Claims, 36 Drawing Sheets

(51) Int. Cl.
*G06F 16/907* (2019.01)
*G06F 16/242* (2019.01)
*G06F 16/2457* (2019.01)
*G06F 16/25* (2019.01)
*G06F 16/21* (2019.01)

(52) U.S. Cl.
CPC .... *G06F 16/2428* (2019.01); *G06F 16/24573* (2019.01); *G06F 16/254* (2019.01); *G06F 16/288* (2019.01); *G06F 16/907* (2019.01)

(56) References Cited

U.S. PATENT DOCUMENTS

| | | |
|---|---|---|
| 6,535,868 B1 | 3/2003 | Galeazzi et al. |
| 6,697,808 B1 | 2/2004 | Hurwood et al. |
| 6,957,225 B1 | 10/2005 | Zait et al. |
| 7,013,310 B2 | 3/2006 | Messing et al. |
| 7,373,350 B1 | 5/2008 | Arone et al. |
| 7,389,314 B2 | 6/2008 | Kulkarni et al. |
| 7,647,293 B2 | 1/2010 | Brown et al. |
| 7,702,636 B1 | 4/2010 | Sholtis et al. |
| 7,774,378 B2 | 8/2010 | Nelson |
| 7,792,857 B1 | 9/2010 | Brette et al. |
| 8,135,691 B2 | 3/2012 | Majd et al. |
| 8,176,002 B2 | 5/2012 | Murphy et al. |
| 8,200,613 B1 | 6/2012 | Wan et al. |
| 8,768,967 B2 | 7/2014 | Abrams et al. |
| 9,031,901 B1 | 5/2015 | King et al. |
| 2004/0243458 A1 | 12/2004 | Barkan |
| 2005/0071359 A1 | 3/2005 | Elandassery et al. |
| 2006/0195492 A1 | 8/2006 | Clark et al. |
| 2007/0156792 A1 | 7/2007 | D'Souza et al. |
| 2007/0174308 A1 | 7/2007 | Rausch |
| 2007/0214179 A1 | 9/2007 | Hoang |
| 2007/0282784 A1 | 12/2007 | Modani et al. |
| 2008/0140696 A1 | 6/2008 | Mathuria |
| 2008/0222192 A1 | 9/2008 | Hughes |
| 2009/0106242 A1 | 4/2009 | McGrew |
| 2011/0196864 A1 | 8/2011 | Mason et al. |
| 2012/0254103 A1 | 10/2012 | Cottle et al. |
| 2012/0303575 A1 | 11/2012 | Crolene et al. |
| 2012/0330971 A1 | 12/2012 | Thomas et al. |
| 2013/0036117 A1 | 2/2013 | Fisher et al. |
| 2013/0086104 A1 | 4/2013 | Morrison et al. |
| 2013/0151491 A1 | 6/2013 | Gislason |
| 2013/0166472 A1 | 6/2013 | Brunswig et al. |
| 2013/0218899 A1 | 8/2013 | Raghavan et al. |
| 2013/0226940 A1 | 8/2013 | Gorelik et al. |
| 2014/0032617 A1 | 1/2014 | Stanfill |
| 2014/0280151 A1 | 9/2014 | Micaelian |
| 2015/0169675 A1 | 6/2015 | Said et al. |
| 2015/0271267 A1 | 9/2015 | Solis et al. |
| 2015/0339324 A1 | 11/2015 | Westmoreland et al. |
| 2016/0253340 A1 | 1/2016 | Barth et al. |
| 2016/0034478 A1 | 2/2016 | Hernandez-Sherrington et al. |
| 2017/0132368 A1 | 5/2017 | Nuggehalli et al. |
| 2017/0308602 A1 | 10/2017 | Raghunathan et al. |

OTHER PUBLICATIONS

The International Search Report and Written Opinion, PCT/GB2017/052714, dated Nov. 8, 2017, 14 pages.

The International Search Report and Written Opinion, PCT/GB2017/052715, dated Dec. 14, 2017, 13 pages.

Bernstein et al., An Overview of Repository Technology, pp. 705-713, Proceedings of the 20th VLDB Conference, Santiago Chile.

Ellkvist et al., Using Provenance to Support Real-Time Collaborative Design of Workflows, pp. 266-279, Provenance and Annotation of Data and Processes, Second International Provenance and Annotation Workshop, IPAW 2008, Salt Lake City, UT, USA, Jun. 17-18, 2008.

Warehouse Builder Installation and Administration Guide—12. Importing, Exporting, an Upgrading Metadata, Oracle Database Online Documentation 11g Release 2 (11.2), pp. 1-23, https://docs.oracle.com/cd/E11882_01/owb.112/e17130/change_mgmt.htm.

"WebCenter Content Application Administrator's Guide for Content Server—2. Managing Repository Content", Oracle Fusion Middleware Online Documentation Library, 11g Release 1 (11.1.1.6), pp. 1-29, https://docs.oracle.com/cd/E11882_01/owb.112/e17130/change_mgmt.htm#WBINS16232.

European Communication Pursuant to Article 94(3) EPC, corresponding to European Application No. 17 771 844.2, dated Feb. 21, 2020, 9 pages.

Techopdeia, "Data Repository," 2019, Techopedia.com, p. 1, https://www.techopedia.com/definition/23341/data-repository, 2019.

Summons to attend Oral proceedings from corresponding European Application No. 17 771 844.2 mailed on Jan. 27, 2021.

Examination Report dated Dec. 2, 2021, issued in corresponding Indian Patent Application No. 201917014253.

Fig. 10

Table 1 (1002):

| Table 1 | A | B | C |
|---|---|---|---|
| 1 | Value 10 | Value 25 | Value 30 |
| 2 | Value 40 | Value 51 | Value 62 |
| 3 | Value 71 | Value 83 | Value 94 |

Table 2 (1004):

| Table 2 | A | B | C |
|---|---|---|---|
| 1 | Value 101 | Value 115 | Value 124 |
| 2 | Value 13 <nl> | Value 141 | Value 154 |
| 3 | Value 162 | Value 173 | Value 184 |

Map Table (1006):

| Map Table | Type | Value | Loc. | | | | |
|---|---|---|---|---|---|---|---|
| 1 | Value | V1: 0 | T1A | | | | |
| 2 | Value | V2: 5 | T1B | | | | |
| 3 | Value | V3: 0 | T1C | | | | |
| 4 | Value | V4: 0 | T1A | | | | |
| 5 | Value | V5: 1 | T1B | | | | |
| 6 | Value | V6: 2 | T1C | | | | |
| 7 | Value | V7: 1 | T1A | | | | |
| 8 | Value | V8: 3 | T1B | | | | |
| 9 | Value | V9: 4 | T1C | | | | |
| 10 | Value | V10: 1 | T2A | | | | |
| 11 | Value | V11: 5 | T2B | | | | |
| 12 | Value | V12: 4 | T2C | | | | |
| 13 | Value | V14: 1 | T2B | | | | |
| 14 | Value | V15: 4 | T2C | | | | |
| 15 | Value | V16: 2 | T2A | | | | |
| 16 | Value | V17: 3 | T2B | | | | |
| 17 | Value | V18: 4 | T2C | | | | |
| 18 | Col | T1A | Vals: 3 | Nuls: 0 | Ign: 0 | Other summary info | |
| 19 | Col | T1B | Vals: 3 | Nuls: 0 | Ign: 0 | Other summary info | |
| 20 | Col | T1C | Vals: 3 | Nuls: 0 | Ign: 0 | Other summary info | |
| 21 | Col | T2A | Vals: 2 | Nuls: 1 | Ign: 0 | Other summary info | |
| 22 | Col | T2B | Vals: 3 | Nuls: 0 | Ign: 0 | Other summary info | |
| 23 | Col | T2C | Vals: 3 | Nuls: 0 | Ign: 0 | Other summary info | |
| 24 | Table | T1 | Rows: 3 | Ign: 0 | Other summary info | | |
| 25 | Table | T2 | Rows: 3 | Ign: 0 | Other summary info | | |

Fig. 11 (Cont.)

| Agg. Table | Type | Value | Loc. | Count | | | |
|---|---|---|---|---|---|---|---|
| 1 | Value | 0 | T1A | 2 | | | |
| 2 | Value | 0 | T1C | 1 | | | |
| 3 | Value | 1 | T1A | 1 | | | |
| 4 | Value | 1 | T1B | 1 | | | |
| 5 | Value | 1 | T2A | 1 | | | |
| 6 | Value | 1 | T2B | 1 | | | |
| 7 | Value | 2 | T1C | 1 | | | |
| 8 | Value | 2 | T2A | 1 | | | |
| 9 | Value | 3 | T1B | 1 | | | |
| 10 | Value | 3 | T2B | 1 | | | |
| 11 | Value | 4 | T1C | 1 | | | |
| 12 | Value | 4 | T2C | 3 | | | |
| 13 | Value | 5 | T1B | 1 | | | |
| 14 | Value | 5 | T2B | 1 | | | |
| 15 | Col | T1A | Vals: 3 | Nuls: 0 | Ign: 0 | Other summary info | |
| 16 | Col | T1B | Vals: 3 | Nuls: 0 | Ign: 0 | Other summary info | |
| 17 | Col | T1C | Vals: 3 | Nuls: 0 | Ign: 0 | Other summary info | |
| 18 | Col | T2A | Vals: 2 | Nuls: 1 | Ign: 0 | Other summary info | |
| 19 | Col | T2B | Vals: 3 | Nuls: 0 | Ign: 0 | Other summary info | |
| 20 | Col | T2C | Vals: 3 | Nuls: 0 | Ign: 0 | Other summary info | |
| 21 | Table | T1 | Rows: 3 | Ign: 0 | Other summary info | | |
| 22 | Table | T2 | Rows: 3 | Ign: 0 | Other summary info | | |

| Agg. Table | Type | Value | Loc. | Count | | | |
|---|---|---|---|---|---|---|---|
| 1 | Value | 0 | T1A | 2 | | | 1100 |
| 2 | Value | 0 | T1C | 1 | | | |
| 3 | Value | 1 | T1A | 1 | | | |
| 4 | Value | 1 | T1B | 1 | | | |
| 5 | Value | 1 | T2A | 1 | | | |
| 6 | Value | 1 | T2B | 1 | | | |
| 7 | Value | 2 | T1C | 1 | | | |
| 8 | Value | 2 | T2A | 1 | | | |
| 9 | Value | 3 | T1B | 1 | | | |
| 10 | Value | 3 | T2B | 1 | | | |
| 11 | Value | 4 | T1C | 1 | | | |
| 12 | Value | 4 | T2C | 3 | | | |
| 13 | Value | 5 | T1B | 1 | | | |
| 14 | Value | 5 | T2B | 1 | | | |
| 15 | Col | T1A | Vals: 3 | Nuls: 0 | Ign: 0 | Other summary info | |
| 16 | Col | T1B | Vals: 3 | Nuls: 0 | Ign: 0 | Other summary info | |
| 17 | Col | T1C | Vals: 3 | Nuls: 0 | Ign: 0 | Other summary info | |
| 18 | Col | T2A | Vals: 2 | Nuls: 1 | Ign: 0 | Other summary info | |
| 19 | Col | T2B | Vals: 3 | Nuls: 0 | Ign: 0 | Other summary info | |
| 20 | Col | T2C | Vals: 3 | Nuls: 0 | Ign: 0 | Other summary info | |
| 21 | Table | T1 | Rows: 3 | Ign: 0 | Other summary info | | |
| 22 | Table | T2 | Rows: 3 | Ign: 0 | Other summary info | | |

File 1 — 1202

| | Type | Value | Loc. | Count | | | Other summary info |
|---|---|---|---|---|---|---|---|
| 1 | Value | 0 | T1A | 2 | | | |
| 2 | Value | 0 | T1C | 1 | | | |
| 3 | Value | 1 | T1A | 1 | | | |
| 4 | Value | 1 | T1B | 1 | | | |
| 5 | Value | 1 | T2A | 1 | | | |
| 6 | Value | 1 | T2B | 1 | | | |
| ... | | | | | | | |
| 22 | Table | T2 | Rows: 3 | Ign: 0 | | | Other summary info |

File 2 — 1204

| | Type | Value | Loc. | Count | | | Other summary info |
|---|---|---|---|---|---|---|---|
| 7 | Value | 2 | T1C | 1 | | | |
| 8 | Value | 2 | T2A | 1 | | | |
| 9 | Value | 3 | T1B | 1 | | | |
| 10 | Value | 3 | T2B | 1 | | | |
| 11 | Value | 4 | T1C | 1 | | | |
| 12 | Value | 4 | T2C | 3 | | | |
| 13 | Value | 5 | T1B | 1 | | | |
| 14 | Value | 5 | T2B | 1 | | | |
| ... | | | | | | | |
| 22 | Table | T2 | Rows: 3 | Ign: 0 | | | Other summary info |

| File | Type | Value | Loc. | Count | | | Other summary info |
|---|---|---|---|---|---|---|---|
| 1 | Value | 0 | T1A | 2 | | | |
| 2 | Value | 0 | T1C | 1 | | | |
| 3 | Value | 1 | T1A | 1 | | | |
| 4 | Value | 1 | T1B | 1 | | | |
| 5 | Value | 1 | T2A | 1 | | | |
| 6 | Value | 1 | T2B | 1 | | | |
| ⋮ | ⋮ | ⋮ | ⋮ | ⋮ | | | |
| 22 | Table | T2 | Rows: 3 | Ign: 0 | | | |

| File | Type | Value | Loc. | Count | | | Other summary info |
|---|---|---|---|---|---|---|---|
| 2 | | | | | | | |
| 7 | Value | 2 | T1C | 1 | | | |
| 8 | Value | 2 | T2A | 1 | | | |
| 9 | Value | 3 | T1B | 1 | | | |
| 10 | Value | 3 | T2B | 1 | | | |
| 11 | Value | 4 | T1C | 1 | | | |
| 12 | Value | 4 | T2C | 3 | | | |
| 13 | Value | 5 | T1B | 1 | | | |
| 14 | Value | 5 | T2B | 1 | | | |
| ⋮ | ⋮ | ⋮ | ⋮ | ⋮ | | | |
| 22 | Table | T2 | Rows: 3 | Ign: 0 | | | |

Fig. 13 (Cont.)

| Analysis File | Type | Value | Loc. | | |
|---|---|---|---|---|---|
| 1 | Column | T1A | Values: 2 | | |
| 2 | Column | T1B | Values: 3 | | |
| 3 | Column | T1C | Values: 3 | | |
| 4 | Column | T2A | Values: 2 | | |
| 5 | Column | T2B | Values: 3 | | |
| 6 | Column | T2C | Values: 1 | | |
| 7 | Column Pair | T1A, T1B | Intersects: 1 | | |
| 8 | Column Pair | T1A, T1C | Intersects: 1 | | |
| 9 | Column Pair | T1A, T2A | Intersects: 1 | | |
| 10 | Column Pair | T1A, T2B | Intersects: 1 | | |
| 11 | Column Pair | T1B, T2A | Intersects: 1 | | |
| 12 | Column Pair | T1B, T2B | Intersects: 3 | | |
| 13 | Column Pair | T1C, T2A | Intersects: 1 | | |
| 14 | Column Pair | T1C, T2C | Intersects: 1 | | |
| 15 | Column Pair | T2A, T2B | Intersects: 1 | | |
| .. | .. | .. | .. | .. | .. |
| 22 | Table | T2 | Row: 3 | Ign: 0 | Other summary info |

- 1300
- 1302 (rows 1–6)
- 1304 (rows 7–15)
- 1306 (last rows)

Fig. 14A

| Analysis File | Type | Value | Loc. | | |
|---|---|---|---|---|---|
| 1 | Column | T1A | Values: 2 | | |
| 2 | Column | T1B | Values: 3 | | |
| 3 | Column | T1C | Values: 3 | | |
| 4 | Column | T2A | Values: 2 | | |
| 5 | Column | T2B | Values: 3 | | |
| 6 | Column | T2C | Values: 1 | | |
| 7 | Column Pair | T1A, T1B | Intersects: 1 | | |
| 8 | Column Pair | T1A, T1C | Intersects: 1 | | |
| 9 | Column Pair | T1A, T2A | Intersects: 1 | | |
| 10 | Column Pair | T1A, T2B | Intersects: 1 | | |
| 11 | Column Pair | T1B, T2A | Intersects: 1 | | |
| 12 | Column Pair | T1B, T2B | Intersects: 3 | | |
| 13 | Column Pair | T1C, T2A | Intersects: 1 | | |
| 14 | Column Pair | T1C, T2C | Intersects: 1 | | |
| 15 | Column Pair | T2A, T2B | Intersects: 1 | | |
| .. | .. | .. | .. | .. | .. |
| 22 | Table | T2 | Row: 3 | Ign: 0 | Other summary info |

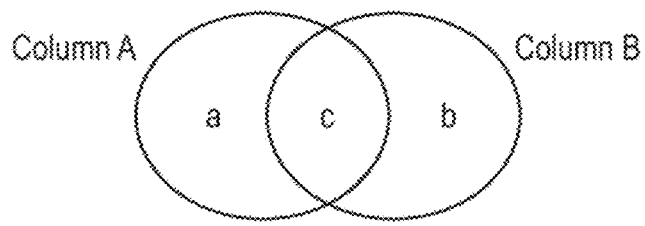

| Output File | Type | Value | Prob. | | Rank |
|---|---|---|---|---|---|
| 1 | Table | T1 | .. | | |
| 2 | Table | T2 | .. | | |
| 3 | Column | T1A | Key: 0.3 | | |
| 4 | Column | T1B | Key: 1 | | |
| 5 | Column | T1C | Key: 1 | | |
| 6 | Column | T2A | Key: 0.7 | | |
| 7 | Column | T2B | Key: 1 | | |
| 8 | Column | T2C | Key: 0 | | |
| 9 | Table Pair | T1, T2 | Key and intersect probabilities | | 1 |
| 10 | Column Pair | T1B, T2A | Key and intersect probabilities | | 2 |
| 11 | Column Pair | T1B, T2B | Key and intersect probabilities | | 1 |
| 12 | Column Pair | T1C, T2A | Key and intersect probabilities | | 2 |
| 13 | Column Pair | T2A, T2B | Key and intersect probabilities | | 2 |
| 14 | Unlikely Col. Pair | T1A, T1B | low key probability or low number of distinct intersects | | |
| 15 | Unlikely Col. Pair | T1A, T1C | low key probability or low number of distinct intersects | | |
| 16 | Unlikely Col. Pair | T1A, T2A | low key probability or low number of distinct intersects | | |
| 17 | Unlikely Col. Pair | T1A, T2B | low key probability or low number of distinct intersects | | |
| 18 | Unlikely Col. Pair | T1C, T2C | low key probability or low number of distinct intersects | | |
| .. | .. | .. | .. | .. | .. |
| .. | Table | T2 | Row: 3 | Ign: 0 | Other summary info |

Fig. 14C

| Table 1 | ID 1 | ID 2 | Data A |
|---|---|---|---|
| Row 1 | 1 | A | ... |
| Row 2 | 1 | B | ... |
| Row 3 | 2 | A | ... |
| ... | ... | ... | ... |

| Table 2 | ID 3 | ID 4 | ID 5 | Data B |
|---|---|---|---|---|
| Row 1 | C | z | 3 | ... |
| Row 2 | C | z | 4 | ... |
| Row 3 | C | y | 3 | ... |
| ... | ... | ... | ... | ... |

Fig. 14D

| Table 1 | ID 1 | Data A | Data B |
|---|---|---|---|
| Row 1 | 1 | ... | ... |
| Row 2 | 2 | ... | ... |
| Row 3 | 3 | ... | ... |
| ... | ... | ... | ... |

| Table 2 | ID 2 | Data C | Data D |
|---|---|---|---|
| Row 1 | A | ... | ... |
| Row 2 | B | ... | ... |
| Row 3 | C | ... | ... |
| ... | ... | ... | ... |

| Table 3 | ID 3 | Data E | Data F |
|---|---|---|---|
| Row 1 | z | ... | ... |
| Row 2 | y | ... | ... |
| Row 3 | x | ... | ... |
| ... | ... | ... | ... |

Rel1, Rel2, Rel3

| Table 4 | ID 2 | ID 3 | ID 1 | Data G |
|---|---|---|---|---|
| Row 1 | B | x | 2 | ... |
| Row 2 | B | x | 3 | ... |
| Row 3 | B | y | 2 | ... |
| ... | ... | ... | ... | ... |

Fig. 14E

Rel5, Rel6

| Table 5 | ID 5 | ID 6 | Data H |
|---|---|---|---|
| Row 1 | 4 | D | ... |
| Row 2 | 4 | E | ... |
| Row 3 | 5 | D | ... |
| ... | ... | ... | ... |

| Table 6 | ID 6 | ID 5 | Data J |
|---|---|---|---|
| Row 1 | D | 4 | ... |
| Row 2 | E | 4 | ... |
| Row 3 | D | 5 | ... |
| ... | ... | ... | ... |

Fig. 14F
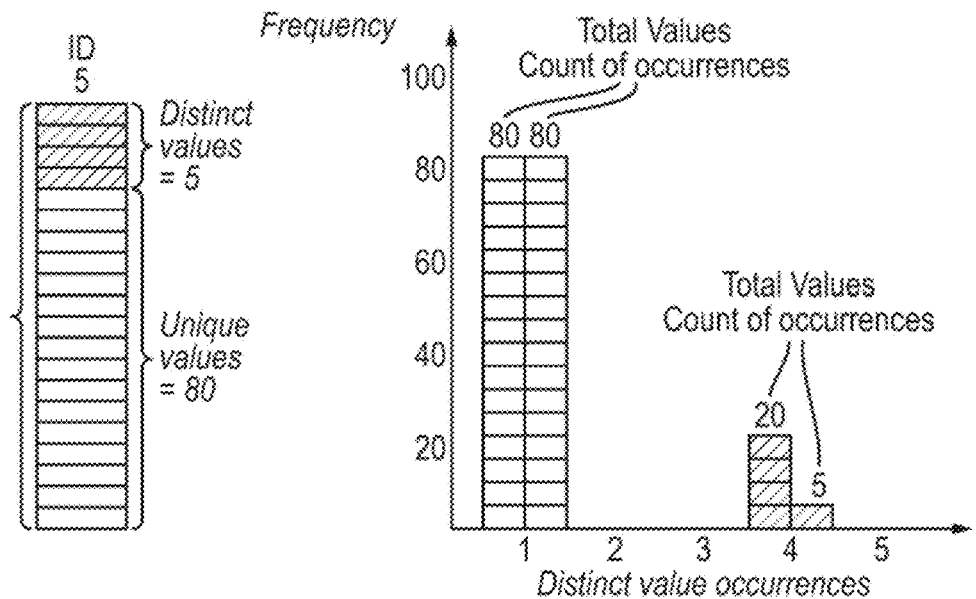
Fig. 14G
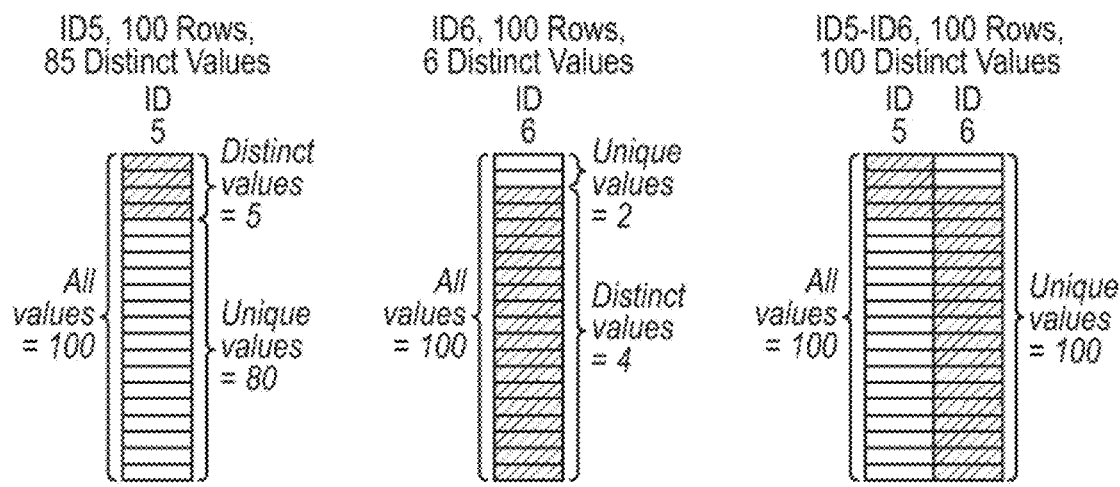
Fig. 14H
| Table 7 | ID 6 | Data C | Data D |
|---|---|---|---|
| Row 1 | 101 | ... | ... |
| Row 2 | 102 | ... | ... |
| Row 3 | 103 | ... | ... |
| ... | ... | ... | ... |
| Table 8 | ID 7 | Data E | Data F |
|---|---|---|---|
| Row 1 | 000100 | ... | ... |
| Row 2 | 000101 | ... | ... |
| Row 3 | 000102 | ... | ... |
| ... | ... | ... | ... |

Metadata item definition

Name: Information_Security_Classification

Label: InfoSec Classification

Description: Provides a classification of an object for information security purposes Type: Select List ⌄

— 1902

Applies at tiers: DataSource, Table, Field, ResultArea, Result Table, Result Column

— 1904

Approvers: Developer, Solution Architect, Data Manager, User, Business Data Owner, Admin

— 1906

Editors: Developer, Solution Architect, Data Manager, User, Business Data Owner, Admin

— 1908

Cancel    Save

Fig. 19

Metadata for object: CRM-ADR2-PERSNUMBER field

| | |
|---|---|
| Technical name | CRM-ADR2-PERSNUMBER |
| Technical description | Person number |
| Business Name | Field |
| Business Description | Internal key for identifying a person in business address services |
| Physical Data Type | CHAR -- character string ⌄ |
| Length | 10 |
| Not Null | ✓ |

( Cancel ) ( Save ) ( Save & Submit ) ( Approve ) ( Dispute )

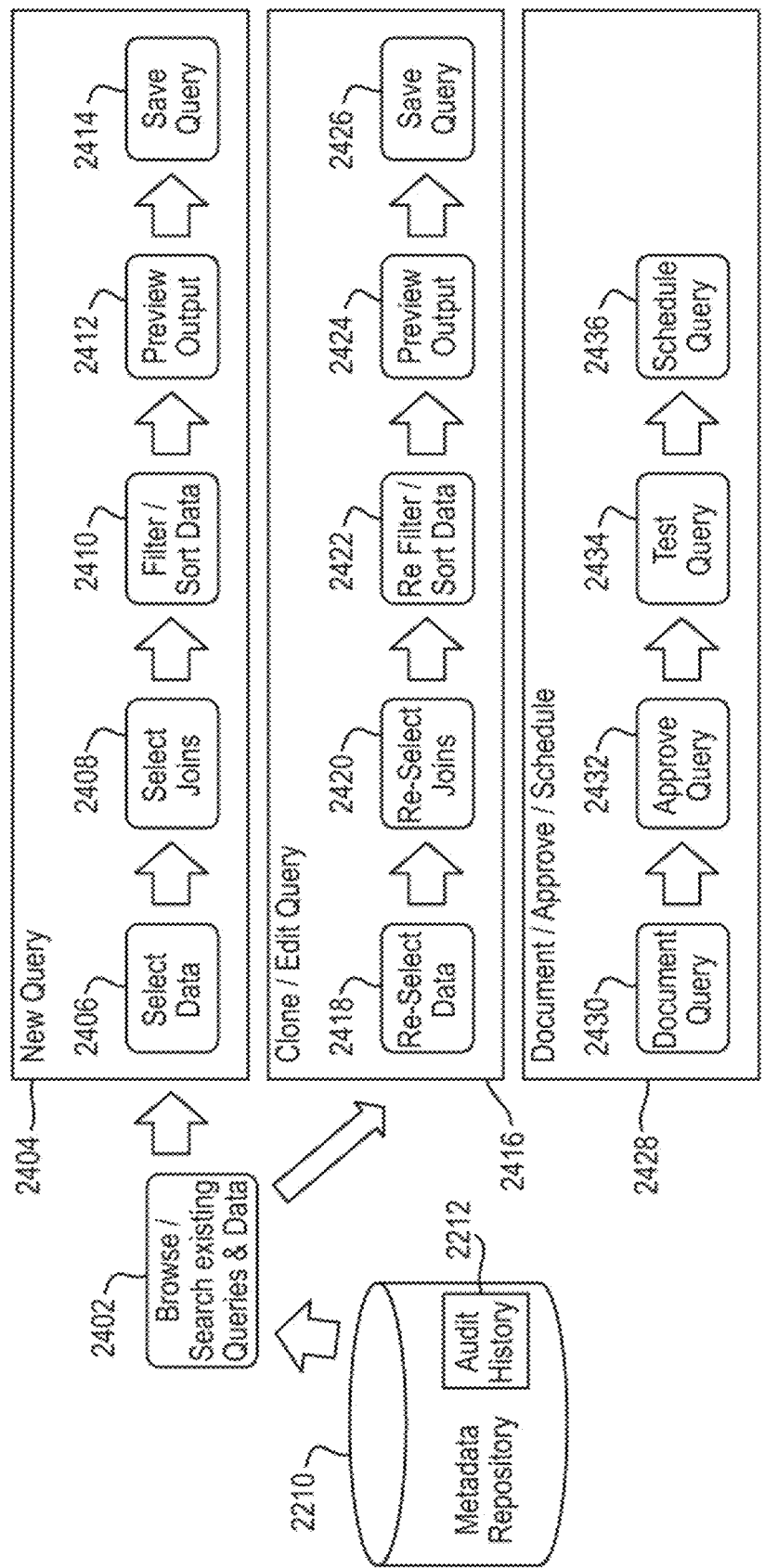

SYSTEM FOR DATA MANAGEMENT IN A LARGE SCALE DATA REPOSITORY

CROSS-REFERENCE TO RELATED APPLICATIONS

This application is a continuation of U.S. patent application Ser. No. 15/704,553, entitled SYSTEM FOR DATA MANAGEMENT IN A LARGE SCALE DATA REPOSITORY, filed Sep. 14, 2017, which claims priority to United Kingdom Patent Application No. 1615747.1, entitled SYSTEM FOR DATA MANAGEMENT IN A LARGE SCALE DATA REPOSITORY, filed Sep. 15, 2016, all of which are incorporated herein by reference.

BACKGROUND

The present invention relates to systems and methods for importing and managing data in a large scale data repository. Particular aspects relate to import processes, data relationship discovery and metadata collection.

Organizations maintain increasingly large and complex collections of data. Often there is a need to bring together data from diverse data sources into a central data repository to enable processing and analysis of data sets. However, this presents a number of technical challenges. For example, important information about the structure and content of source databases may be lost during import, making it harder to access and manage the data efficiently. Furthermore, the exploitation of the data can be hampered by inconsistencies in data definitions across different sources, and the complexity of data sets often means that expert knowledge is required to access and manipulate the data, e.g. by creating data queries. As a result, making such data sets accessible to ordinary users in an efficient manner has in the past has presented significant technical difficulties.

SUMMARY

Embodiments of the present invention accordingly seek to address deficiencies in existing data processing systems.

Accordingly, in a first aspect of the invention, there is provided a computer-implemented method of managing data in a data repository, comprising maintaining a data repository, the data repository storing data imported from one or more data sources; identifying a database entity added to the data repository; creating a metadata object for storing metadata relating to the database entity and storing the metadata object in a metadata repository; adding the metadata object to a documentation queue; receiving, from a first user, metadata for the metadata object via a metadata management user interface; and storing the received metadata in the metadata repository and associating the metadata with the metadata object.

The receiving step may comprise accessing the metadata object by the first user from the documentation queue. Preferably, the user accesses the metadata object using a queue interface displaying metadata objects of the documentation queue. The method may comprise assigning the metadata object to the first user prior to the user accessing the metadata object to enter metadata.

Identifying the database entity preferably comprises: determining data structure information (or schema information) relating to data stored in the data repository; comparing the data structure information to metadata in the metadata repository (e.g. to identify data entities for which no metadata object exists in the metadata repository); and identifying the added database entity based on the comparison.

The identifying step may be performed by a synchronization module arranged to synchronize the metadata repository with the data repository. The synchronization module may further be configured to detect changes to or removal of database entities in the data repository, and update the metadata repository accordingly (e.g. by adding or removing metadata objects or marking metadata objects as obsolete).

A metadata object is preferably associated with one or more first user permissions indicating one or more users or user classes permitted to enter metadata for the metadata object, wherein the metadata management user interface enables entry of metadata for the metadata object by the first user if the first user matches the first user permission(s). Thus, the interface may not permit metadata editing by a user not identified as having editing permission for the metadata object.

The method may further comprise: after receiving the metadata, adding the metadata object to an approval queue; receiving a positive or negative approval indication for the metadata object from a second user via the metadata management user interface; and in response to a positive approval indication, marking the metadata object as approved in the metadata repository (and optionally removing the metadata object from the approval queue). This may also make the metadata object and its metadata available for use in other modules or processes, e.g. a query builder tool. Negative approval is also referred to as a dispute of a metadata object.

The second user may access the metadata object from the approval queue e.g. via an approval interface. The metadata object may have been assigned to the second user prior to access by the second user.

The method may comprise, in response to a negative approval indication, adding the metadata object to a dispute queue, the negative approval indication preferably associated with dispute reason information entered by the second user. The method may comprising receiving, from a reviewing user in relation to a metadata object on the dispute queue: a dispute-rejection indication, and in response returning the metadata object to the approval queue for subsequent approval of the metadata associated with the metadata object; or a dispute-upheld indication, and in response returning the metadata object to the documentation queue for subsequent editing of the metadata associated with the metadata object. The first, second and reviewing users are preferably different users.

The metadata object may be associated with one or more second user permissions indicating one or more users or user classes permitted to approve the metadata object, wherein the metadata management user interface enables entry of an approval indication for the metadata object by the second user if the second user matches the second user permission(s). Thus, the interface may not permit users not identified as permitted to approve a metadata object to provide an approval indication. The second user permissions may specify one or more users or user classes required to approve the metadata object, the method comprising marking the metadata object as approved only after receiving a positive approval indication from each specified required user and/or from a user of each specified required user class.

A metadata object is preferably associated with one or more metadata items in the metadata repository. The method may comprise identifying a type of the database entity and/or metadata object, selecting a plurality of metadata items associated with the type in accordance with configuration data, and associating the selected metadata items with the metadata object. Thus different types of metadata object may have different sets of metadata items associated with them. Each metadata item may define the type(s) of metadata object to which it applies. The method may comprise providing, by the metadata management user interface, a metadata input interface comprising the selected metadata items.

Each metadata item may be associated with one or more user permissions indicating one or more users or user classes permitted to edit and/or approve the metadata item, the method comprising permitting editing and/or approval of a metadata object via the metadata management user interface in accordance with the user permissions specified for its metadata items. Each metadata item may be associated with one or more user requirements indicating one or more users or user classes required to approve the metadata item, the method comprising marking a metadata object as approved only after positive approval indications have been received from each user or user class specified for the metadata items of the metadata object.

Metadata items may be associated with configuration data specifying whether a given metadata item is mandatory or optional, the method comprising adding the metadata object to the approval queue only after user input has been received for all mandatory metadata items defined for the metadata object.

The method may comprise providing a metadata configuration interface for defining metadata object types and/or metadata items, the interface preferably enabling configuration for a metadata item of one or more of: one or more metadata object types to which the metadata item relates; a set of users or user classes permitted to edit the metadata item; a set of users or user classes required to approve the metadata item; whether the metadata item is mandatory or optional.

Preferably, the method comprises providing a plurality of metadata object types arranged in one or more hierarchies, the method preferably further comprising a metadata browsing interface for displaying metadata objects in accordance with the hierarchies.

Preferably, metadata objects correspond to database entities associated with the data in the data repository, including one or more of: data sources; tables; views; table columns; relationships; queries; and reports.

The identifying step may comprise analyzing data in the data repository to identify one or more relationships within the data, the method comprising creating metadata objects for the identified relationships in the metadata repository and adding the metadata objects to the documentation queue. Identifying one or more relationships may comprises evaluating a plurality of candidate relationships, each candidate relationship defined between a first candidate key of a first data collection and a second candidate key of a second data collection, the evaluating comprising, for each candidate relationship, computing one or more relationship metrics, wherein the relationship metrics provide a measure of a relationship between the first candidate key and the second candidate key; and identifying one or more relationships between data collections in dependence on the computed relationship metrics. Evaluation and/or identification of relationships may be performed in accordance with the further aspects of the invention as set out in the Further aspects and features of the invention section below.

The method may further comprise importing data from the one or more data sources to the data repository using an automated data import process, and preferably further comprising adapting the automated data import process in response to changes in the source data schema of the imported data. Imported data is preferably stored at the data source in accordance with a source data schema, the method comprising: executing an automated data import process to retrieve data from the data source and update the target storage system based on the retrieved data, the automated data import process operating in dependence on the source data schema; detecting a change in the source data schema; in response to detecting the change in the source data schema, modifying the automated data import process based on the detected change; and executing the modified automated data import process to retrieve further data from the data source and update the target storage system based on the further retrieved data. The importing may be performed in accordance with the further aspects of the invention set out in the Further aspects and features of the invention section below.

The method may comprise adding metadata objects to the metadata repository and/or documentation queue in response to importing data, and preferably automatically associating metadata with the metadata object based on the imported data and/or schema information of the data source.

The method may comprise providing a search interface for searching metadata in the metadata repository and/or providing a query builder interface adapted to enable construction of a data query using metadata from the metadata repository.

The query builder interface may comprise an interface for selection of data entities used in the query, the interface displaying metadata for data entities stored in the metadata repository and/or providing a search interface for selecting data entities based on metadata in the metadata repository. The query builder interface may enable selection of: one or more source tables for a query; and one or more table relationships between selected tables. The method may comprise creating a data query based on the selected tables and relationships, preferably wherein a selected relationship is used to define a table join on selected tables. In response to receiving a selection of two tables as data sources for the query, the method may include identifying based on stored metadata at least one relationship between columns of the selected tables, and providing an indication of the identified relationships on the query builder user interface. The method may comprise displaying an indication of the relationship strength on the query builder interface. The identified relationships may comprise one or more relationships automatically identified by analysis of data in the data repository, the relationship strength indication preferably computed during the analysis. The analysis may be performed in accordance with the further aspects of the invention as set out in the Further aspects and features of the invention section below.

The method may further comprise executing the query and/or storing the query, and preferably further comprises creating a metadata object for the query in the metadata repository, and preferably adding the metadata object to the documentation queue.

In a further aspect of the invention, there is provided a system for managing data stored in a data repository, the system comprising: a metadata repository for storing metadata objects, the metadata objects comprising metadata relating to data in the data repository; a documentation queue adapted to identify metadata objects for which metadata is to be collected; an approval queue adapted to identify metadata objects for which user approval is to be obtained; a synchronization module adapted to identify addition of one or more database entities to the data repository, to create one or more metadata objects based on the added database entities, and to add the created metadata objects to the documentation queue; a metadata collection module adapted to receive metadata for metadata objects in the documentation queue, store the received metadata in the metadata repository and associate the metadata with the metadata objects and to move metadata objects for which metadata has been entered from the documentation queue to the approval queue; and a metadata approval module adapted to receive approval indications for metadata objects in the approval queue and to mark approved metadata objects in the metadata repository as approved based on the received indications. The system is preferably configured to perform any method as set out above or in any of the further aspects of the invention set out in the Further aspects and features of the invention section below.

More generally, the invention also provides a system or apparatus having means, preferably in the form of a processor with associated memory, for performing any method as set out herein, and a tangible, non-transient computer-readable medium comprising software code adapted, when executed on a data processing apparatus, to perform any method as set out herein.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:—

FIGS. 10, 11, 12, 13, 14A and 14B illustrate the table analysis process in more detail;

FIGS. 14C-14H illustrate extensions of the table analysis algorithm;

FIG. 19 illustrates a user interface for configuring an item of metadata;

FIG. 20 illustrates a metadata collection and/or approval user interface;

FIGS. 23A and 23B illustrate a query builder user interface;

FIG. 24 illustrates processes for creating, editing and documenting queries using a query builder tool;

DETAILED DESCRIPTION

Figure 1:
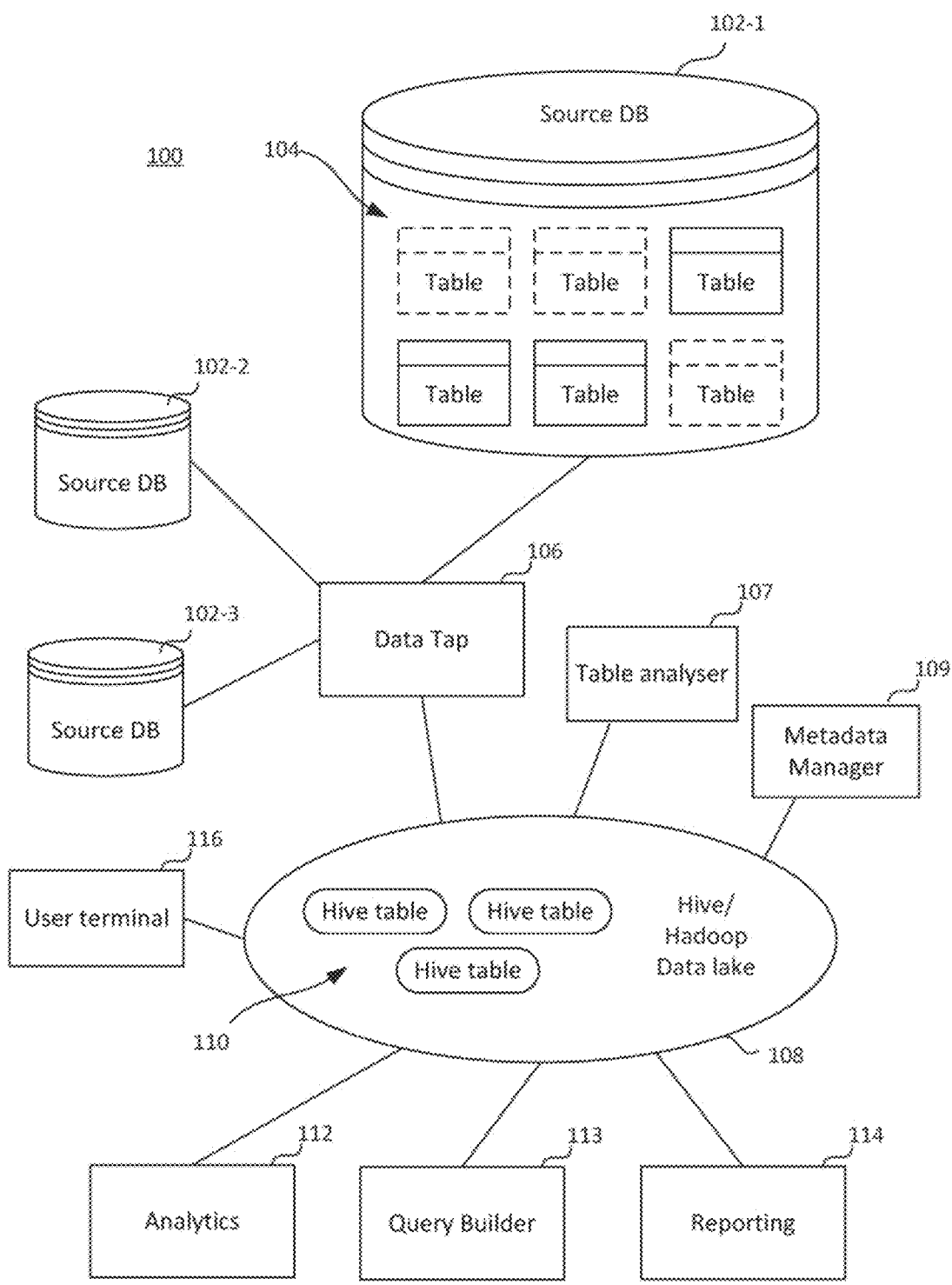
FIG. 1 illustrates a system for importing data into a central data repository and analyzing and managing the imported data.

Embodiments of the invention provide systems and methods for importing data from a variety of structured data sources such as relational databases into a large-scale unstructured or flexibly structured data repository and for the management of the data after import. Such a data management system is illustrated in overview in FIG. 1.

It should be noted that, in the following description, specific implementation details are set out by way of example (for example in relation to database and software technologies used and details of the software architecture of the system—e.g. the use of Hadoop/Hive and Java technologies). These relate to an exemplary implementation of the system but should not be construed as limiting, and alternative approaches and technologies may be substituted.

The data management system 100 provides a software component referred to as the "Data Tap" tool 106 for importing data from any number of data sources 102-1, 102-2, 102-3 into a data repository 108.

The data repository 108 is also referred to herein as a "data lake", and may comprise any data storage technology. Preferably, the data lake allows data to be stored in an unstructured or flexibly structured manner. For example, the repository or data lake may not require a fixed or pre-defined data schema. The data lake may be (or may include) a NoSQL or other non-relational database, such as a document-oriented database storing data as "document" data objects (e.g. JSON documents), a key-value store, a column-oriented database, a file system storing flat files, or any other suitable data store or combination of any of the above. However, in other embodiments, the data lake could alternatively include a conventional structured database such as a relational database or object database.

In the examples described herein, the data lake is implemented as a Hadoop data repository employing a Hadoop Distributed File System (HDFS) with an Apache Hive data warehousing infrastructure. Hive Query Language (HQL) is used to create and manipulate data sets in the HDFS to store data extracted from the data sources 102.

The data sources 102-1, 102-2, 102-3 are illustrated as being structured databases (e.g. relational or object databases) but any form of data source may be used, such as flat files, real-time data feeds, and the like. In the following examples, the data sources are relational databases managed by conventional relational database management systems (RDBMS), e.g. Oracle/MySQL/Microsoft SQL Server or the like.

A given source database 102 consists of a number of tables 104 (where a table comprises a set of rows or records, each divided into one or more fields or columns). The Data Tap tool may import a database in its entirety (i.e. including all tables) or alternatively may import only one or more selected tables (e.g. as illustrated here, a subset of tables shown with solid lines have been selected for import from database 102-1). Furthermore, the system may import tables and data from a single data source 102-1 or from multiple data sources into the same data lake 108. Thus, data that originated from differently structured data sources having different original data schemas may coexist within data lake 108 in the form of a collection of Hive tables 110.

In one example, imported table data may be stored in files in the HDFS (e.g. in Hadoop SEQUENCEFILE format). In practice, except possibly for very small tables, a given source table may be split across multiple files in the HDFS. The Data Tap tool preferably operates in a parallelized fashion as a map-reduce algorithm (here implemented using the Hadoop Java map-reduce framework) and the number of files produced for an imported table depends on how many mappers are used to create the files. As an example, for small tables a default of ten mappers may be used producing ten files for a table, but very large tables may be split into thousands of files.

The files are partitioned by row, each containing the full set of columns imported from the source table (while typically all columns of the source table will be imported this need not always be the case). Additional columns of management data may be added to the imported tables for management purposes during import, for example to record import timestamps and the like. The files are placed in a directory structure, such that the files associated with a single source table preferably reside in a common directory (e.g. with separate directories for each source table, though alternatively files could be spread across multiple directories e.g. depending on whether the tables are partitioned at source).

The files are created by the Data Tap map-reduce algorithm in SEQUENCEFILE format. Apache Hive enables a database structure to be applied to these files, such as tables and columns, and the structure information is stored in the Hive database known as the Hive Metastore. Thus, the term "Hive tables" is used to describe the table structures that are applied across the many files in a HDFS file system. A Hive table is thus a collection of structured HDFS files with each file corresponding to a partition of the source table comprising a subset of the rows of that table. Hive commands (using HQL) are available to access this data and also to update the table structure. HQL provides a similar syntax to SQL.

In a preferred embodiment, the Hadoop platform is configured to maintain two operational databases; the first is referred as OPEN, and the other CLOSED. OPEN stores a copy of the current source system tables, whereas CLOSED stores the full history of these source system tables including deleted records, and older versions of records which have since been updated.

The data in data lake 108 may be made available to external processes, e.g. analytics process 112 and reporting process 114. Thus, the described approach can enable an organization to bring together information from many disparate databases (possibly supporting different operations of the organization), and analyze and process the data centrally.

When importing data from many different data sources, knowledge of the contents of the data tables and their interrelationships may be lost. Furthermore, it may often be the case that data imported from disparate data sources is interrelated. For example, a gas or similar utilities provider may import a database of gas supply accounts from a supply part of the organization and a database of boiler maintenance data from a service/maintenance part of the organization. The data may be related in that some supply customers may also be maintenance customers. Thus, there may be relationships between data in the multiple data sources, which may, for example, manifest in overlapping data items appearing in both sets such as customer identifiers or names, addresses and the like. The above is merely one example, and similar relationships may occur between disparate data sources maintained by organizations within any field (e.g. medical, banking, manufacturing etc.)

It is not necessarily the case, however, that equivalent or related data from different data sources will reside in tables/columns having the same or related names, and documentation for the source databases may be incomplete or inconsistent, making it difficult to work with the data after import. Furthermore, even where multiple tables are imported from the same data source, relationships between tables (which may e.g. be defined in the form of metadata, queries, views or the like in the source database) may be lost during the import process. This loss of structural information and knowledge about the data presents a technical problem that impairs subsequent handling of the data.

Embodiments of the present invention address such problems by providing a Table Analyzer software module 107 which can automatically discover relationships between Hive tables stored in the data lake 108 as well as Metadata Manager tool 109 providing a process for collating metadata about imported data entities.

The Table Analyzer 107 uses algorithms employing a stochastic approach to identify relationships between table columns, based on the probability of particular columns being keys for their tables, and the degree of overlap between the data content of different columns. Such relationships may represent e.g. primary-foreign key relationships or any other relationships that may allow a table join operation to be performed to combine data from different source tables. The identified relationships may then be used in the creation of join queries to combine and extract data from the data lake.

The Metadata Manager tool 109 implements processes for entry and management of metadata relating to the data that has been imported into the data lake. Together with the relationships discovered by the Table Analyzer tool 107, the metadata can be used to assist in subsequent data processing and extraction.

The following sections describe the Data Tap tool, Table Analyzer tool and Metadata Manager tool in more detail.

Data Tap

The Data Tap tool 106 comprises the following components:

1) Metadata Generation and Schema Evolution
2) Difference Calculator
3) History Capture The Data Tap framework is flexible and provides the capability to ingest data from any relational database into the Hadoop data lake. The Metadata Generation and Schema Evolution tool not only provides the capability to seamlessly deal with changes to the source schema, but also provides the capability to automate the Hadoop development that would have been required to ingest additional tables and data from new data sources (in some cases removing the need for human intervention/development effort altogether).

The Difference Calculator is used for data sources that do not have the capability to provide change data in an incremental manner.

The History Capture process provides the means of creating the OPEN and CLOSED partition for each day, containing the current data set and historical data respectively.

Figure 2A:
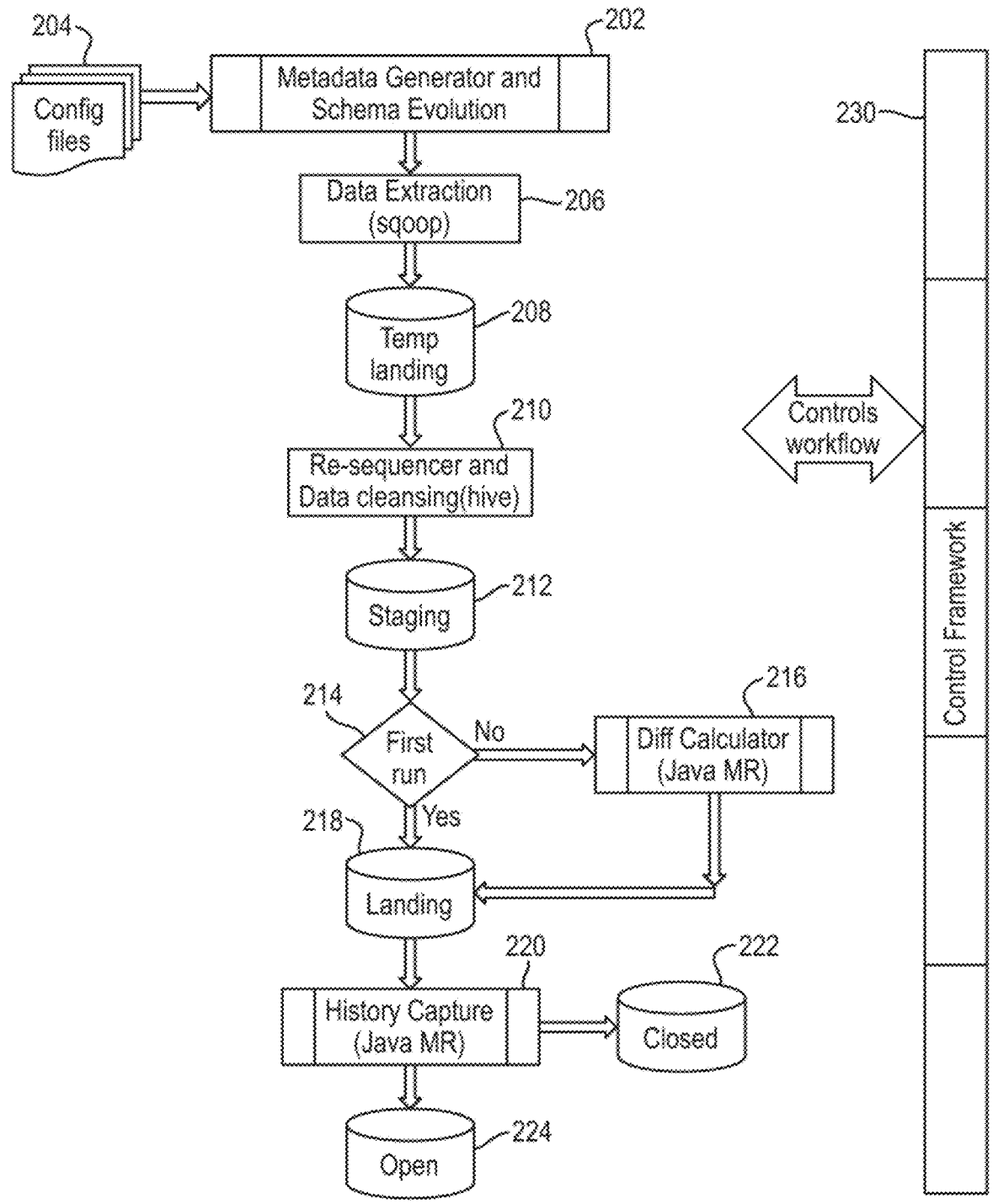
FIG. 2A illustrates a high-level process for importing data from a relational database into a data lake.

FIG. 2A illustrates the Data Tap import process in relation to a particular table being imported from a given source database. The depicted process is repeated for each table to be imported.

The metadata generator and schema evolution process 202 retrieves and stores metadata for the table being imported and deals with changes to the metadata. The metadata defines the schema of the table being imported, i.e. the table structure and field definitions. The metadata extraction may be controlled by way of configuration files 204.

The metadata is used in a data extraction process 206 to extract data from the table in the source database. In the present example, Sqoop scripts are used to perform the extraction but other technologies may be substituted.

The data extraction process reads the contents of the table from the source database. The extracted data is stored in a temporary landing area 208 within the data lake.

A re-sequencer and data cleansing process 210 (e.g. implemented using Hive commands or scripts) pre-processes the data and stores the pre-processed data in a staging area 212. Re-sequencing involves changing the column order of a row to ensure that the columns which are keys are the first ones in each row when stored in Hadoop which can improve access efficiency. Cleansing involves other processing to place data into the appropriate format for Hadoop, e.g. by removing spurious data, reformatting data etc. In one example, cleansing includes the process of removing erroneous spaces that are introduced when using Sqoop against an Oracle database (due to a known bug with Sqoop). More generally, the re-sequencing/cleansing scripts can be used to configure other required data transformations, depending on application context and specific needs. Preferably, the re-sequencer/data cleansing process also generates table information files which store the table and column information of a file after the columns have been re-sequenced and cleansed.

If the import is a first run (check 214) for the given data source, e.g. the first time a particular table is imported, then the whole data set is moved to a landing area 218. If not, then a difference calculator process 216 performs a difference calculation to identify the differences between the current table contents, as read in the data extraction step 206, and a previously imported version of the same table. The difference between the older version and the currently imported version (also referred to herein as the table delta) is then stored in the landing area 218. Thus, the landing area 218 will contain full data for a table if this is the first time the table is imported or the delta if the table had previously been imported.

A history capture process 220 then updates the Hive tables in the data lake. This involves both updating the current values as recorded in the OPEN database 224 and maintaining historical information in the CLOSED database 222. The history capture process is described in more detail below.

A control framework 230 manages the Data Tap workflows. In one embodiment, this uses Unix shell scripting to manage the complete workflow of the data import processes. The control framework preferably gives restart ability from any point of failure and provides logging and error tracking functionality to all involved processes.

Note that the above example describes the use of a difference calculator to generate a table delta for a previously imported table. However, in some cases the source database may be able to provide delta information directly, in which case the difference calculator may not be needed.

Figure 2B:
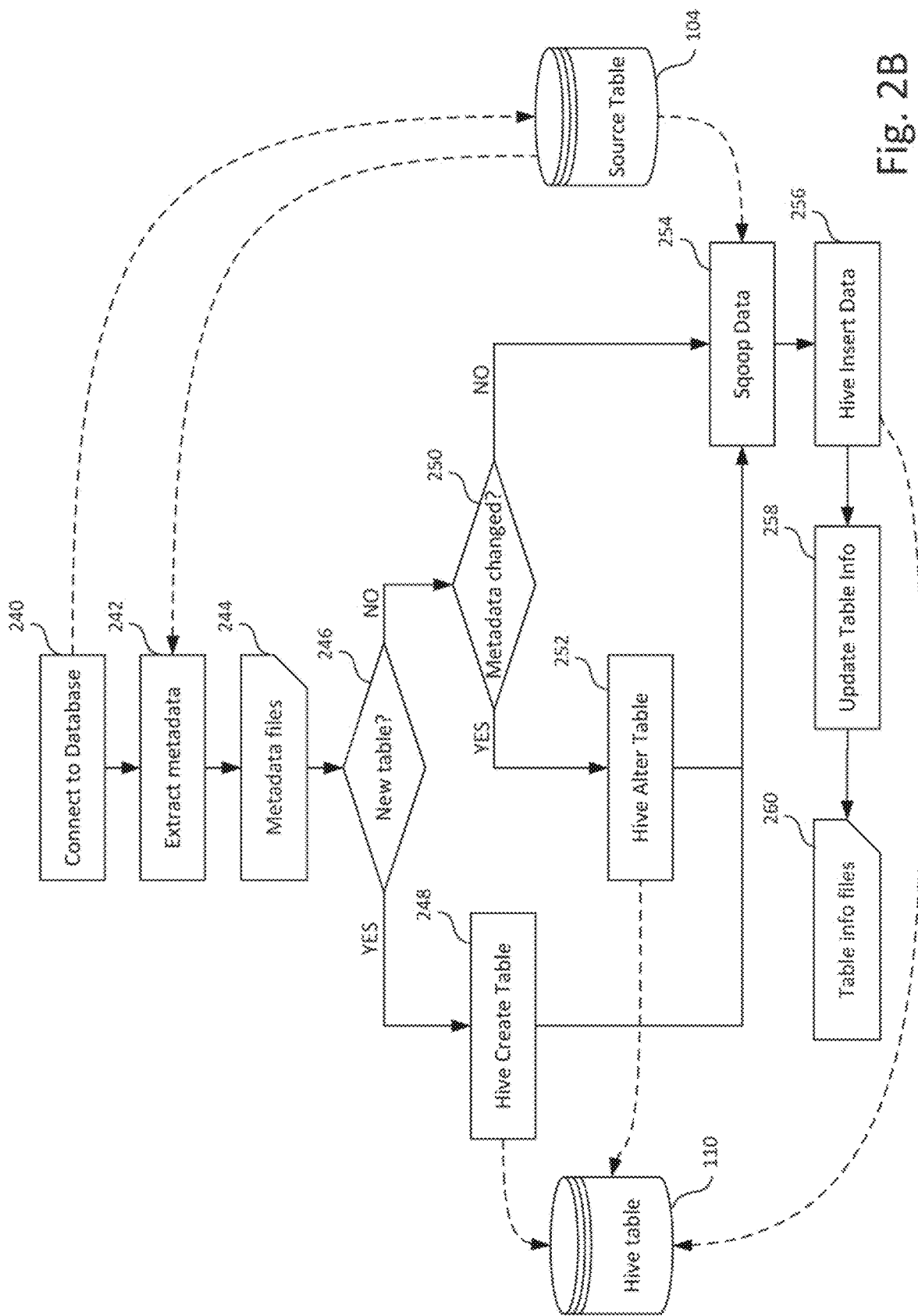
FIG. 2B illustrates a process for managing data schemas during import.

FIG. 2B illustrates in more detail the process of importing a table 104 from a source database into a Hive table 110 in the data lake. The process starts in step 240 with the Data Tap tool connecting to the source database. In step 242, the metadata for the table is extracted into one or more metadata files 244. Data Tap then identifies whether the table is a new table (not previously imported) or a previously imported table in step 246. If the table is new then the corresponding Hive table 110 is created in step 248 (e.g. by issuing a "Create Table" command), based on the extracted metadata defining the source table, and the process proceeds to step 254 (see below).

If the table has previously been imported, then the extracted metadata 244 is compared to existing metadata stored for the table in step 250 to identify whether the metadata has changed in a way that requires changes to the Hive table 110 (note that not all schema changes in the source database may require alterations to the Hive table, as discussed in more detail below). Changes to the table schema may also necessitate regeneration of Sqoop and HQL data import scripts as described in more detail below. If changes are required, then the Hive table is altered in step 252 (e.g. by issuing an "Alter Table" command). If the schema for the source table (as defined in the metadata) has not changed, or any changes do not require alteration to the Hive table, then the process proceeds directly to step 254.

In step 254, the Sqoop script for the table is run to extract the table data into temporary storage. Note that, for a previously imported table, the extracted data may be a delta of changes since the last export if the source database supports delta reporting, or the extracted data may be the full table contents, in which case the difference calculator may be run to identify any changes since the last import as described in more detail below. In the case of a new table, the full table contents are read by the Sqoop script.

The table data (either full table contents or a table delta) are then inserted into the Hive table 110 in step 256.

In a preferred embodiment, table information files 260 ("tableinfo") are preferably maintained and are used to store the column information for the tables maintained in the Hadoop filesystem (after the tables have been re-sequenced and cleansed, e.g. to place key columns first in the column order and remove any erroneous spaces between columns). The table information files are updated in step 258 to reflect any changes detected during import.

Metadata Generation and Schema Evolution

The Metadata Generation and Schema Evolution process 202 performs the following functions:
- Collection of metadata at runtime for any materialized RDBMS tables in the source database
- Creating tables in the Hadoop environment at runtime according to the metadata
- Identifying changes to metadata for the tables, at runtime, which would affect the Hadoop environment
- Applying schema changes for the tables to the Hadoop environment, at runtime
- Sqoop and Hive script generation at runtime according to the table metadata
- Regeneration of Sqoop and Hive scripts as necessary if schema changes are identified Ordinarily, to import data from any RDBMS system to Hadoop, bespoke import scripts (e.g. using Sqoop) are written according to the data schema of the tables being imported. However, writing the necessary scripts is time consuming (in typical examples three or more development days may be needed to add tables to the data lake for a new project, with additional time for quality assurance). This adds to the implementation complexity and cost of projects. Furthermore, if the RDBMS data schema changes then similar development efforts are required to upgrade scripts used for import.

Embodiments described herein reduce or eliminate the development efforts required to ingest new RDBMS tables or deal with changes in source database schemas.

The Metadata Generation and Schema Evolution process provides the following functional components.

Metadata Generator—The metadata generator collects metadata of materialized tables from any RDBMS system and stores the metadata in a metadata repository. The metadata is utilized to generate Sqoop/Hive scripts to import the data from the RDBMS to the Hadoop environment.

Schema Evolution—The schema evolution function identifies changes to metadata of materialized tables of any RDBMS. If any changes are found which would affect the Hadoop environment for the table, the Hadoop environment is altered accordingly at runtime (and scripts are regenerated) with no system downtime or any manual preparation.

Archival of Metadata—Metadata is archived, including both metadata describing the initial data schema for a table (at first ingestion) and subsequent changes. Preferably, the metadata is archived in such a way that the table can be re-created from initial metadata and the same schema evolution can be applied to it to evolve its schema to the latest schema. This may facilitate evolving schemas in development/test environments.

The Metadata generation and Schema evolution process is designed to use a common Java API to extract metadata for a table for any RDBMS. Preferred embodiments use the DatabaseMetaData Java API to retrieve metadata (and identify any changes to the metadata) for any RDBMS source. If the schema for a table is changed at the data source the schema for the representation in the data lake is modified accordingly.

Schema discovery is performed dynamically. Dynamic schema discovery from the source system is carried out at run time and necessary actions are applied to the data lake, if any. This can allow tables in existing data sources to be added to the data lake without any manual development effort.

Figure 3:
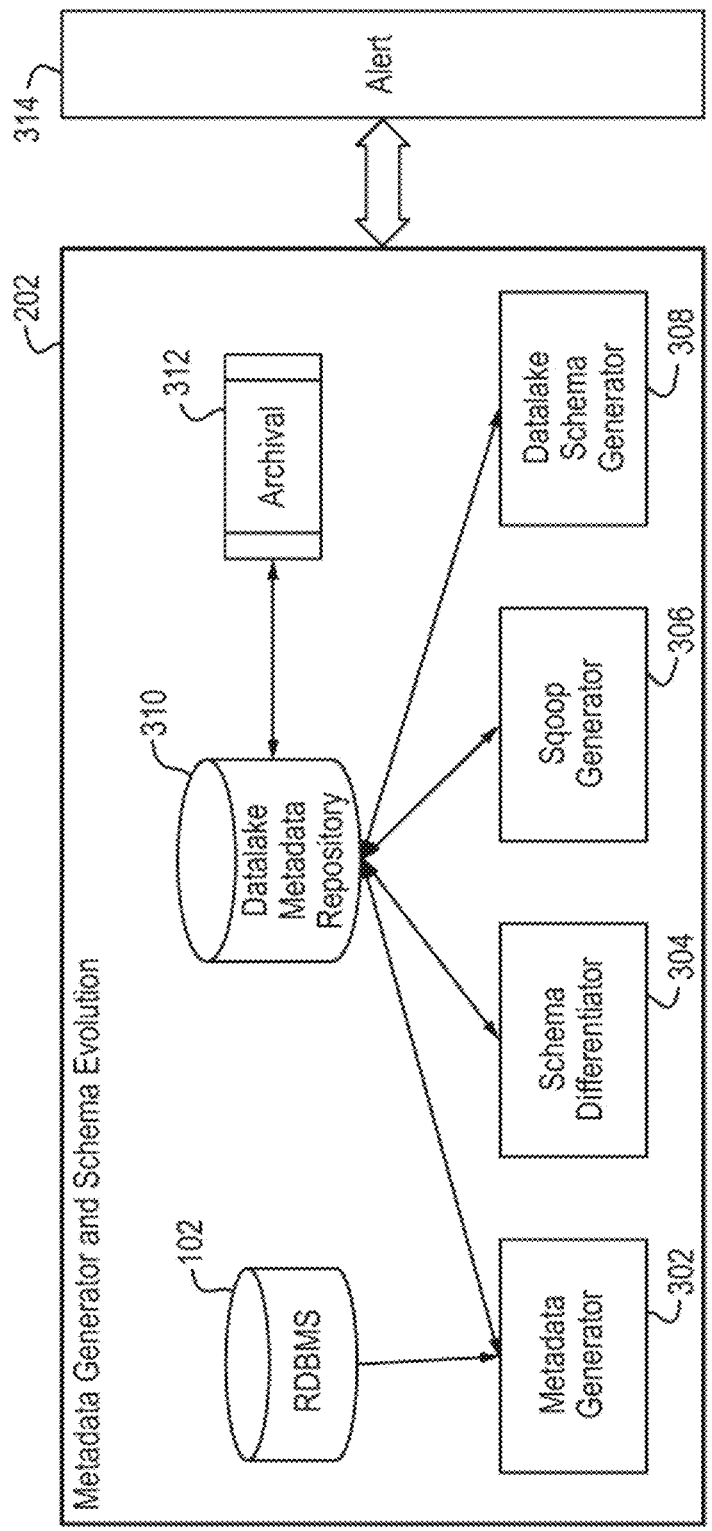
FIG. 3 illustrates functional components of a metadata generator and schema evolution module.

FIG. 3 illustrates core modules of the Metadata Generator and Schema Evolution process.

The Metadata generator 302 reads metadata for a table from the relational database management system (RDBMS) of a data source 102 using DatabaseMetaData APIs provided by Java, which provide a common platform to read metadata for different database sources. By way of example, the following information is collected for each column of each table to be imported.

Table Name
Table Description
Source—This indicates the source system or database
Column name (this may need special handling while generating Sqoop scripts if the column name cannot be used in the scripts, in which case the column name is marked accordingly)
Sqoop column name—If a special case is identified for the column name (see above) then the column can be re-named in the data lake. The new name is recorded here.
Column Data Type
Column Description
Key type (if a column is part of index for a table, then this is marked as 'P' for primary keys or else as 'S' for other types of key). Other columns may be marked with particular flags; for example, internal management data columns added during import may be identified with appropriate flags.
Process As—this indicates how this column will be represented/processed in the data lake. In a preferred embodiment, all columns are imported and processed as String data types (with any necessary data conversion performed automatically)
Nullable—flag set to 'true' if the column is allowed to take a null value in the source table, otherwise the flag is set to 'false'
DeltaView Prefix—This is used for Oracle Data Integrator feeds only, and is used by the Re-sequencer and Data Cleanse process to determine the name of the database journal view to be used as input. The DeltaView Prefix refers to the prefix of the name of the database view of the source system journal database, e.g. For the CRM table called "ADRC", the view name of the journal database is "CRM_JE_ADRC", hence the DeltaView Prefix is "CRM_JE_".
Validate As—this is the data type against which the column value should be validated if data is processed in the data lake.

The specific metadata collected may vary depending on the type of source database.

The schema metadata is stored in a metadata repository 310, for example in CSV (comma-separated values) format (e.g. as a CSV file per source table) or in any other suitable manner. The metadata repository may be stored in the data lake or separately.

The Schema Differentiator 304 identifies schema changes in the source 102 for each table. If a schema change is identified the old schema will be archived in an archive directory and the new schema will be kept for further processing. The schema differentiator also provides a signal to the Sqoop Generator 306 and Data lake schema generator 308 to generate new Sqoop scripts and corresponding HQL scripts.

In preferred embodiments, the schema evolution process may only act on schema changes which would potentially impact storage and processing of the data in the data lake. In a preferred embodiment, the following schema changes are considered as potentially affecting the data lake data representation:

Addition of a column to a table
Unique index change for table

The following changes are not considered to affect the data lake data representation:

Deletion of column
Renaming of a column
Change in column length/size
Change in data type (as the data lake considers all columns to be of type String)
Sequence change of columns However, whether or not specific schema changes affect the data lake representation and thus should be detected and handled depends on the specific implementation of the data lake and the data representation used. Thus, in other embodiments, the set of schema changes detected and handled may differ and changes such as column length or type change and sequence change may be handled in such embodiments.

As a particular example, in preferred embodiments, where a column is deleted in the source table, the column is retained in the data lake representation to allow historical data analysis. Nevertheless, future records imported would not include the deleted column (and the import scripts may be modified accordingly). However, in other embodiments columns deleted in the source table could be deleted from the target Hive table as well.

Furthermore, different schema changes may require different types of actions. For example:
- Certain schema changes may result in changes in the target schema and regeneration of import scripts (e.g. addition of a column)
- Certain schema changes may result in regeneration of import scripts but not changes to the target schema (e.g. deletion of a column in the above example), or vice versa
- Certain schema changes may result in no changes to the target schema or import scripts (e.g. change in column order)

Furthermore, the system may be configured to generate alerts for certain types of schema changes (even if no changes to target schema and/or scripts are needed).

The Sqoop Generator 306 reads metadata from the repository 310, and generates Sqoop scripts at run time for any source. Sqoop scripts are generated based on templates. Preferably, the system maintains multiple Sqoop templates, each adapted for a specific type of source database system. For example, different Sqoop templates may be provided respectively for mySQL, Oracle and MS-SQL databases. Furthermore, for each database system, separate templates are provided for initial load and delta load processes (assuming the database in question supports delta load). If the schema differentiator 304 identifies schema changes affecting the data import, then Sqoop generator 306 regenerates the scripts and replace the old scripts with the regenerated ones.

Imported data is stored in the data lake using a data schema appropriate to the storage technology used. The data lake schema generator 308 generates the data lake schema for each table by reading the schema metadata from the metadata repository 310. It also evolves the data lake schema in response to schema changes signaled by the Schema Differentiator. When modifying the existing schema, it maintains the history of the schema in an archive directory via an archival process 312.

The Alert function 314 provides the facility to generate alerts relating to the processing performed by the Metadata Generator/Schema Evolution process 202. In one embodiment, the Alert function 314 generates the following outputs:
- success_tables—this is comma separated list of tables which have successfully completed the process of metadata generation and schema evolution
- fail_tables—this is comma separated list of tables which have failed in metadata generation or schema evolution
- index_change_tables—comma separated list of tables for which a unique index has been changed (such tables may require manual intervention to change the schema before proceeding with data import)
- add_column_tables—comma separated list of tables for which columns have been added In preferred embodiments, the metadata generator and schema evolution process provides an extensible architecture at all layers (modules), like the Metadata generator, Schema differentiator, Sqoop Generator, Data Lake Schema Generator and Alerts.

Figure 4:
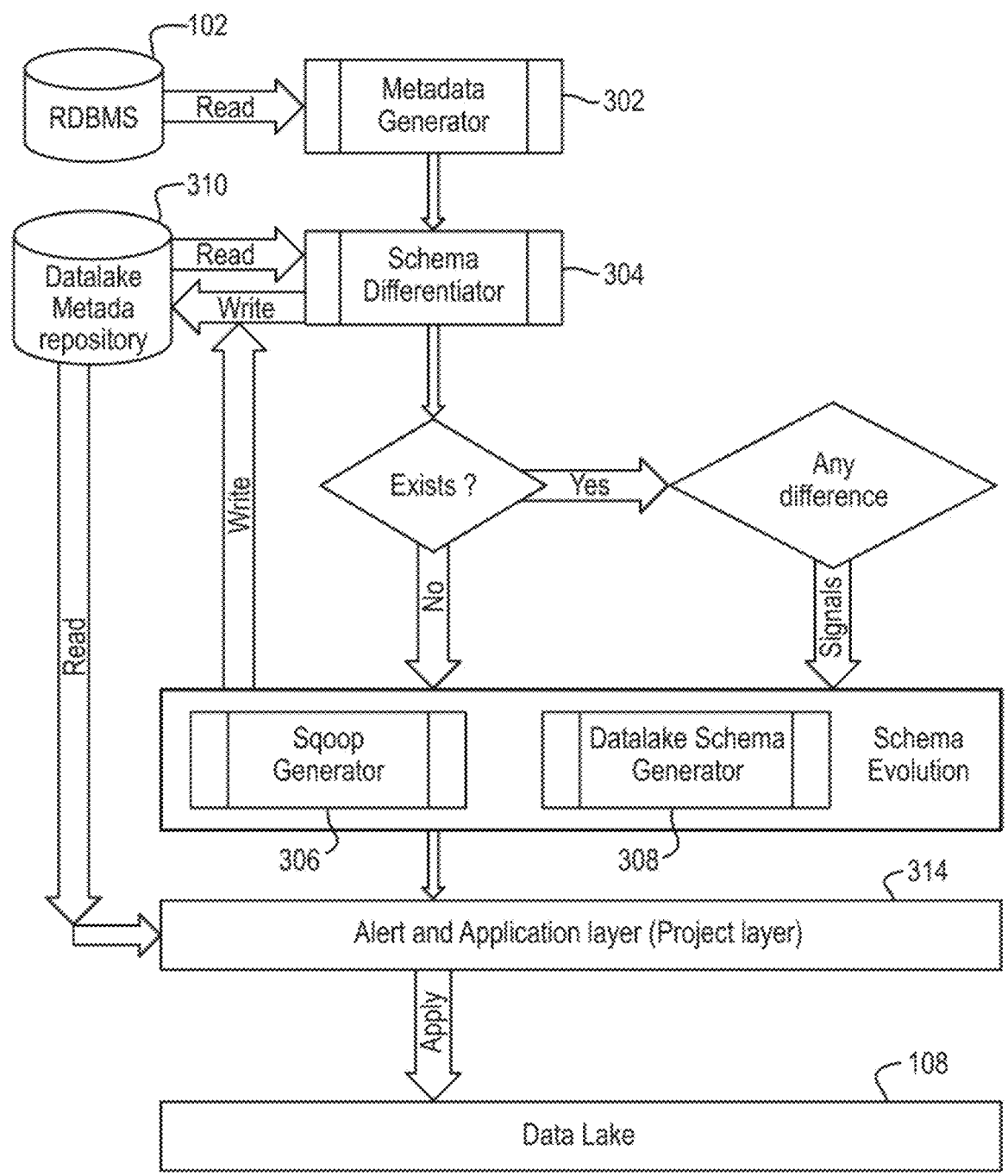
FIG. 4 illustrates the operation of the metadata generator and schema evolution module.

The operation of the Metadata Generation and Schema Evolution process is further illustrated in FIG. 4.

When the Metadata Generation and Schema Evolution process is triggered, the Metadata Generator 302 queries the RDBMS system at the data source 102 to gather metadata for one or more specified tables. Collected metadata is compared with existing metadata for the same tables in the metadata repository 310 by Schema Differentiator 304.

If existing metadata is not found for a table, then it will be treated as if the table is being imported into the data lake for the first time and a signal is sent to the Sqoop Generator 306 and Data Lake Schema Generator 308 to generate Sqoop scripts and the data lake schema (including table information files, and initial load and delta load Hive query language (HQL) scripts). Once required scripts have been generated they are stored in a local directory (specified in the configuration data), and can then be used to generate the data lake environment for the tables (i.e. the table structure, directory structure, and collection of files making up the tables). These scripts can also be used to transfer tables between Hadoop clusters.

If existing metadata is found for a table, then the Schema Differentiator 304 identifies the difference between the new table schema (as defined in the presently extracted metadata) and the old table schema (as defined by the metadata stored in the metadata repository) and applies the changes to the data lake data representation, regenerating scripts as needed. Metadata of each table is archived in an archive directory on each run for debug purposes. Also, if schema differences are identified then the schema evolution history is captured.

Generation and Operation of Import Scripts

Figure 5A:
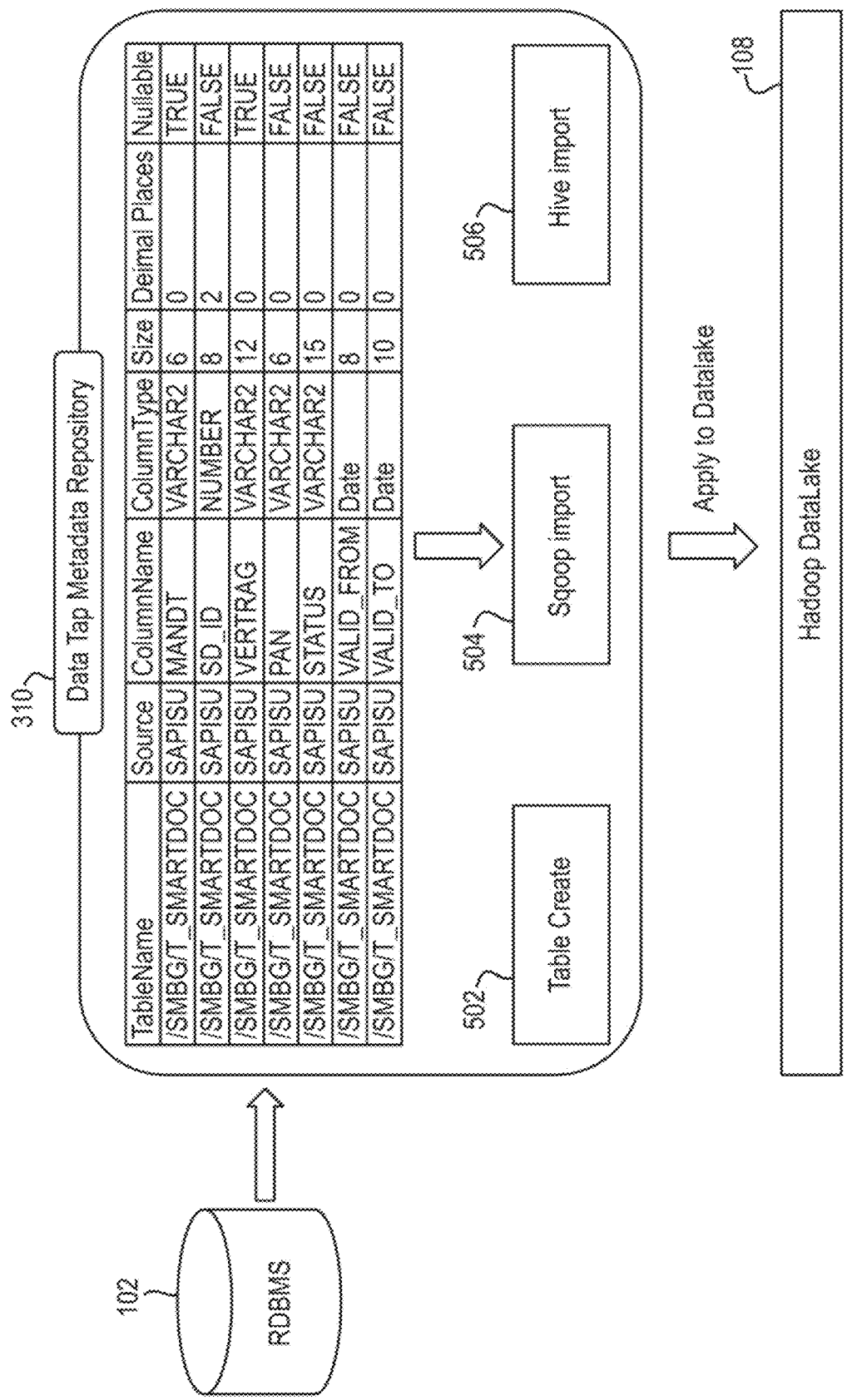
FIGS. 5A and 5B illustrate the use of automatically generated scripts for data import.
Figure 5B:
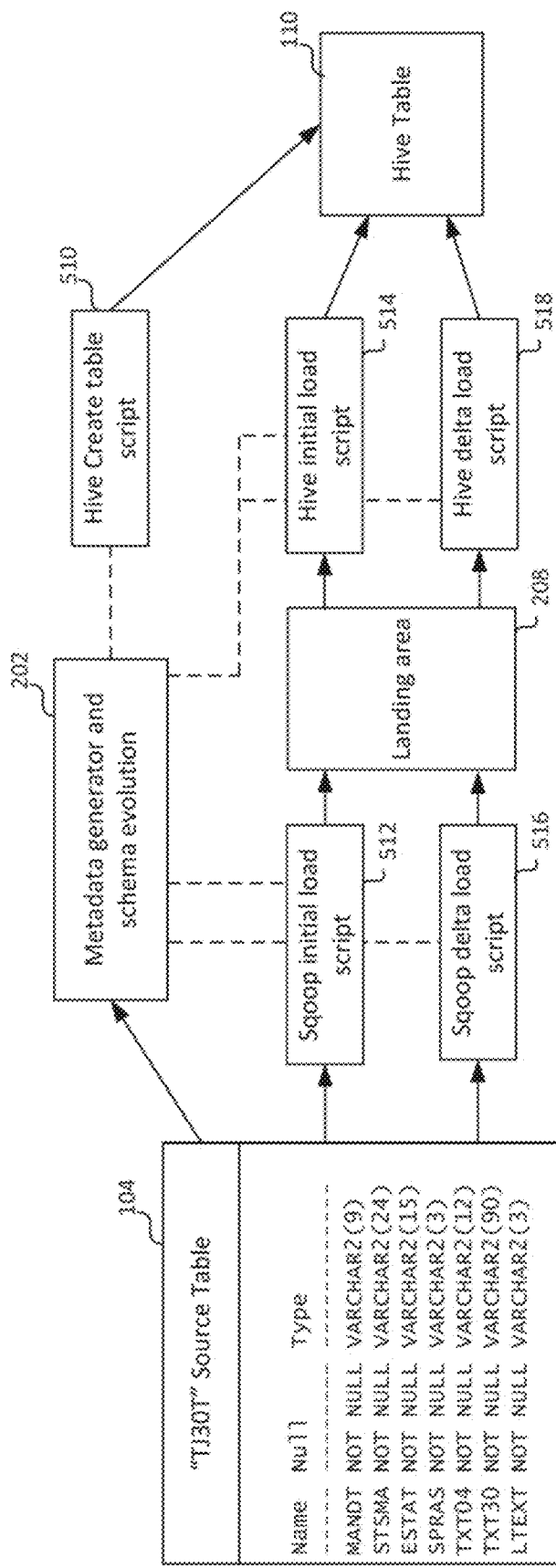

The generation and operation of import scripts is illustrated in further detail in FIGS. 5A and 5B.

FIG. 5A illustrates a set of metadata for a given source table from data source 102 in the metadata repository 310, which is used to generate various scripts, such as table creation 502, Sqoop import 504 and Hive import 506. The scripts are executed to apply schema changes and import data to the data lake 108.

FIG. 5B illustrates a more detailed example, in which a source table 104 with table name "TJ30T" and a set of fields MANDT, STSMA, ESTAT, SPRAS, TXT04, TXT30, and LTEXT is being imported.

The Metadata Generator and Schema Evolution module 202 reads the table schema metadata from the source and generates the following scripts (script generation is shown by the dashed lines in FIG. 5B):
- A HQL script 510 comprising one or more data definition language (DDL) statements for creating the Hive table 110 corresponding to source table 104 in the Hadoop data lake
- A Sqoop initial load script 512 for performing an initial load of the full data of the source table
- A Sqoop delta load script 516 for performing a subsequent delta load from the source table (i.e. for loading a set of differences since last import, e.g. in the form of inserted, updated, or deleted records)
- A Hive initial load script 514 for storing an initially loaded full table data set into the Hive table
- A Hive delta load script 518 for storing a table delta (i.e. a set of differences since last import, e.g. in the form of inserted, updated, or deleted records) into the Hive table After the initial run of the Metadata Generator/Schema Evolution module 202, the Hive create table script 510 is run to create the Hive table 110. Then, the Sqoop initial load script 512 is executed to read the full table contents of the table into landing area 208. After pre-processing (e.g. by the resequencing/cleansing process as described elsewhere herein), the Hive initial load script 514 is executed to store the data acquired by the Sqoop initial load script 512 into the Hive table 110.

For subsequent imports of the table (e.g. this may be done periodically, for example once a day), the Sqoop delta load script 516 is executed to acquire the table delta since last import which is stored in landing area 208. After pre-processing, the Hive delta load script 518 then applies the differences to the Hive table 110, e.g. by applying any necessary insert, update or delete operations. However, in some cases (e.g. if tables need to be regenerated/recovered due to inconsistency or after a failure), the initial load scripts could be run instead of the delta load scripts to import the full table contents into the Hadoop data lake.

The scripts thus together form part of an automated data import process, which is reconfigured dynamically in response to changes in the source data schema, by modification/regeneration of the various scripts as needed.

As previously mentioned, the system maintains templates for each RDBMS source type (e.g. Oracle, Mysql, MS-sql etc.) to enable Sqoop generation. As a result, importing additional tables from existing supported databases for which a template exists requires no development activity. To support new source database systems, additional templates can be added to the code to enable generation of initial and delta load Sqoop scripts.

Examples of scripts generated by the system are set out in the Script Samples below (see e.g. Samples 1-3 provided there). An example of a Sqoop template is shown in Sample 6 of the Script Samples below.

If during a subsequent import the metadata generator/schema evolution module 202 identifies changes to the source schema that affect how data is read from the source database, then the Sqoop scripts 512, 516 are regenerated as needed. Furthermore, if the changes in the source necessitate changes to the Hive table structure, then the Hive scripts 514, 518 are also regenerated as needed, and the Hive table structure is adapted as required (e.g. by executing an "ALTER TABLE" statement or the like).

The following sections provide information on how different source schema changes may be handled.

Addition of a Column

As an example, a column may be added to the source table. Assume the table initially has the structure illustrated in FIG. 5B:

| Name | Null | Type |
|---|---|---|
| MANDT | NOT NULL | VARCHAR2(9) |
| STSMA | NOT NULL | VARCHAR2(24) |
| ESTAT | NOT NULL | VARCHAR2(15) |
| SPRAS | NOT NULL | VARCHAR2(3) |
| TXT04 | NOT NULL | VARCHAR2(12) |
| TXT30 | NOT NULL | VARCHAR2(90) |
| LTEXT | NOT NULL | VARCHAR2(3) |

Subsequently, the following column "COL1" is added to the table:

| Name | Null | Type |
|---|---|---|
| COL1 | NOT NULL | VARCHAR2(10) |

The system then creates an additional column in the Hive table (see e.g. code sample 4 in the Script Samples below). Furthermore the Sqoop and Hive scripts are regenerated to reference the new column (see e.g. code sample 5 in the Script Samples below).

Deletion of a Column

Where a column in the source table schema is deleted, the scripts 512, 516, 514 and 518 are similarly regenerated to no longer reference the deleted column. While the column could then be deleted in the Hive table, in one embodiment, the column is retained but marked as no longer in use. This allows historical data to be retained and remain available for analysis/reporting, but future imported records will not contain the column in question.

Unique Index Change for Table

When one or more new key columns are added, the new key columns are moved to the left-most positions in the Hive schema, as this can be more efficient for map-reduce code to process (e.g. when performing delta calculations as described below), since such processing is typically based on processing primary keys, and hence only the first few columns are frequently parsed and not the entire records. In some embodiments, this change may be performed manually though it could alternatively also be carried out automatically.

Other Changes

Preferred embodiments do not modify the Hive tables or import scripts based on changes in data type related information (e.g. changes of the data type of a table column, changes in column lengths, etc.) as all data has by default been converted and processed as character strings during import. However, if there was a requirement to retain data types, then the described approach could be changed to accommodate this and automatically detect and handle such changes, e.g. by implementing appropriate type conversions.

Difference Calculator

The present embodiments allow changes in source tables to be captured in two ways. Firstly, a change data capture solution can be implemented on the source system to capture change data. This could be implemented within the source database environment, to identify changes made to data tables and export those changes to the Data Tap import tool. However, in some cases, the complexity of such a solution may not be justified and/or the underlying data storage system (e.g. RDBMS) may not provide the necessary functionality.

Data Tap therefore provides a difference calculator tool to avoid the need for implementing such an expensive solution on the source system.

Some of the key features of the difference calculator include:

Scalable/Parallel Execution using Map Reduce Architecture

Automatically recognises the DML Type of Record

Provides framework to re-run on failure or re-commence from failure point

Automatic Creation of Hive Metadata for newly created partitions

Ease of use which minimises development time

The difference calculator can be used provided that the source data can be extracted in a suitable timeframe. It is therefore preferable to use this method for low to medium-sized data sets depending on the data availability requirements.

Generally, the decision on whether to use the difference calculator or a change data capture solution can be made based on the specific data volumes and performance requirements of a given application context. As an example, benchmarks run for a particular implementation have shown that to process 3 TB of data spread across approximately 600 tables will take approximately 6 hours (4 hours to pull data from Source into the lake, 2 hours to run through the Difference Calculator & History Capture Process). In a preferred embodiment, delta processing is performed at source if the table size exceeds 30 GB. This is not a hard limit, but is based on the impact of storage size and processing time on the Hadoop platform.

In one example, if performed at source in an Oracle database environment, then Oracle Golden Gate may be used to process the deltas, and Oracle's big data adapter may be used to stream these delta changes straight to the Hadoop file system where the changes are stored in a file. The system periodically takes a cut of the file, and then Hive Insert is used to update the Hive tables in Hadoop. In this scenario, Sqoop scripts may not be needed to import data from the source.

On the other hand, if the difference calculator is used (e.g. for tables smaller than 30 GB), then the whole table is copied periodically across to the Hadoop HDFS file system using a Sqoop script (e.g. script 512), and the difference calculator then runs on the copied table data.

In an embodiment, both Sqoop and Oracle's big data adapter have been configured to output their files in character string format to enable easier parsing. However, in alternative embodiments this could be changed, so that the native formats are passed across in both Sqoop and Oracle's big data adapter.

Figure 6A:
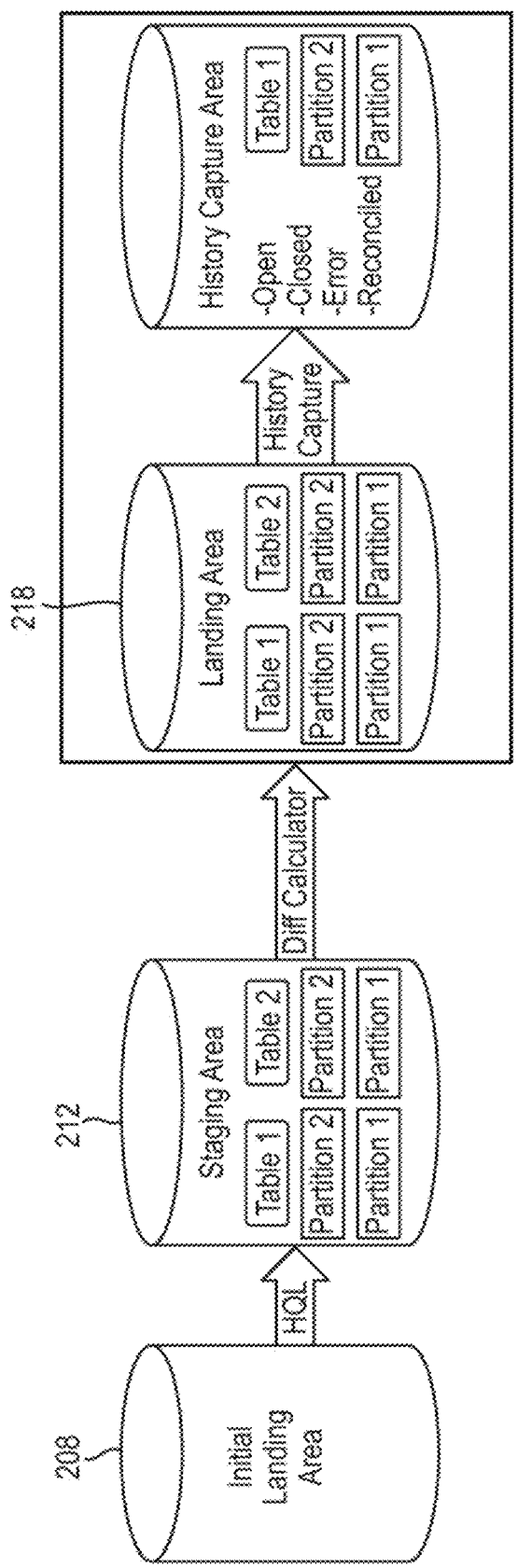
FIGS. 6A and 6B illustrate functional components of a table difference calculator.

The architecture of the difference calculator is illustrated in FIG. 6A.

Data is read from a table in the data source into an initial landing area 208 as previously described. Initial processing/cleansing is performed and the pre-processed data is stored in staging area 212. The difference calculator then compares the table data to a previous version of the table (e.g. a most recently imported version, a copy of which may be maintained by the system) and identifies any differences. The identified differences are saved to landing area 218 and provided as input to the history capture process 220 (see FIG. 2).

Figure 6B:
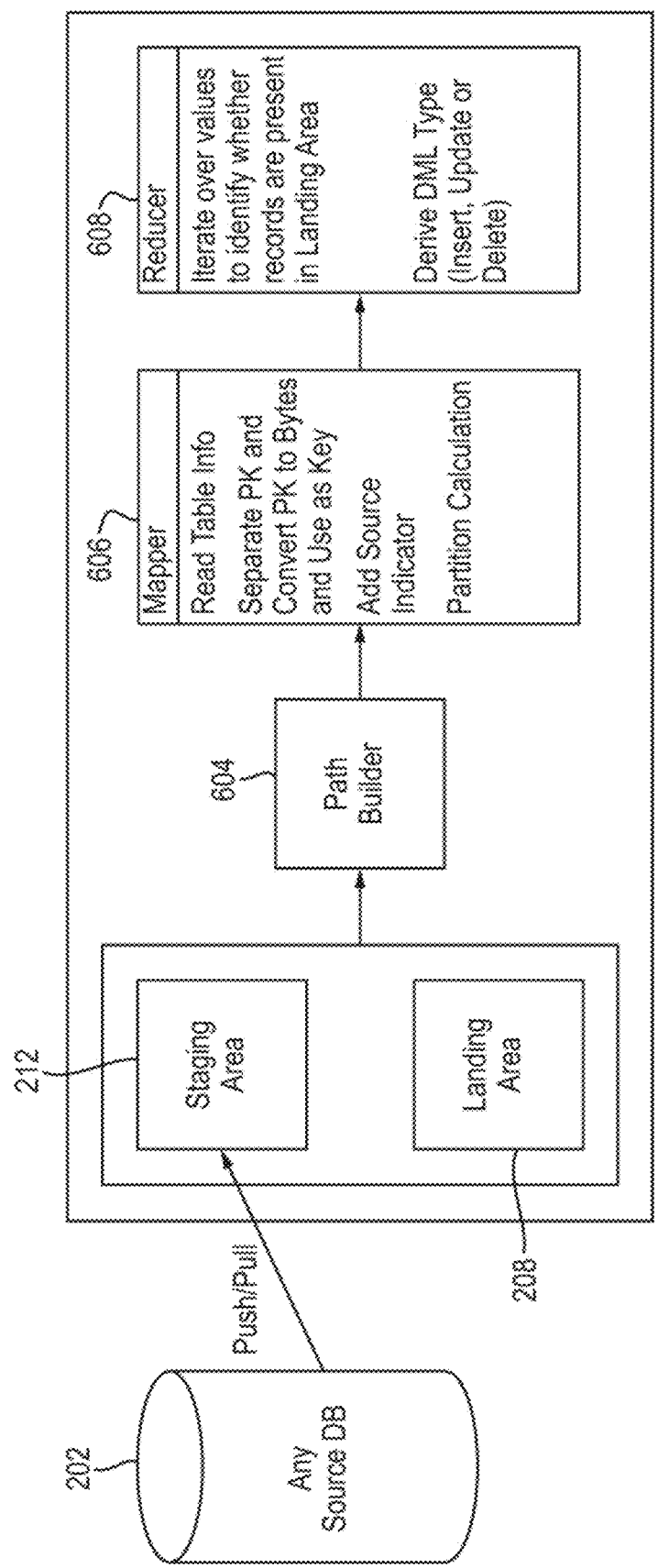

FIG. 6B illustrates the software architecture of the difference calculator process. Table data is read into the staging area 212 (via landing area and pre-processing if required as previously described) using a push or pull transfer model. The difference calculation is implemented in a parallelised fashion using a map-reduce algorithm. To support this, a "Path Builder" component 604 may be provided which is used to construct the directory path names for use by the map-reduce code implementing the Difference Calculator and incorporates the data source and table names. Here, the mapper 606 reads the table information and separates the primary key and uses this as the data key for the map-reduce algorithm. A source indicator is added identifying data source 202, and a partition calculation is carried out. The reducer 608 iterates over values to identify whether records are present in the landing area and identifies the change type (typically corresponding to the DML, data manipulation language, statement that caused the change). The change type is thus typically identified as one of Insert, Update or Delete. The change is stored e.g. with the record key, change type, and old/new values (if required).

Delta processing is performed on a row-by-row basis. The system maintains daily snapshots of the whole source tables (e.g. stored in the Hadoop data lake). Newly imported data is compared to the most recent previous snapshot of the table (corresponding to the time of the last run of the difference calculator) to produce a delta file for the table.

In one embodiment, the system maintains 15 days of old table snapshots on the Hadoop platform. This is one reason for the 30 GB limit employed in one embodiment, together with the time it takes to process the differences between two 30 GB tables. However, the specifics may vary depending on application context and available processing/storage resources.

Figure 7:
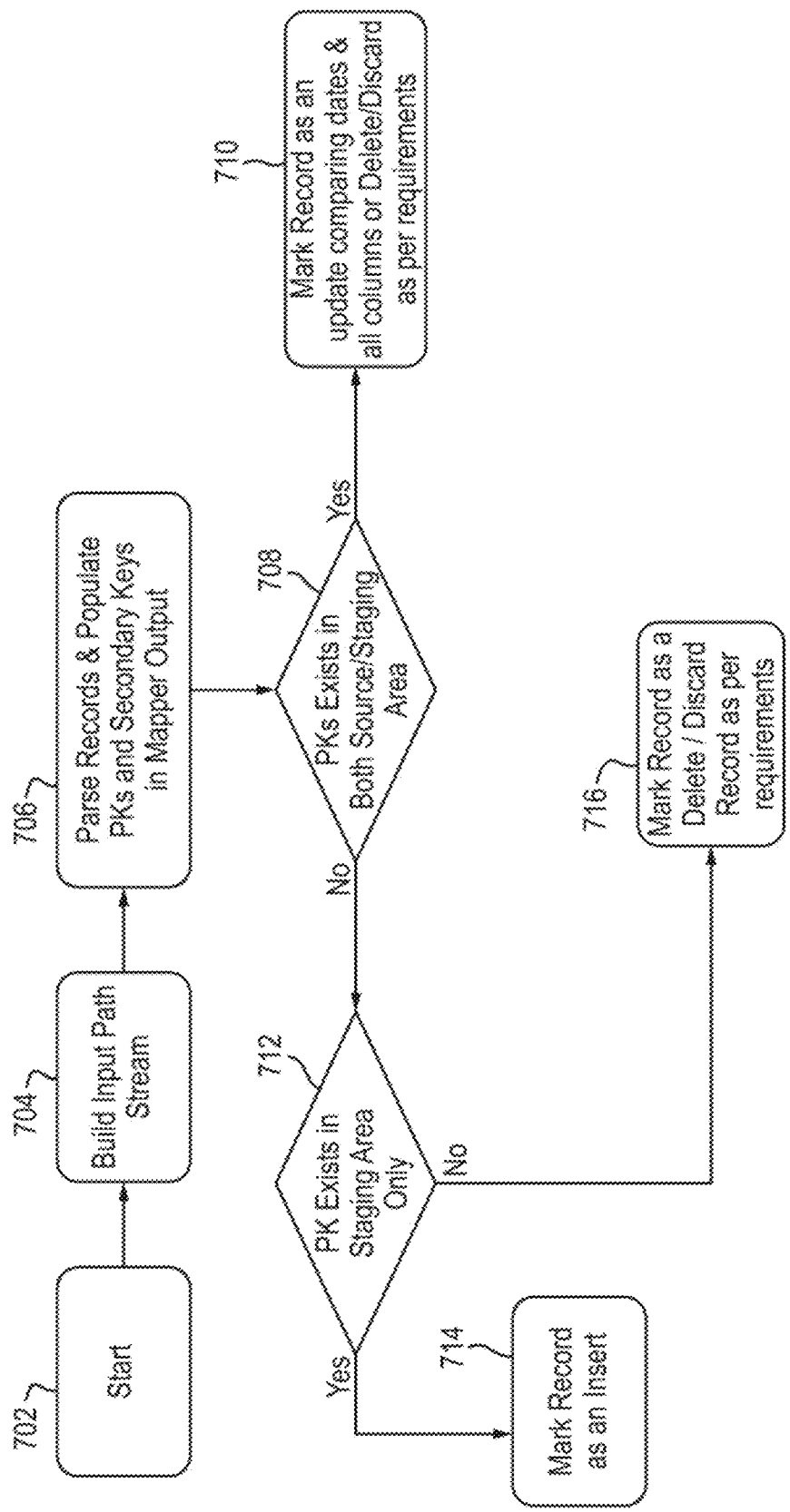
FIG. 7 illustrates the operation of the table difference calculator.

FIG. 7 is a flow chart illustrating the difference calculation process. The process begins at step 702 after a table has been read into the staging area. In step 704 an input path stream is built by the path builder component (in the form of a string containing the directory path name for use by the map-reduce code). In step 706, records in the staging area are parsed and primary key and secondary keys are populated in the mapper output (in an example, a time stamp added during import as part of the management information is used as a secondary key, with the difference calculator sorting the output by primary key and then by the secondary key). In step 708 the system checks whether a given primary key exists in both the current version of the Hive table in the data lake (i.e. as stored in the OPEN database) and the staging area. If yes, then the imported version of the record is compared to the cached version (preferably comparing each column value) and is marked as an update in step 710 if any differences are identified. If not, then step 712 checks whether the primary key exists in the staging area only (and not in the Hive table). If yes, then the record is a new record, and is marked as an Insert in step 714. If not, then it follows that the record exists in the Hive table but not the staging area, and is therefore a deleted record. The Record is marked as deleted in step 716.

Hive Insert is then used to insert the delta rows from the delta file into the Hive tables in Hadoop for any updates marked as "Insert". Similarly, Hive Update commands are used for any changes marked as "Update" to update the values in the Hive table, and Hive Delete commands are used to remove records marked as "Deleted".

Note that these changes occur in the OPEN database. As described elsewhere, the OPEN and CLOSED databases are re-created regularly (e.g. each day) by the History Capture process. Thus, rows which are deleted are no longer present in the OPEN database, but remain in the CLOSED database (with the additional time-stamp related columns updated to reflect the validity periods and reasons). There may be certain circumstances in which certain tables are not permitted to have their rows removed. In these cases the rows remain in the OPEN database but are marked as "Discarded" instead.

Figure 8:
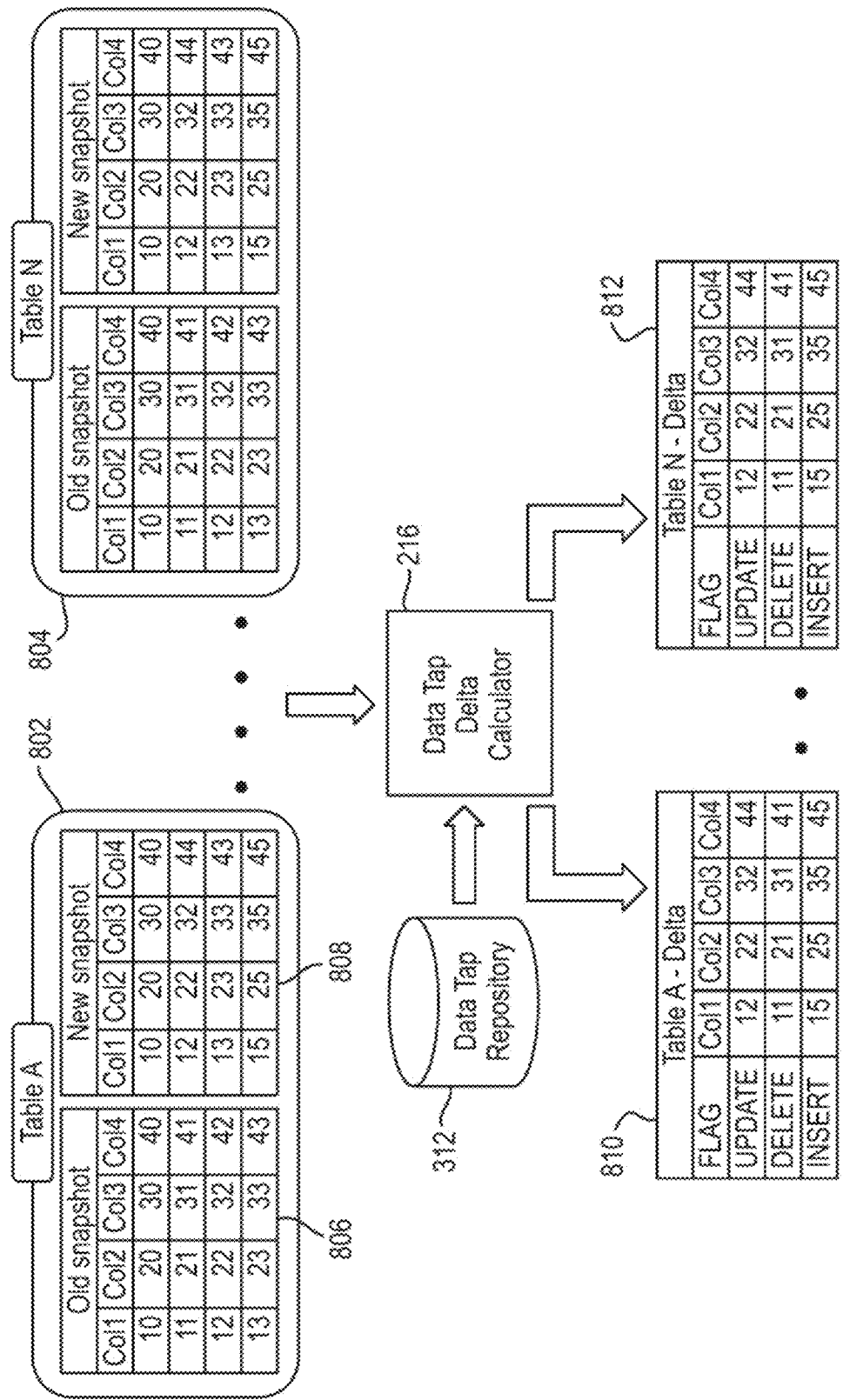
FIG. 8 illustrates an example of a table difference calculation.

FIG. 8 illustrates an example of the delta calculation. Here, a number of tables Table A (802) to Table N (804) are processed by the Delta Calculator 216. In each case, a primary key column (or column combination) is used as the basis for identifying the differences between an old snapshot 806 (previously imported from the data source) and a new snapshot 808 (currently imported from the data source). In this example, column "col1" may, for example, serve as the primary key. The delta calculator identifies the difference between the old snapshot (with old column values) and the new snapshot (with new column values). Here, for Table A, the following differences are identified:

The record with col1=11 is no longer present in the new snapshot

The record with col1=12 has been modified in the new snapshot

The record with col1=15 is newly added in the new snapshot

Thus, entries are added to Table A Delta 810 for each identified difference, with a flag indicating the update type (UPDATE/DELETE/INSERT) and the new column values (for UPDATE and INSERT entries) or the old column values (for DELETE entries). Similar deltas are generated for the remaining tables (e.g. delta 812 for Table N).

The generated table deltas including flags and column values are then used to update the corresponding Hive tables (e.g. via the previously generated Hive delta import scripts).

As previously indicated, the delta calculation process is preferably implemented as a distributed map-reduce algorithm (e.g. running across the Hadoop cluster), making it highly scalable and allowing deltas for multiple tables to be calculated in parallel. The process is configurable and metadata driven (using the metadata stored in the metadata repository 312).

History Capture

Generally, after the initial import from a new data source has occurred (via the initial load scripts) and the relevant structures have been created in the data lake for the imported data, subsequent updates are performed incrementally (using the delta load scripts and difference calculator as needed), to capture changes in the data sources and apply those changes to the data lake (see FIG. 5B). In some embodiments, such updates could occur on an ad hoc basis (e.g. in response to operator command) or on a scheduled basis. In the latter case, the update schedule could differ for each data source.

However, in a preferred embodiment, for efficiency and to ensure a degree of data consistency, a coordinated approach is adopted, in which all data sources are updated on a periodic basis. In this approach, delta load is performed on a periodic basis, e.g. daily, from each of the imported data sources, and the OPEN and CLOSED databases are updated accordingly. This periodic update is coordinated by the History Capture process.

History Capture is a process which is run intermittently, preferably on a regular basis (e.g. daily, for example every midnight) to create the snapshot of the current stable data in the data lake.

In an embodiment, the History Capture process is implemented as a Java map-reduce program which is used to update the two main operational databases, namely OPEN and CLOSED. The process uses the output from daily delta processing (e.g. from the Data Tap Difference Calculator as described above, or from table deltas provided by the source databases e.g. via the Oracle Golden Gate/Oracle Data Integrator feed). It then determines which rows should be inserted, updated, or deleted, and creates a new set of database files each day for both the OPEN and CLOSED databases. As part of this process every table row is time-stamped with five additional columns of management information, namely:

jrn_date—time-stamp from the source system database (for Oracle Data Integrator feeds this is from the source system journal database, for DataTap feeds this is when the Sqoop import script is run to copy the source system database)

jrn_flag—indicator whether the record is an: INSERT, UPDATE, or DELETE tech_start_date—time-stamp when this row is valid from, i.e. when History Capture has inserted or updated this new record.

tech_end_date—time-stamp when this row is valid until, i.e. when History Capture has updated (overwritten), deleted, or discarded this old record. In the OPEN database all rows are set to a high-date of 31/12/9999.

tech_closure_flag—reason this old record has been removed: UPDATE, DELETE, DISCARD.

In a preferred embodiment, neither of the actual databases (OPEN and CLOSED) are updated, rather the Java M/R will re-create a new version of the database files for both the OPEN and CLOSED tables, each with the five time-stamp related columns updated to reflect validity periods of the rows.

The "tech_start_date" and "tech_end_date" columns effectively describe the dates and times between which a particular row is current. These dates are used to ensure the current version received from the source system is stored in the OPEN database holding the current view of the data. When any updates/overwrites or deletes are detected as part of the history capture process, old rows are removed from the OPEN database and added to the CLOSED database with the appropriate time stamp.

Thus, after the delta import and History Capture processes are complete, an updated OPEN database will hold a currently valid data set comprising data from the various imported data sources, while the CLOSED database will hold historical data.

By way of the described processes, changes made in the source database automatically propagate through to the data lake. This applies both to changes of data contained in a given table, as well as changes in the data schema.

For example, if a column was added to a table in a data source, only records since the addition may have a value for that column in the data source, with other records holding a "null" value for that column. Alternatively, values may have been added for the column for pre-existing records. In either case, the null or new values will propagate to the OPEN database in the data lake (which will have been suitably modified to include the new column). The latest version of the source data tables is then available in the OPEN database, and any previous version is moved to the CLOSED database. The CLOSED database will retain all data lake history including what the tables looked like before the changes made on a particular date.

Note that in some cases source databases may already include history information (e.g. by way of date information held in the source tables). Such application-specific history information is independent of the history information captured by the History Capture process and will be treated by the system (including Data Tap) like any other source data. Such information would thus be available to consumers in the data lake from the OPEN Database in the normal way.

The History Capture process responds to deletion, overwriting or updating of any information in the source (regardless of whether the information corresponded to historical data in the source), by moving the old version to the CLOSED database with timestamps applied accordingly.

Table Analyser

Referring back to FIG. 1, the Table Analyser tool 107 provides functionality for analysing the data contents of tables imported into the data lake in order to identify relationships between tables. Typically, the relationships identified are of the nature of a primary key to foreign key relationship, i.e. a relationship between a primary key in one table and a corresponding foreign key in another table. Such relationships are commonly used to represent one-to-one and one-to-many entity relationships in relational data schemas (with many-to-many relationships usually modelled using auxiliary mapping tables).

In the following examples, for simplicity and clarity, a candidate key (whether primary or foreign) is generally assumed to correspond to a single column of a database table. However, a candidate key may alternatively include multiple columns from a table (e.g. concatenated to provide the key value). More generally, a key could correspond to any value derived in any suitable fashion from one or more columns of a table. A candidate relationship is defined between multiple candidate keys (typically but not necessarily from different tables), where candidate keys may perform a primary key or foreign key function in a respective table. The Table Analyser evaluates candidate relationships in a given set of tables to quantify a strength of the candidate relationships (indicating a likelihood that these correspond to actual relationships), and identifies possible relationships based on that evaluation.

Figure 9:
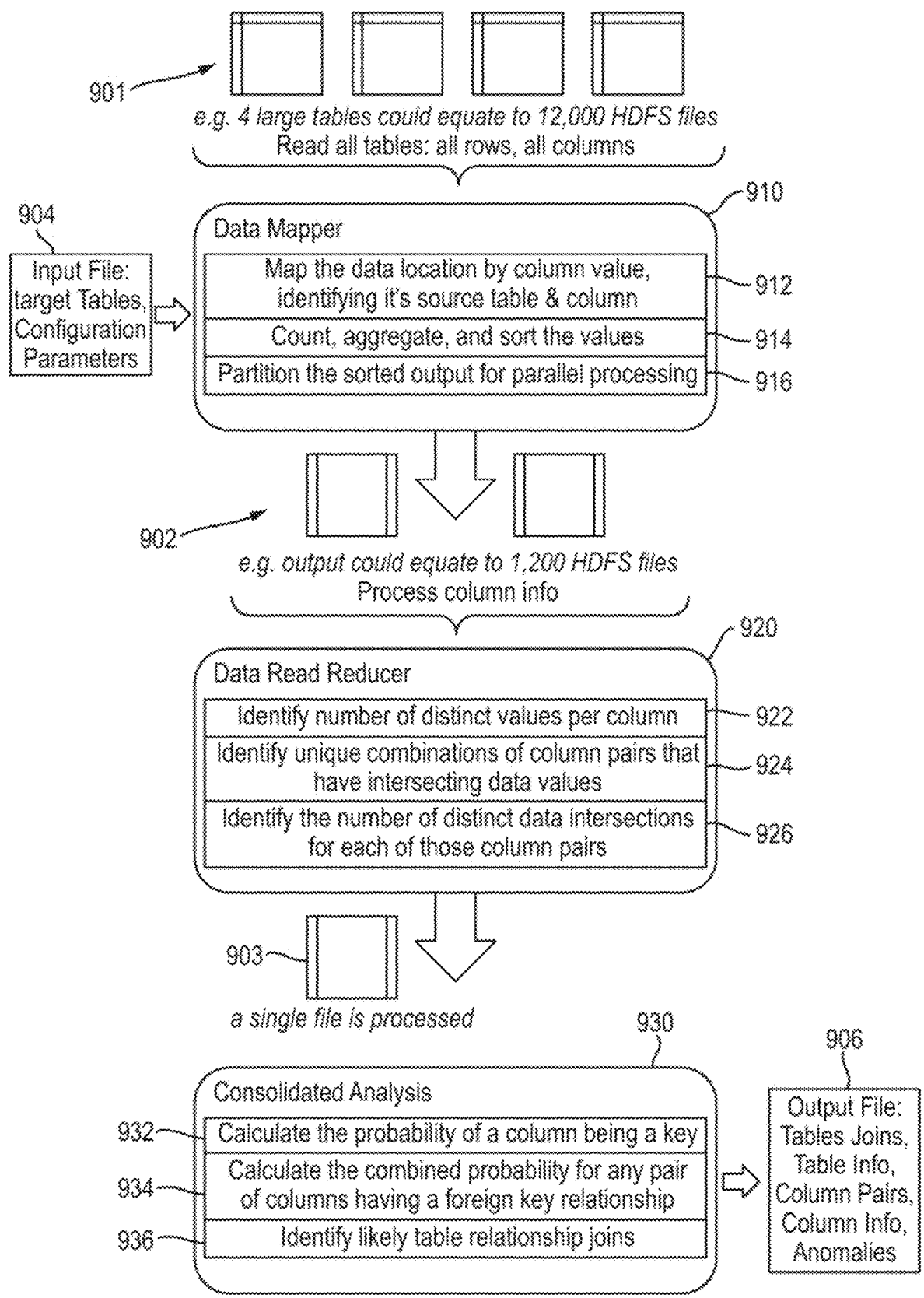
FIG. 9 illustrates a table analysis process for automatic discovery of relationships between data tables.

The process performed by the Table Analyser to identify relationships is summarised in overview in FIG. 9. The Table Analyser operates based on a set of input files 904 including the source tables 901 as well as any configuration data.

The set of tables 901 for which relationships are to be identified may, for example, be specified by a user when invoking the Table Analyser (e.g. via a user interface), as parameters in a scripted invocation, in a configuration file or in any other suitable way. The tables are stored in the data lake 108 as described above.

A data mapper module 910 (which comprise multiple mappers executing in parallel) reads the table data for all identified tables. A given table consists of a number of rows (corresponding to records of the table) and a number of columns (corresponding to individual data fields within those records). Each data field in a record may contain a data value (in accordance with some data format, e.g. string, integer, data etc.) or may (if the table definition allows) be null, indicating that no value is stored there.

In step 912, a map table is generated in which all the data values from the input tables are mapped to their source column locations. The generated map table thus includes a set of entries where each entry specifies a particular value appearing in one of the source tables together with information identifying the source table and column from which that value was read.

In step 914, aggregation is performed to aggregate map table entries for the same value from the same source column. A count is added to each aggregated entry indicating the number of occurrences of the given value in the given column. The table is then sorted on the data values.

In step 916, the sorted information is partitioned for parallel processing. As a result, the aggregated map entries generated in step 914 are split across a number of data files 902 for subsequent processing.

A Data Read Reducer module 920 then operates in parallel on the data files 902 to determine statistical information relating to the columns of the input tables. Firstly, in step 922, the number of distinct values per column is identified. In determining this, repeated occurrences of the same data value in a column (i.e. where the data value appears in that column across multiple rows) are counted as a single distinct value. In step 924, the process identifies pairs of columns that have data values in common (i.e. where a value appearing in one column also appears somewhere in the other column of the pair). Such data values are referred to herein as intersecting data values for the column pair. In step 926, the number of distinct intersecting values for each column pair are determined (as above, here "distinct" means that multiple occurrences of the same shared value are counted as a single distinct intersecting value).

The results of parallel execution of the Data Read Reduce reducer component 920 are combined into a single analysis file 903. The analysis file thus now contains statistical information concerning the data values in the source columns as well as intersecting values in respective pairs of columns.

Based on this data, the consolidated analysis module 930 computes for each source column the probability that the column is a key column for its table in step 932. A key column is generally taken to be a column that identifies a particular record within a table. Thus, when serving as a primary key, such a column generally includes a unique value for each record, uniquely identifying that record. However, it should be noted that the data sets may be imperfect and/or include duplication so a column may not need to have strictly unique values to be considered a potential key column. The present approach thus considers both primary keys in the strict sense (where each record includes a distinct identifying key value) and columns with large proportion of distinct values as candidate keys.

In step 934, the process calculates for each possible pairing of source columns, the probability that the pair of columns exhibits a foreign key relationship. For example, this may indicate that a particular column in one table, which may be a primary key for that table (e.g. a customer identifier in a "customers" table), may be related to a column in another table (e.g. where an "orders" table includes a customer identifier as a foreign key for each order).

The probability is determined based on the respective probabilities that the columns are keys for their respective tables (as determined in step 932) and on the degree of overlap or intersection between the columns (as set out in more detail below) and is referred to herein as the "combined probability" for the column pair. The combined probability for a column pair can be taken as expressing a level of confidence that there is a relationship between the columns, or alternatively may be understood as an indication of the strength of the relationship between the columns.

In step 936, an output file 906 is generated including information on identified table relationships. The analysis component may rank identified relationships based on strength and could additionally classify column pairs into different classes of relationships based on the probability or strength of relationship (e.g. strong relationship/weak relationship/no relationship likely to exist) and includes the classification/ranking information in the output file.

The identified relationships may, for example, serve as the basis for join queries performed during data analysis tasks (e.g. by analytics module 112) as described in more detail later.

In this example, the algorithm is divided (at least conceptually) into distinct components or modules, including the data mapper component 910; data read reducer component 920 and consolidated analysis component 930. However, the algorithm may be structured in any appropriate manner. Similarly the division into "steps" is for illustrative purposes and in practice, implementations may structure the processing differently and the order of steps may be varied.

In preferred embodiments either or both of the mapper and reducer components may be parallelized (with multiple mappers and reducers operating in parallel in the Hadoop cluster), preferably implemented as a map-reduce algorithm using the Hadoop map-reduce architecture, whilst the analysis component 230 operates as a single process. However, it should be noted that the fundamental algorithm may be implemented in any appropriate manner (including in a serialized form or in alternative parallel implementations).

Processing Example

The analysis process set out above will now be described in more detail using a concrete example. The data being processed in this example is illustrated in FIGS. 10-14A for different processing stages.

FIG. 10 illustrates step 912 of FIG. 9, in which the data values are mapped to their column locations, identifying the source table and column for each data value.

In this example, two source tables 1002 ("Table 1") and 1004 ("Table 2") are being processed, each including three rows (numbered 1-3) and three columns (labelled A-C). Note that the number of rows and columns are exemplary only and the tables need not have the same number of rows or columns. Also, the column labels A-C are arbitrary labels used for illustrative purposes (in practice each table will comprise a respective set of named columns). As described previously, each table may be partitioned across multiple files in the HDFS. Thus, in this initial step of the mapping phase, the files that make up the source tables may be processed in parallel (in this implementation using Java Map-Reduce and/or Spark).

For each selected table, the individual data values from every column in every row are mapped to their table and column location. Special values such as null and other predefined exceptional values are processed as exceptions and are not treated as ordinary data values in the computations described below.

Preferably, the exceptions are defined in a configuration file which specifies values to be ignored from the processing to improve performance and accuracy. In addition to ignoring specific values, particular columns may be ignored (e.g. based on detected characteristics of the column). For example, the tool may be configured to ignore columns that only contain a single value, as this adds nothing to the accuracy and improves performance. Another example is to ignore the management data columns that are added as part of the Data Tap ingestion process, as these were not part of the source data, and might skew the results. Additionally, for certain data sources, some columns are found to contain lots of zeros as text strings; hence in such circumstances the tool could be configured to ignore any column value containing three or more zeros. The exceptions may be configured in any suitable fashion, e.g. by specifying particular values to be excluded or by providing expressions that can be evaluated (or other executable code) to determine whether a given value or column matches an exception.

Additionally certain summary data is captured, such as the amount of ignored data (e.g. in terms of the number of ignored values and/or the number of ignored bytes of data), for each column and for each table.

The mappings are recorded in map table 1006. The main section 1008 of the map table includes entries for each data value appearing in one of the source tables, with the data value specified in the "Value" column. The table location from which the value was read is stored in the location ("Loc") column. Here, the location is specified by a location reference that indicates both the source table (Table 1 "T1" or Table 2 "T2") and the column within that table (A, B or C) from which the data value was read. Thus, "T1A" indicates column A in Table 1, "T2C" indicates column C in Table 2, and so on. In practice, any appropriate encoding or referencing may be used to identify the source table and column of each value.

At this stage, the entries appear in the table in the order they were processed (here row-by-row and left-to-right in table 1, followed by the same for table 2), with an entry added to the map table as each data value is read.

Additionally, accumulated statistics are stored in sections 1010 and 1012 of the output.

Section 1010 includes column statistics, specifying for each column (identified by its column code):

- The number of non-null values appearing in that column (repeated values are counted separately; in other words this is the number of records having any non-null value, not a count of distinct values). Values other than "null" defined as exceptions to be ignored are preferably also excluded from this count.
- The number of null values appearing in that column (i.e. the number of records for which the corresponding field has a "null" or unspecified value)
- The number of records whose value in the relevant column matches an exception and is being ignored in the processing.

Section 1012 includes table statistics for each table, specifying the table identifier, total number of rows processed for each table and the number of ignored rows.

In addition to the data indicated above, other accumulated column-specific or table-specific statistics or summary information may be collected in sections 1010 and 1012.

Here, the output for all sections 1008, 1010 and 1012 in depicted as contained within a single map table 1006 (with entries differentiated by a "value", "col" or "table" indicator in the "Type" column, indicating the different sections for value data, column statistics and table statistics respectively). However, in alternative embodiments, the different sections may be stored in different data structures. For example, value data 1008 may be stored in the main map table, with statistics 1010/1012 stored in one or more separate data structures. Furthermore, the output 1006 may be stored in a single file or may be split across multiple files.

Whilst a single mapper output is shown in practice the mapping step is typically performed in parallel by multiple mappers operating on respective tables or (for partitioned tables) respective table partitions. Each mapper then produces a respective map table 1006 based on the subset of data processed by that mapper.

Figure 11:
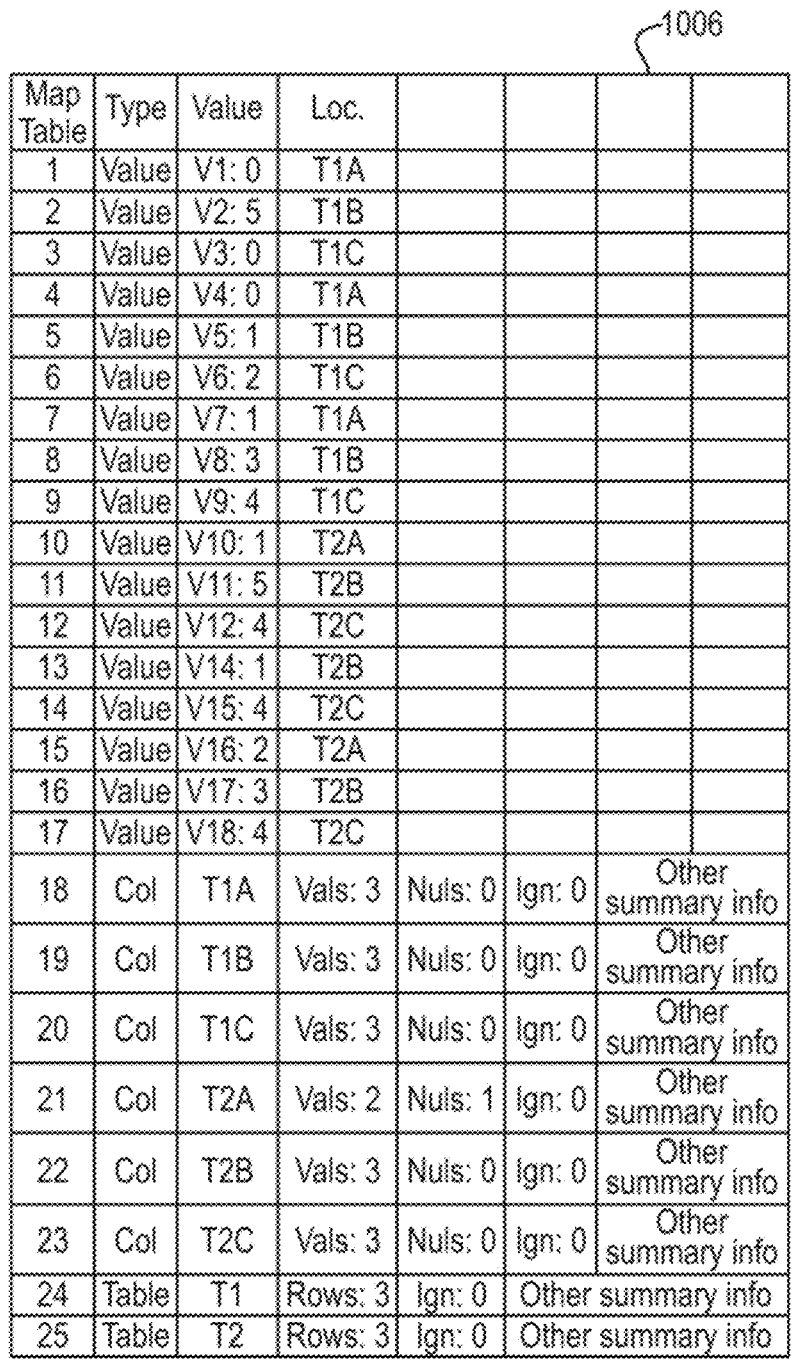

FIG. 11 illustrates step 914 of FIG. 9, in which the map table entries are aggregated, counted and sorted.

In this step each of the map table files produced in the previous step are again processed, preferably in parallel (in this implementation using Java Map-Reduce and/or Spark). The individual data values in each file are counted by location and sorted. The column and table summary data is not modified in this step but is simply passed through to these aggregated files.

In FIG. 11, table 1006 corresponds to the map table output by the previous step, and table 1100 shows the processed map table. It can be seen that the entries from table 1006 have been aggregated on the value and location identifier fields, so that the aggregated table 1100 now includes a single entry for each distinct combination of data value and source column, with a "count" field added indicating the number of occurrences of that value in that specific column.

For example, row "1" in table 1100 indicates that the value "0" occurs twice in Table 1 Column A ("T1A"). The table has been sorted by data value (i.e. the contents of the "Value" field).

FIG. 12 illustrates step 916 of FIG. 9, in which the output from the previous step is partitioned into multiple data sets for parallel processing.

The files are divided so that no value key spans more than one file. In a preferred implementation, the number of files output is about 10% of the number of files input at the start of the phase, although this is configurable.

In the example, aggregate table 1100 (representing the output from the previous processing stage) is split into two files 1202 and 1204. The file 1202 includes entries 1-6 from table 1100, whilst file 1204 includes entries 7-14. Entries for each particular data value (as recorded in the "Value" column) are kept together in a single file of the output so that they will be processed by the same process in the next stage. The summary data is divided across the output files based on the Java Map-Reduce partitions (here only the final row of the summary data, row 22, is shown for clarity).

FIG. 13 illustrates steps 922, 924 and 926 of FIG. 9 to calculate relevant statistics for columns and column pairs.

In this step the files (in the example files 1202, 1204) output by the previous step are preferably processed in parallel (in this implementation using Java Map-Reduce and/or Spark). The results are then combined into analysis file 1300, where necessary aggregating partial results calculated for individual files.

Firstly, the number of distinct values appearing in each column is determined by counting the number of entries for each specific table column in each input file 1202, 1204. In this example, column "T1C" has one entry in File 1202 and two entries in file 1204. Since each entry corresponds to a distinct data value, this means that column T1C has three distinct values in total. The generated analysis file 1300 includes an entry for each column in the original source tables (see entries 1302 in the analysis file 1300), each entry including the column identifier and a distinct value count ("Distinct" field).

Secondly, the number of distinct intersecting values are computed for each possible pairing of columns having at least one common value. Distinct intersecting values are distinct values that appear in both columns of a given pair (i.e. only unique value matches between columns are counted as distinct intersects). Hence in the present example tables, "T1A" (table 1 column A) has only one distinct intersecting value with "T1C" (table 1 column C), namely value "0", whereas "T1B" (table 1 column B) has three distinct intersecting values with "T2B" (table 2 column B), namely values "1", "3", and "5".

In one embodiment, these values can be calculated by cycling through the data values in the input files 1202, 1204, and for each data value listed in the "Value" column, determining the possible column combinations that share that value and incrementing a counter for each column combination. For example, file 1202 shows that value "1" appears in four columns (T1A, T1B, T2A and T2B) and there are six unique column pairings of those four columns (where ordering is not relevant i.e. <Column 1, Column 2> is the same pair as <Column 2, Column 1> and a column cannot be paired with itself). The six possible pairs which have value "1" in common are therefore <T1A, T1B>, <T1A, T2A>, <T1A, T2B>, <T1B, T2A>, <T1B, T2B>, <T2A, T2B>. Thus a counter for each of those table pairs is incremented (prior to this step counters are initialised to zero for each possible column combination). Counters from individual processing passes for respective files 1202, 1204 are then aggregated (summed) when generating final output 1300. Here, file 1202 shows one distinct value for column pair <T1B, T2B> (value "1") whilst file 1204 shows two ("3" and "5"), and hence the total number of distinct intersecting values for that column pair is determined as three.

Preferably, only unique combinations of pairs of columns with distinct intersecting data values are reported in the output. Column pairs with no intersecting values are preferably not included in the output. The output is added as a set of entries 1304 in the output file 1300, with one row for each column pair having at least one intersecting value (see rows 7-15), each entry identifying the column pair and the number of distinct intersecting values.

The column and table summary data 1306 continues to be passed through to the single sorted output file for later analysis in the final phase (here only row 22 is again shown for clarity). Once again, the sections 1302, 1304 and 1306 are shown as sections of a single file but alternatively these could be stored in separate files/data structures.

FIG. 14A illustrates the final analysis phase (steps 932, 934 and 936 of FIG. 9).

In this final phase the single analysis file 1300 produced in the previous step is processed.

The probability for any given column being a key is calculated and is referred to herein as the Key Probability (KP). In a preferred embodiment, this is computed as the number of distinct valid values (values which are not null and which are not ignored for other reasons e.g. based on defined exceptions) divided by the total number of non-null, valid values in the column (or alternatively by the total number of rows in the column, i.e. including null or invalid entries). Thus the Key Probability gives an indication of the distinctness or spread of values in the column; columns with many repeated values will have a low KP value whilst columns with little repetition will have a high KP value. In the case of a true primary key field each value in the column will be distinct, so that the number of distinct values will equal the total number of values and the KP will therefore equal 1.

After computing KPs for each column, each possible column pair will have two Key Probabilities associated with it (one for each column). These are referred to herein as the Left Key Probability (LKP) for the first column of the pair, and Right Key Probability (RKP) for the second column of the pair. A Maximum Key Probability (MKP) is identified as the greater of the LKP and RKP for the pair. The MKP thus provides an indication of the likelihood that one of the columns of the pair may act as a primary key column for its table.

For each column pair, respective ratios of the number of distinct intersecting data values of the column pair to the total number of distinct values within each column are also calculated. These are referred to herein as the Left Intersect Probability or LIP (number of distinct intersecting values divided by total number of distinct values in the first column of the pair), and Right Intersect Probability or RIP (number of distinct intersecting values divided by total number of distinct values in the second column of the pair). A Maximum Intersect Probability (MIP) is then determined as the greater of the LIP and RIP. The MIP provides an indication of the degree of overlap in the information contained in the respective columns of the column pair, where high overlap might be taken as representative of a relationship between those columns (e.g. a primary-foreign key relationship). In the above computations, null values and other defined exceptions (invalid values) are preferably not counted in any of the counts of "distinct" values.

A Combined Probability (CP) is then computed based on the MKP and MIP. In one example, the CP is computed as a product of both the MKP and MIP and represents the combined probability of a join-type relationship existing between the columns (or alternatively the CP may be taken as indicative of a relationship strength).

In one embodiment, the calculation of the CP is carried out only if the MKP and/or MIP values meet predetermined criteria. The criteria may be expressed in terms of minimum thresholds for MKP and/or MIP. Column pairs below the threshold(s) are marked as unlikely to exhibit a relationship and are not further considered (in an example, pairs having MKP and MIP values below 0.1 are marked as unlikely.) The thresholds and/or other criteria applied are preferably specified in configuration data.

Note that the specific calculations are provided by way of example, and alternative statistics may be used or the calculations of the various indicators may be varied depending on requirements, the nature of the data, and other factors. For example, the CP could be computed as a (possibly weighted) sum of the MKP and MIP, or the maximum or minimum of the MKP and MIP may be used as the CP. Similarly, the LKP and RKP one the one hand, and the LIP and RIP on the other hand, may each be combined in some other way (e.g. as weighted sums) to derive the MKP/MIP values (instead of selecting the maximum of the left and right values).

The statistics computed are summarised below, with reference to FIG. 14B which shows a Venn diagram illustrating the overlap between column values for two columns A and B. Here, "a" represents the set of distinct valid (non-null and not excluded) values that appear in column A, whilst "b" represents the set of distinct valid (non-null and not excluded) values of column B. Intersection "c" represents the set of unique intersecting values; that is, distinct valid values that are common to (appear in both) column A and column B. The computed statistics are as follows:

Key Probability (KP) is the number of distinct valid values divided by the total number of valid values/records for a given column.

Left Key Probability (LKP) is the probability of Column A being a key (i.e. the KP value computed for Column A).

Right Key Probability (RKP) is the probability of Column B being a key (i.e. the KP value computed for Column B).

Maximum Key Probability (MKP) is the greater of LKP and RKP.

Left Intersect Probability (LIP) is the ratio of distinct valid intersected values (c), to the total number of distinct valid values in column A (i.e. in the set a).

Right Intersect Probability (RIP) is the ratio of distinct intersected valid values (c), to the total number of distinct valid values in column B (i.e. in the set b).

A Maximum Intersect Probability (MIP) is the greater of LIP and RIP.

The Combined Probability (CP) is a product of MKP and MIP.

The column pairs are then ranked based on the CP, which takes a value between 0 (low relationship probability) to 1 (high relationship probability), to identify column pairs more or less likely to exhibit relationships. A rank value indicating the ranking for a column pair compared to other analysed column pairs may be computed and stored for each column pair (e.g. as a simple number sequence ascending or descending in rank order).

Note that, as mentioned above, CP may be calculated only for qualifying column pairs meeting certain criteria, with others marked as unlikely relationship candidates, with subsequent processing (e.g. ranking) only performed for qualifying column pairs.

Furthermore, for each distinct pair of tables (here there are only two input tables so there is a single pair), an indicator of the likelihood of a relationship existing between the tables may be determined. In a preferred embodiment, this is based on the best/strongest column relationship (highest CP value) between the columns of the tables.

The computed data is added to the output file 1400. In this example, the output file includes:

Entries for each table with the table identifiers (rows 1-2)

Entries for each table column (rows 3-8) each associated with the column identifier, and the Key Probability (KP) calculated for the column An entry (row 9) may optionally be provided for one or more (or each) table pair(s) (here the only pair is T1, T2) giving the key and intersect probabilities and a rank value indicating the strength of relationship, based on the strongest column relationship between the tables. In one embodiment, this information is not included explicitly in the output at this stage, but related table pairs are inferred from the strongest column relationships between tables.

Entries (rows 10-13) for each column pair where a relationship may exist (e.g. where a CP was calculated), with the calculated probability values and calculated rank value. In preferred embodiments, all the intermediate calculated metrics (LKP, RKP, MKP, LIP RIP, MIP and CP) are stored (though alternatively only some of the data may be retained)

Entries (rows 14-18) for each column pair determined unlikely to exhibit a relationship (e.g. for which no CP was calculated due to low MKP and/or KIP values), optionally with the other calculated metrics as above The summary data carried through from earlier processing (only the final row is shown for clarity)

Each possible column pair essentially defines a candidate relationship, with the various computed metrics (especially the CP value) indicating a relationship strength of the candidate relationship (e.g. the higher the CP value, the stronger is the potential relationship between the columns). The final output file thus identifies the most likely candidates for relationships between columns (including statistical and ranking information to allow further evaluation of the relationships).

In the example depicted in FIGS. 10-14, the Table Analyser operates on two input tables, but in practice it may operate on any number of tables (within processing capacity constraints) to identify column relationships between any pairs of columns across the input tables. The size and number of input and output files are also purely exemplary. The data volume processed and degree of parallelization may be varied depending on requirements and available processing resources.

The approach described above is capable of identifying relationships between any two columns in the input table set, including between different columns of the same table (and thus in principle the algorithm could be run on a single input table). Such relationships may be useful, e.g., in database optimisation.

However, alternatively the Table Analyser could be constrained to identify relationships only between columns from different tables (i.e. a candidate relationship would be defined by a column pair comprising one column from one table and a second column from a second, different table). Such relationships correspond to the primary-key to foreign-key relationships frequently employed in relational database models to join different tables when performing queries. In that case, column combinations from the same table may be disregarded from the set of candidate relationships considered which may reduce the processing burden.

The described algorithm relies on comparison of data values between columns of tables which may have originated from different data sources (and hence have used different data formats or representations for similar data). In a preferred embodiment, the Data Tap tool 106 standardises data formats during import into the data lake. This may involve converting all data to a single data type (typically String), preferably using consistent representations for source data types (e.g. a consistent string representation of Time/Date values) regardless of source representation. This approach can improve the ability of the Table Analyser to correctly identify matching data. However, alternatively (or additionally), data conversion or formatting may also be performed by the Table Analyser (e.g. during the initial reading/mapping step 912) to ensure data values are in a consistent data type and format allowing effective comparison.

The output of the Table Analyser (as represented by output table 1400 in FIG. 14A) can be used in subsequent analysis of data in the tables. For example, data from disparate sources may be automatically combined and further processed/analysed. In one particular application, the output data of the Table Analyser may be used in the creation of queries on the data imported into the data lake 108 (see FIG. 1). A Query Builder tool 113 is provided to assist in the creation of such queries and will be described in more detail below.

Extensions for Composite Keys and Partial Matching

In the above examples, relationships are defined between individual columns of respective tables. This may be extended to allow for composite keys as follows.

FIG. 14C illustrates example tables where multiple fields (columns) are needed to define a unique key capable of identifying individual records of the table. Here, in Table 1, fields ID1 and ID2 are both needed to uniquely identify a row, while in Table 2, fields ID3, ID4, and ID5 are all needed to uniquely identify a row. Where combinations of fields uniquely identify records the column combination is referred to as a composite key.

Where each field of a composite key is a key in its own right, such a composite key is also referred to as a compound key. An example is shown in FIG. 14D, where columns ID1, ID2, and ID3 are all needed to uniquely identify a row in Table 4 (thus acting as a compound primary key for that table), but each column also acts as foreign key with regard to another table (see relationships labelled Rel1, Rel2, Rel3). FIG. 14E shows a further example, where ID5 and ID6 are both needed to uniquely identify a row in Table 5 and are related by relationships Rel5 and Rel6 to corresponding columns of Table 6.

Applying the previously described algorithm to the example of FIG. 14D, the algorithm would identify fields ID1, ID2, and ID3 as strong primary key candidates in Tables 1, 2, and 3, and that they have a high ratio of distinct data intersects with fields ID1, ID2, and ID3 in Table 4. Hence the algorithm will correctly identify relationships Rel1, Rel2, and Rel3.

In the Example of FIG. 14E, the above algorithm would identify the fields ID5 and ID6 as weak primary key candidates in Tables 5 and 6. To deal with this, the algorithm may be extended to concatenate prospective compound key fields within a table (e.g. Table 5) that can be compared with prospective field(s) within another table (here Table 6). In principle, for an exhaustive search, each permutation would need to be assessed, so to improve performance the algorithm preferably eliminates unlikely compound key candidates from the concatenation process.

Compound key candidate reduction is illustrated in FIG. 14F.

Compound key detection is based on concatenation of prospective fields in order to check for a data intersection. In order to improve efficiency and performance, unlikely compound key pairs are preferably ignored prior to concatenation.

In this example, a candidate key field is analysed with 100 rows containing 85 distinct values within the candidate key field. There are 80 occurrences where a distinct value appears once (i.e. it is unique). There are also 5 occurrences where a distinct value appears 4 times. In this example, column concatenation would preferably only be performed with other columns containing four or more distinct values, as they would need at least four distinct values in another field to make a composite key based on the fields unique. Hence all other columns not meeting this requirement would be ignored.

After eliminating unsuitable fields, the remaining field pairs are concatenated for each permutation and data intersections compared with fields (or field combinations, also concatenated in an analogous fashion) in the other tables. An example of concatenation of fields ID5 and ID6 into a composite key is shown in FIG. 14G.

The remainder of the algorithm then proceeds as described before, enabling a Combined Probability (CP) to be calculated for compound column groups, and hence allowing relationships Rel5/Rel6 to be identified in the FIG. 14E example. In this example a composite key of two columns is analysed; this may in principle be extended to composite keys of any number of columns, subject to practical limits on computational resources including execution time.

As a further extension, the algorithm (for both single-column keys and composite keys) may be extended to cater for partially matching fields, as illustrated in FIG. 14H. In this example the data intersection check is enhanced to check for a subset of data in one field being contained within another.

Thus, in this case, instead of considering the full content of a key column as a candidate key for a relationship, the candidate key is formed from truncated versions of the field values. More generally this can be extended to allow a candidate key for a table to be derived from one or more fields of the table in any appropriate way, including by string manipulation (e.g. truncation, capitalisation and the like) or by mathematical manipulation (e.g. rounding or scaling of values). The appropriate manipulation may be selected automatically (e.g. to truncate strings in one field to the same length as the maximum length of another potential key field) and/or may be user-configured. This allows relationships to be identified between columns having similar data, even if the data is not encoded in the same way in the columns.

Cumulative Relationship Learning

The Table Analyzer may be run repeatedly on a set of source tables (or even on all tables in the data lake). In that case the Table Analyzer is preferably configurable not to reanalyze relationships that have already been analyzed on a previous run but rather to search only for new relationships. For example, if columns have been added to one or more tables, or if entire tables have been added, the Table Analyzer may consider only candidate relationships involving the new columns (e.g. relationships between added columns/tables only or between added columns/tables and previously existing columns/tables). In this way, a cumulative view of potential data relationships is built up without the need to fully analyze all possible column combinations.

Metadata Manager Tool

Referring back to FIG. 1, the Metadata Manager tool 109 comprises a set of user interfaces and workflows allowing users to enter, edit and review metadata in order to document the data held in the data lake 108, for example, defining the nature of particular tables/table columns and specifying relationships between columns.

In a preferred embodiment, the metadata managed by the Metadata Manager principally serves a documentation purpose. This documentation metadata should be distinguished from configuration metadata of the source databases, e.g. schema metadata read by the Data Tap tool from source databases 102 when importing data into the data lake 108 which defines the structure of the data in the source database. Nevertheless, in principle the Metadata Manager could operate on any form of metadata relating to data stored in the data lake, including source schema metadata and/or other configuration metadata (e.g. for configuring secondary systems).

Figure 15:
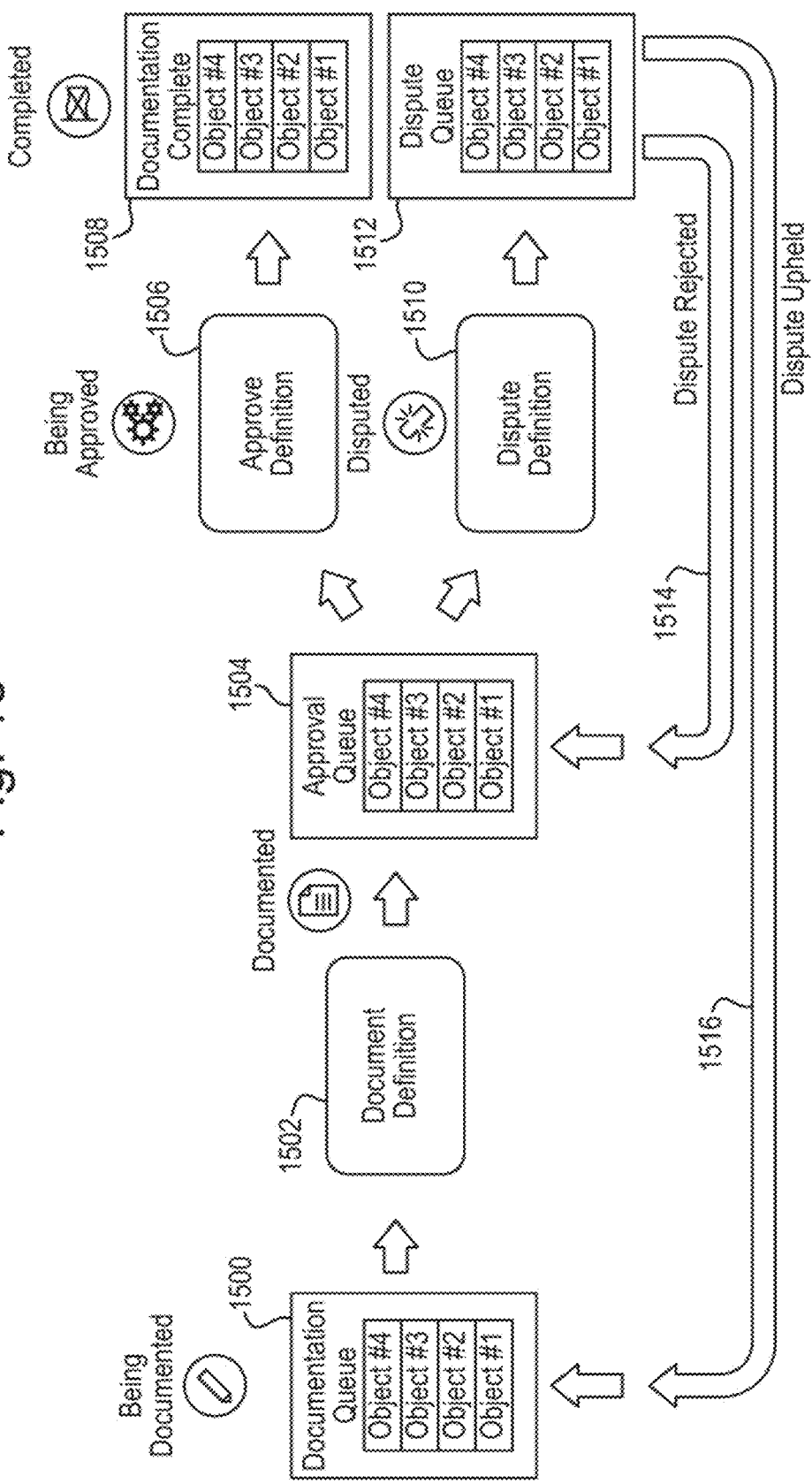
FIG. 15 illustrates a metadata collection and management process in overview.

A high level overview of the metadata management workflow is illustrated in FIG. 15.

The process begins with a set of objects for which metadata is to be collected, referred to as the documentation queue 1500. "Objects" are containers for metadata relating to database entities associated with the data imported into the data lake. The entities for which metadata may be collected and which are represented as metadata objects in the Metadata Manager include both structural/functional database entities as well as other forms of information that may be held in or associated with the source databases or the data lake. Examples of data entities and corresponding metadata objects may include:

Source databases
Tables
Views
Table columns
Relationships between tables/table columns
Queries
Reports
Business Rules Thus, a metadata object could provide information defining the purpose and organization of a database table, the meaning of a table column, the functionality of a query, a description of a report etc. The nature of the metadata typically varies between objects. Purely by way of example, a "Report" metadata object providing a description of a report could include metadata items such as Owner, Purpose, Validity Period, Description, etc. Business Rules can be plain text definitions and/or can include logic, and could also be used to store a set of definitions for business terms (e.g. a Customer, a Household, a Sale).

Note that this list is purely given by way of example, and a given implementation may not use all of the above and/or may use other object types.

The Metadata Manager tool is flexible and preferably allows users or operators to create other types of object, assign selected metadata items to the object, and then determine which roles can edit and which roles can approve those objects/items. Metadata objects may also be used to document the configuration of the system itself—as one example the source connection settings for the Data Tap tool could be added as objects to the Metadata Manager tool, with metadata such a text description and owner, for documentation and approval in the normal way.

In one example, the Data Tap tool may automatically create entries for imported data objects in the documentation queue 1500 directly when performing the import. Alternatively, the imported objects such as tables and columns may be recorded in a separate data inventory, with the Metadata Manager tool creating the documentation queue from that inventory. Initially, objects in the documentation queue are marked with a status indicator indicating that they are in the process of "being documented".

A document definition process 1502 is then used to collect and record metadata for the objects in the documentation queue 1500. Recording of metadata occurs mainly via user interaction using a documentation interface. However, some metadata may be automatically generated, either during import or subsequently.

The recorded metadata for the object forms a "definition" of that object. Objects for which a definition (i.e. one or more items of metadata) has been recorded have their status indicator updated to mark them as "documented". These objects are placed in an approval queue 1504.

The object definitions in the approval queue are then subject to an approval process, where a user (typically a user other than the user having created the original definition) reviews the recorded metadata and either approves the definition (step 1506) or raises a dispute (step 1510). During this stage the status indicator is set to "being approved". Once approval for an object definition is received, the status indicator is changed to "completed" and these object definitions are added to a completed set of definitions 1508.

If the reviewing user disagrees with the definition or considers that it contains errors, the dispute process is followed. Disputed object definitions are added to a dispute queue 1512 with a status indicator set to "disputed". The definition is then reviewed (e.g. by a third user); if the reviewing user rejects the dispute (step 1514) the object is returned to the approval queue 1504 and the status indicator reset to "being approved". If the reviewing user agrees with the dispute (e.g. the user considers that there are errors in the recorded metadata), the object is returned to the documentation queue 1500 and its status is reset to "being documented" (step 1516).

The documentation queue 1500, approval queue 1504, dispute queue 1512 and completed set 1508 are presented here as logical entities and may be implemented via any suitable data structures. In one example a metadata database storing entries identifying the objects may be provided. Each entry in the database may reference the relevant structures in the data lake (e.g. tables, columns, columns involved in relationships) or other entities (e.g. stored queries) and may be associated with a collection of metadata for the object and a status indicator indicating the documentation status. The queues may be dynamically determined by simply retrieving entries with a particular status. Alternatively the queues may be represented as queue/list data structures referencing the object definition database entries. Additional data may be recorded, such as date/time stamps indicating when various actions were completed (documenting, approving, disputing etc.) and specifying a user identifier for a user completing the action.

The possible status values for an object are summarized in Table 1 below:

TABLE 1

| Status | Description |
| --- | --- |
| Being Documented | The initial status. Basic information about the object has been loaded into the system automatically. All of the additional information required is due to be entered or in process of being entered. |
| Documented | All of the required (mandatory) information has been entered. Additional non-required information can still be entered or the object definition can be passed for approval. |
| Being Approved | The object definition has now been passed for approval and therefore is read-only. All of the relevant users/teams need to approve this object definition before it is considered complete. |
| Complete | All of the required users/teams have approved this. Information is considered accurate and the object definition can be used (for example with the Query Builder). |
| Disputed | This object definition is on hold until the dispute is resolved. |

Objects in the various queues may further be assigned to particular users, thereby forming (logical) user-specific work queues. The document definition, approval and dispute processes are supported by a collection of user interfaces allowing users to enter and review metadata and record problems or concerns. Additionally, a workflow interface is provided to allow users to view objects allocated to them for definition (1502), approval (1506/1510) or dispute resolution (1514/1516), select objects to work on, and trigger the respective processes.

Figure 16:
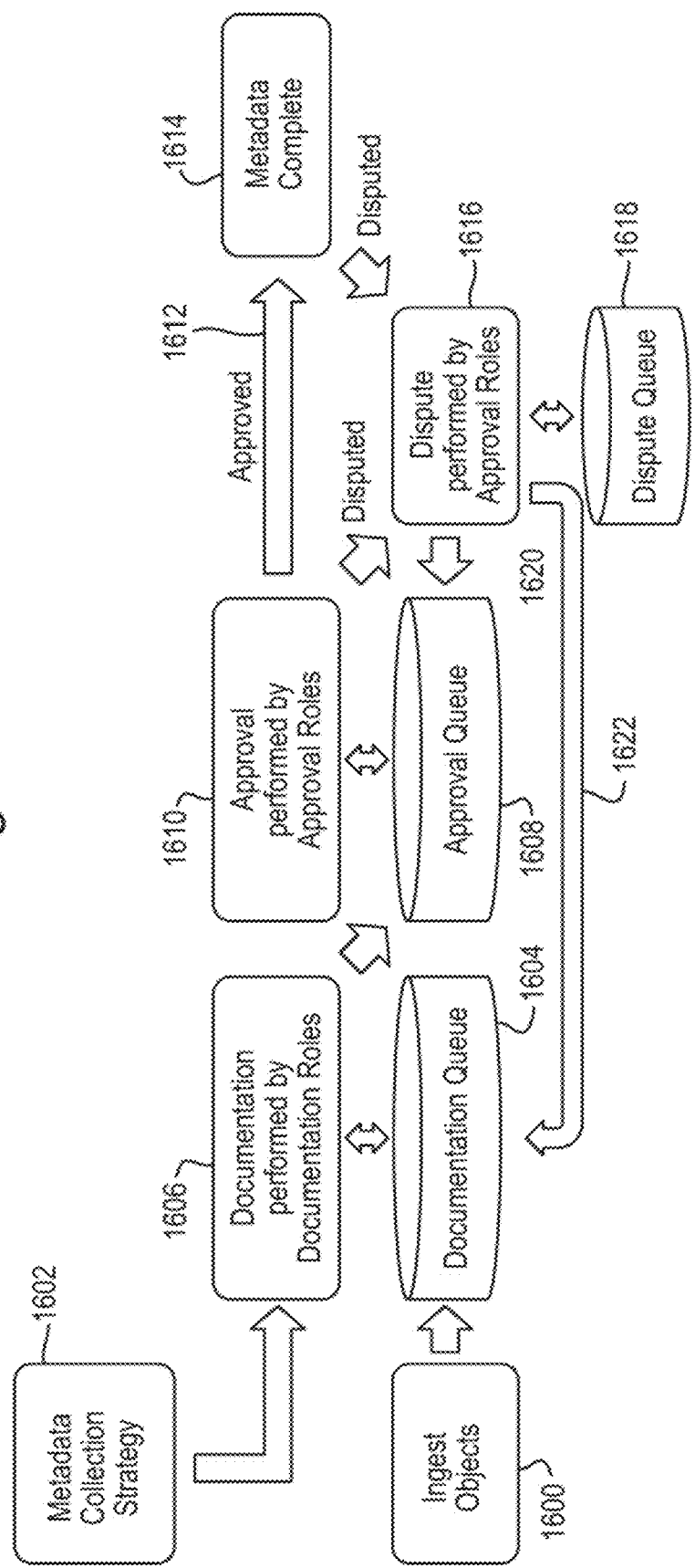
FIG. 16 illustrates an alternative representation of the metadata collection and management process.

FIG. 16 provides an alternative representation of the above process.

Initially, at step 1600, data objects are ingested into the data lake by the Data Tap tool. Independently (e.g. before or after data import), at 1602, the metadata collection strategy is defined, specifying for example, for each type of object:

What metadata should be collected

Which metadata items are mandatory

Which users should document the object

Which users are required to approve the object definition

At 1604, the system puts incomplete objects into the Documentation queue. At 1606, object metadata is open for input for those individuals in a Documentation Role. These roles are specific to an individual metadata item. At 1608, once all mandatory metadata has been documented, the system puts the documented object into the Approval queue and locks the object for edit.

At 1610, metadata is open for approval for those individuals in an Approval Role. These roles are again specific to an individual metadata item. At 1612, once all Approvers have approved all metadata definitions the object transitions to the "complete" status (1614), meaning that the object has now been approved for use.

At 1616, if an Approver disputes a definition, the system puts the disputed object into the Dispute queue (1618) and locks the object from further approvals. At 1620, if the dispute is rejected, the system passes the object back to the Approval queue and unlocks the object for approval. At 1622, if the dispute is upheld, the system passes the object back to the Documentation queue and unlocks the object for edit.

Figure 17:
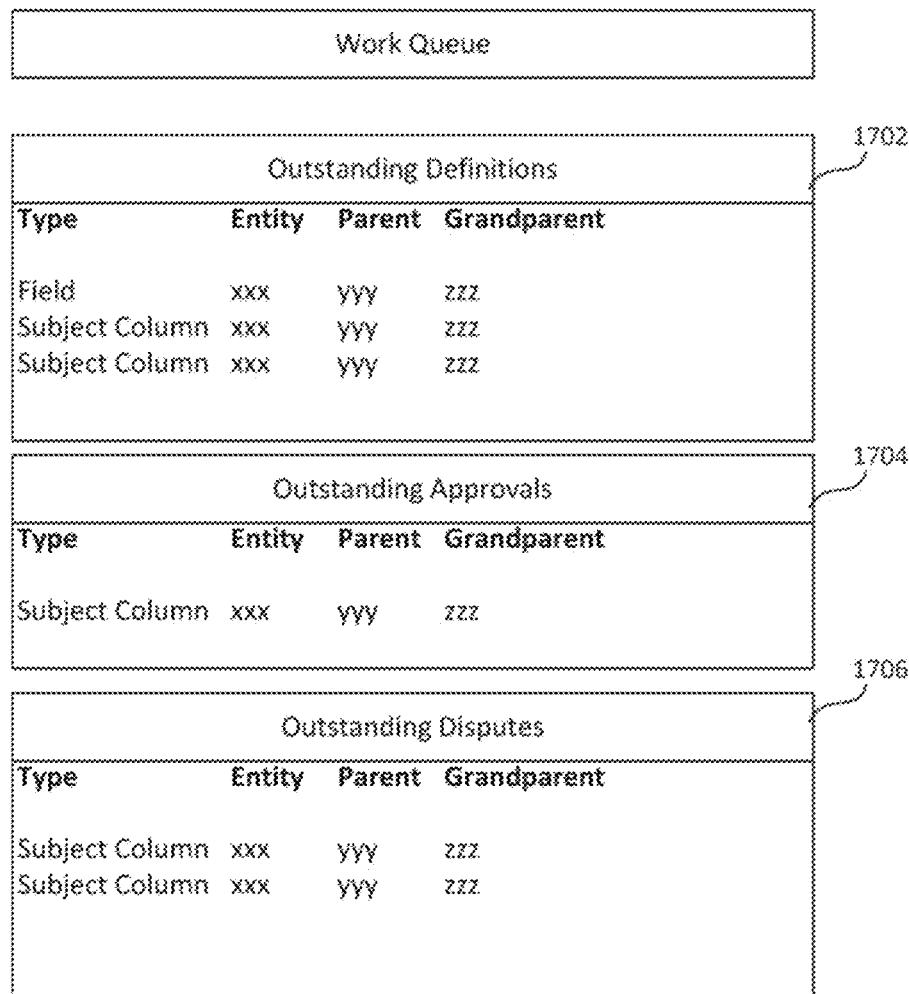
FIG. 17 illustrates a work queue user interface for the metadata collection and management process.

FIG. 17 illustrates an example user interface for displaying a work queue. The interface includes an "Outstanding Definitions" section 1702 listing objects for which metadata is to be entered, an "Outstanding Approvals" section 1704 listing data objects for which approval is required and an "Outstanding Disputes" section 1706 listing data objects where a dispute has been raised. For each object, the type of the object is indicated ("Type") along with the name of the object ("entity"). Names of parent and grandparent objects are also identified (in accordance with the relevant hierarchical "tier" structure as described below).

While the work queue interface may list all outstanding actions, more typically, the work queue may be specific to a user, listing those actions allocated to that user. The user can then select an item in one of the queues 1702, 1704, 1706 to invoke the relevant interface screens for the metadata entry, approval, and dispute processes.

The interface may additionally provide a search function allowing the user to search for particular objects. The search may be performed on object name, on any of the collected object metadata, on object status etc. (alone or in combination). In one example, the search results may be presented in a user interface displaying the type of object, name, and parent and/or grandparent information as depicted in FIG. 17, and allowing the user to select an object to work on (e.g. to initiate metadata entry, approval, or dispute resolution dependent on status).

Figure 18A:
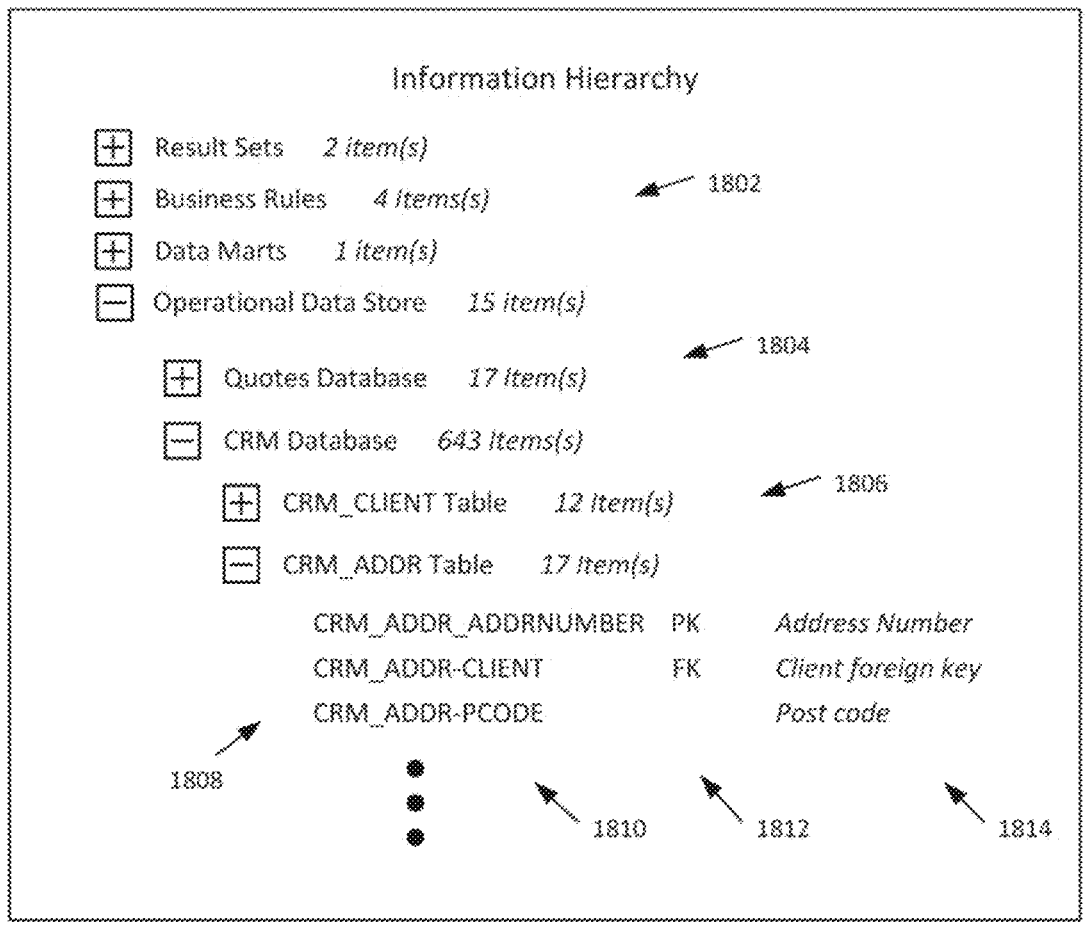
FIGS. 18A and 18B illustrate user interfaces for navigating and configuring an information hierarchy.

In preferred embodiments the Metadata Manager tool maintains a hierarchy of objects (e.g. stored in a tree representation). This hierarchy can be inspected by way of an inspection interface, a simplified example of which is illustrated in FIG. 18A.

In the illustrated example, the highest level 1802 of the hierarchy view represents different classes of data sources. These top-level entities are referred to herein as hierarchies, and are configurable. Each hierarchy has a number of sub-tiers, and the tree display may be expanded and collapsed in order to display required sections.

Here, the hierarchy "Operational Data Store" is shown in expanded view. In this hierarchy, the first tier 1804 corresponds to different source databases, in this example listing two operational databases that have been imported into the data lake. The next tier 1806 of the hierarchy lists the tables imported from the given database; here two tables are shown that were imported from the "CRM" database, namely the "CRM CLIENT" and "CRM_ADDR" table. The next tier 1808 lists the constituent fields or columns imported from a given table. A variety of information is shown for each column—in this example, a column name 1810, key indicator (e.g. private key PK or foreign key FK) 1812 if applicable/known and a description 1814. The description may be a descriptive label that was obtained as part of the metadata collection process. Other metadata may of course be displayed here as well. A status indicator indicating the metadata collection status may also be displayed (e.g. using the status values summarised in Table 1 above).

The user may interact with the displayed entries (e.g. by way of a set of buttons displayed alongside each entry, not shown), for example to invoke the metadata entry, approval and dispute functions for a particular data object or view a history of metadata collection actions (entry/approval/dispute etc.). The Query Builder tool (described below) may also be invoked based on a selected table or column in order to create a data query using that table or column.

Figure 18B:
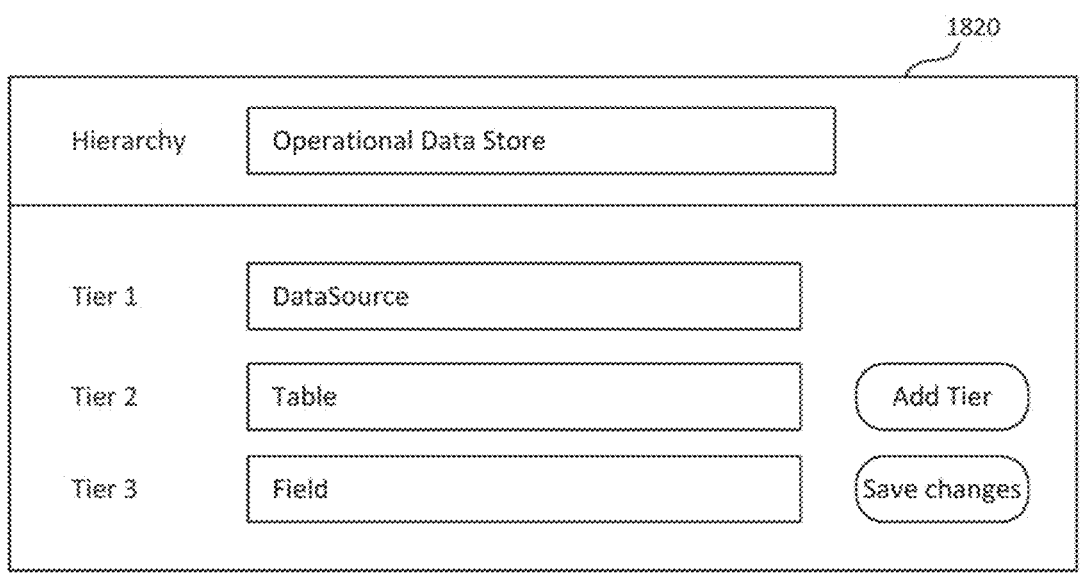

As mentioned above, hierarchies are user-configurable. FIG. 18B illustrates an example of a configuration screen 1820, here for configuring the "Operational Data Store"

hierarchy. For each hierarchy, the user can specify one or more sub-tiers; here three sub-tiers are defined, namely "DataSource" (i.e. the source database), "Table" and "Field" (where a field corresponds to a table column).

Each tier of a hierarchy corresponds to a type of object for which metadata may be collected. Thus, the metadata collection and approval workflow described previously may be applied to all objects at any of the tiers.

Instead of the described hierarchical relationships, the system could alternatively allow metadata objects to be associated with each other using a more generalised model based on graph relationships, in which any object can be related to any other object. The object browsing interface could then be adapted accordingly, e.g. to allow display of a graph of metadata objects.

Metadata

For each type of object, corresponding to the "tiers" discussed above, the metadata that can be collected can be configured by users of the system. Specifically, users may define any number of metadata items, and may further specify which object type(s) each metadata item is relevant to.

In one embodiment, the information specified by the user to define a metadata item may include:

Name
Label
Description
Placeholder (a value that will appear in the input field for the metadata item when it is blank)
A data type (e.g. whether the metadata item is entered as freeform text or numerical information or by selection from a list of options)
The set of predefined list options for the metadata item (if the metadata item is restricted to a specific set of values rather than allowing freeform text entry)
The object types (corresponding to tiers in the defined hierarchies) to which the metadata item applies
The class(es) of users who are required to approve the metadata item
The class(es) of users who may edit the metadata item
A flag indicating whether the metadata item is required (mandatory)

FIG. 19 illustrates an example screenshot for an interface 1900 for specifying a metadata item. The interface includes a section 1902 for inputting various information about the metadata item, a section 1904 for indicating the object types (or tiers) to which the metadata item applies, a section 1906 for indicating the required approvers (by specifying user roles) and a section 1908 for indicating the permitted editing users (again in terms of roles). In this case the metadata item is named "Information_Security_Classification", and is defined as being applicable to the "Field" and "Result Column" tiers (object types). This particular object is to be approved by the "Data Manager" and "Business Data Owner" roles and can be edited by the "Developer" and "Data Manager" roles. Note that for clarity not all the entry fields and options that would be used in a practical implementation are shown in this simplified depiction of the user interface.

Metadata Entry and Approval

FIG. 20 illustrates a simplified representation of a user interface 2000 for performing metadata entry and/or approval. The interface lists a set of metadata items 2002 that are applicable for the given object type of the selected object with input fields (which may be freeform text or numerical input fields, check boxes, drop-down list selection fields, or any other appropriate input field, depending on the definition of the metadata item). Only a small number of metadata items are shown for clarity.

Furthermore, the interface provides a set of buttons 2004 for performing various actions, including saving changes, approving the metadata or raising a dispute. While for conciseness a single interface is shown, in practice, entry and approval may have different interfaces. For example, the metadata entry screen may include only the "cancel", "save", and "save and submit" buttons, while the approval screen may include only "cancel", "approve" and "dispute" buttons. The approving user may see the metadata values in read-only form or may alternatively also be able to edit prior to approval or resubmission (in which case all the buttons could be provided in that mode).

The button actions may be as follows:
Cancel: Discard changes and return to last screen
Save: Save metadata changes without changing the object status
Save and submit: Save metadata changes and change status from ""Being Documented" to "Being Approved" with the result that the object will be added to the approval queue
Approve: confirm approval by the reviewing user. If all required users have approved (or only a single approval is required) this results in the object status changing to "Documented", otherwise the status remains as "Being Approved"
Dispute: Triggers creation of a dispute; a further interface may be displayed e.g. as a pop-up box allowing the reviewing user to enter a reason (e.g. selected from a predefined set of reasons) along with detailed comments and explanations (e.g. to specify any errors found in the metadata)

The metadata entry/display form is preferably generated dynamically. To do this, after receiving a selection of a particular object to be documented (e.g. via the work queue depicted in FIG. 17, the hierarchy display of FIG. 18A or via a search) the system identifies the object type (corresponding to the hierarchy tier) and selects from the database of metadata items those metadata items defined as applicable to that object type. The form is then generated with input fields for the relevant metadata items. A definition is created in the database (which may e.g. be in the form of a definition record referencing multiple metadata item records of the relevant item types). After the user saves changes, the entered metadata item values are stored in the metadata record for the object in the metadata database.

Configuring Relationships

In a preferred embodiment, the metadata collection tool additionally allows users to define relationships between tables (or more specifically between table columns), and/or to document relationships by way of metadata using the same metadata collection process previously described. Thus, in such an embodiment, relationships may form an additional type of object that can be documented by the system (in addition to data sources, tables and fields/columns). Relationships could then also be represented in the information hierarchy (as depicted in FIG. 18A), e.g. as a tier below the "table" tier, or they could be listed and accessed separately.

Figure 21:
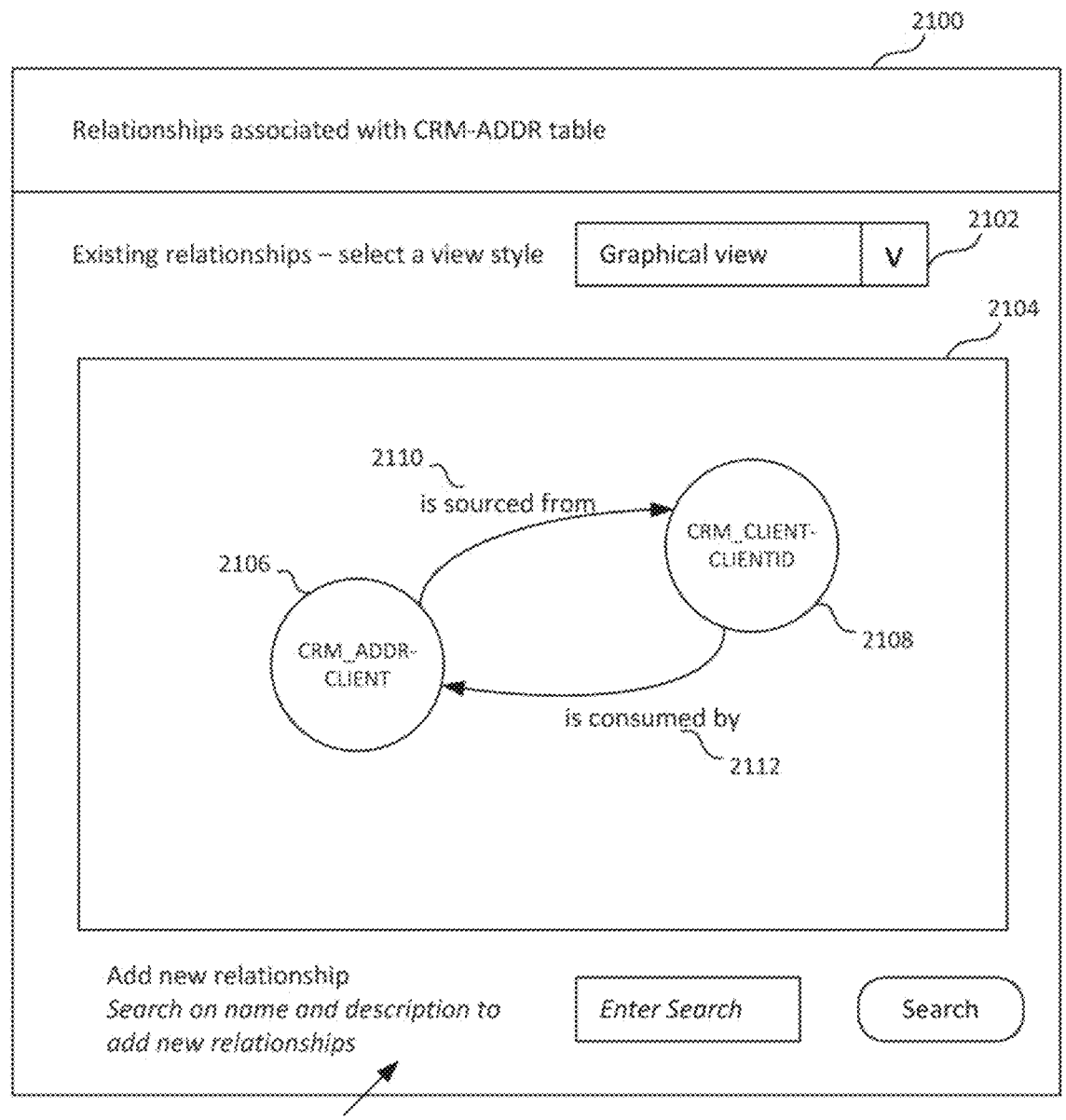
FIG. 21 illustrates a user interface for viewing or editing data relationships.

FIG. 21 illustrates a simplified user interface 2100 for viewing, editing and/or adding relationships. In this example, it is assumed that the user has selected a particular table for which relationships are to be inspected. The user may select via a selection input 2102 how relationships are to be displayed, e.g. in text or graphical format (in this case graphical view has been selected). Relationships for the selected table are then displayed in a view area 2104; here a single relationship involving columns 2106 and 2108 is shown (where column 2108 is a column in another table). Labelled arrows 2110 and 2112 connect the pictorial representations of the columns and provide descriptive text defining the nature of the relationship.

A search function 2114 is provided to allow new relationships to be defined. The user can use the search function to find columns for which a relationship is to be defined and can then use a further interface (not shown, e.g. a popup window) to specify information about the relationship including the labels that indicate the type of relationship.

The relationships depicted and manipulated via the interface may include relationships already known to exist in the source data (e.g. if relationship information was extracted from the source database) as well as those entered by users via the interface.

Additionally, the relationships may include relationships discovered by the Table Analyser tool as described in more detail above (metadata objects for discovered relationships may be automatically added to the Metadata Manager tool/ documentation queue). The source of a relationship may be indicated in the interface (e.g. to distinguish automatically discovered relationships).

In preferred embodiments, the user may further select a relationship to view its metadata collection status and/or invoke the workflows for entering/editing metadata for a relationship, approve/dispute metadata definitions, resolve disputes etc. as described above. Metadata collection and approval for relationships preferably operates substantially as already described previously.

History

Users may display a history of the metadata collection process for any selected object. The history may be displayed as a chronological listing identifying metadata edits made and approval/dispute/dispute resolution actions, indicating date/time and the user completing the action. The history listing may show the status changes for an object (i.e. identifying events corresponding to status changes as per the status values of Table 1 and the process as shown in FIGS. 15/16).

User Roles

The system preferably implements role-based access control for restricting access to metadata objects to particular users. In this approach, users of the system may be assigned to various roles. The roles are configurable. Examples of roles include:
 Developer
 Solution Architect
 Data Manager
 Admin
 User
 Business Data Owner A user's role determines the actions the user may take in the system. For example, as described previously, metadata items may specify the user roles that may edit the item and the roles from which approval of the particular item is required.

The system may also allow SLAs (service level agreements) to be defined for each role, indicating the expected turnaround time for processing objects (e.g. to document, or approve an object). This can then allow analysis and reporting to check that the metadata collection process is operating effectively.

The system may further providing reporting functions, e.g. to show user activity over a defined time period for individual users, groups of users (e.g. specific roles) or all users. In one example, a report may indicate a number of object definitions a user has added or edited, and the number of those that were approved and disputed. Activity may also be summarised over time e.g. in graph form.

The Metadata Manager tool thus allows many users to cooperate in creating metadata definitions relating to data objects imported into the data lake. The metadata management process can also be extended to cover reports, business rules, and any other form of information handled by an organisation. The described approach can have a number of benefits, including:
 Agreed standard definitions can be created for data, business rules, reports and other information entities.
 Accelerated design of information systems
 Enables "self-service" access to large and complex data by end users
 The captured metadata documentation may facilitate legal & regulatory compliance
 The system enables a crowd-sourced or federated approach to gathering and populating metadata information Data Lake Synchronisation In preferred embodiments, the Metadata Manager tool is integrated with the data lake and Data Tap tool by way of automatic synchronisation functionality, allowing the Metadata Manager to maintain an up-to-date view of the contents of the Hadoop data lake.

The synchronisation component automatically provides details of the data structures, objects, and associated technical metadata that reside on the Hadoop platform.

As new objects appear in the Hadoop platform, workflow can be automatically triggered to begin the documenting and categorising the descriptive metadata associated with it. Over time this enables individual users and corporate enterprises to maintain current and historical views of their entire big data estate residing on Hadoop platforms.

Figure 22:
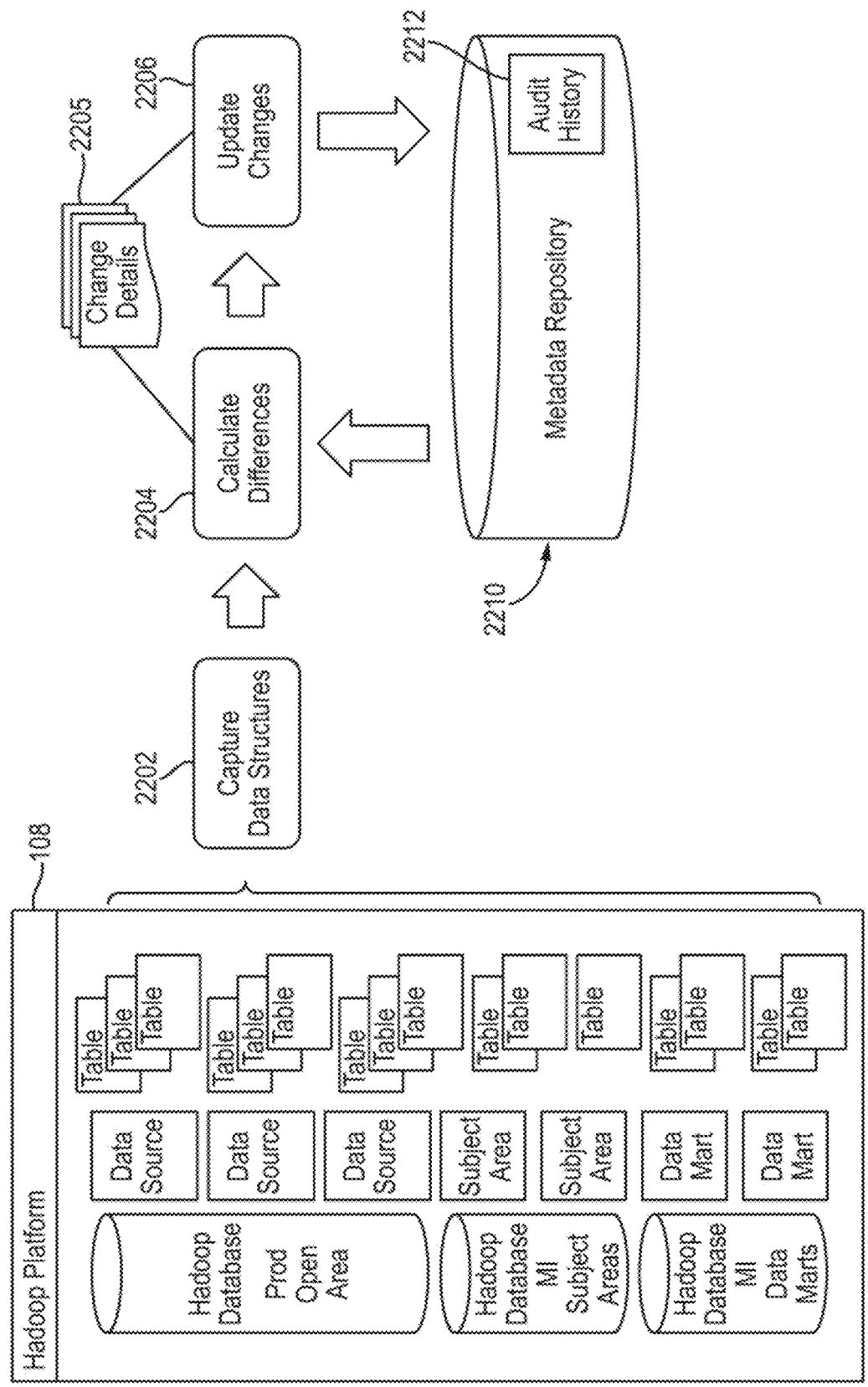
FIG. 22 illustrates a metadata synchronization process.

The synchronisation process is illustrated in FIG. 22. In this example, a data lake (Hadoop platform) 108 is illustrated comprising multiple Hadoop/Hive databases each sourced from multiple data sources and including data corresponding to tables of those data sources. Metadata repository 2210 contains the metadata objects and associated metadata managed by the Metadata Manager tool and is periodically synchronised with the data structures on a Hadoop platform 108.

A capture process 2202 is used to gather the details of the data structures and associated technical metadata (e.g. schema metadata) currently residing on the Hadoop platform 108. A subsequent difference calculation process 2204 uses this information and compares it to the data structures and metadata already held within the repository 2210. The process 2204 determines the differences in structure and metadata since the last execution, and calculates a list of changes that need to be applied to the repository 2210 in order to bring it up-to-date, and these are stored as change details 2205.

A change update process 2206 is then performed to apply the identified changes to the repository 2210. The changes may create, update, or mark as deleted objects with the repository 2210. The change process also updates the audit history 2212 with details of any changes made, so that a full list of changes over time is maintained. Preferably, physical deletes are not performed in the repository 2210 in order to maintain a full history of previous activities and object details but information may instead be marked as no longer valid.

For example, if a new table has been imported into the Hadoop data lake, the capture process 2202 will obtain a description of the table and its constituent columns from Hadoop (in the form of "technical" or schema metadata for the Hive/Hadoop database). The difference calculation process will identify these as new entities since corresponding documentation metadata does not exist in the metadata repository 2210. The change update process 2206 may then create metadata objects in the repository corresponding to the new entities in the data lake, for example an object representing the new table along with objects representing each column of the table. These objects may then be added automatically to the documentation queue 1500, thereby triggering the documentation workflow of FIG. 15, to allow documentation metadata to be collected for the new database entities.

Query Builder

Data warehouses are conventionally built using a "schema-on-write" (early binding) approach. Before any data can be loaded onto the platform, a significant amount of time and effort often needs to be spent designing its physical data structure to accommodate all the possible ways in which the data will be consumed. This is to ensure that all the data dimensions are correctly conformed, and that all the business transformations contain the correct logic. This typically means that a requirements/solution design cycle is needed between the business and software development teams.

In preferred embodiments of the present system, the data lake is instead built using a "schema-on-read" (late binding) approach. This means that data gets loaded onto the platform straight away (by the Data Tap tool), without necessarily needing to consider how the data may be used. At this point, the raw data is accessible for users to consume, based upon their roles and permissions. This method can provide much quicker access to data and requires less effort; however it does requires that the consuming user effectively builds their own schema into their query when constructing a new dataset and/or report. The Query Builder tool enables users to create, store and document these queries so that they are searchable and re-useable between individual roles, making use of data maintained by the Metadata Manager Tool and relationships discovered by the Table Analyser tool. Hence over time knowledge is developed and evolved detailing how data is distributed between source tables/files, and how it can be combined/joined and selected/filtered to produce useful data assets.

In a conventional approach, each consuming user of a data warehouse or similar system would typically manage their own queries in isolation from one another, with the potential to use inconsistent logic and disparate data, or to waste time and effort duplicating queries which already existed.

The Query Builder tool 113 (see FIG. 1) seeks to address some of these difficulties and provides a method to avoid potentially inconsistent logic, disparate data, and duplication, in order to save time and effort, and promote re-use and best practice.

This is achieved by making saved Query Builder queries available for other users to use, subject to their role and permissions.

In preferred embodiments, each saved query is represented as an object in the Metadata Manager, following the same metadata collection/approval workflow described above for other objects. As a result, queries will become documented, approved, and fully searchable.

Users are able to search for existing approved queries by using metadata associated with the query by the Metadata Manager, for example by searching for a query description, keyword, and/or subject area. Once a specific query has been found, a user may either run it as is, or (if modifications are needed) may clone a copy and edit it, before saving and running the modified query.

The Query Builder tool also allows users to build their own queries from scratch via a graphical user interface. The tool enables users to select columns from tables stored in the data lake based on the metadata contained within the Metadata Manager tool, and then to select table joins based on relationships identified by the Table Analyzer tool. Furthermore, users are able to specify additional criteria such as filter criteria (e.g. "WHERE" restrictions), and grouping/aggregation criteria (e.g. "GROUP BY", "COUNT", "SUM", and "SORT" criteria).

In preferred embodiments, the Query Builder tool executes queries directly on the data lake platform using the optimum method for delivering the best performance. This may include technologies such as Spark, Java Map-Reduce, TES, and/or Hive.

The Query Builder tool allows the user to select Hive tables 110 in the data lake 108 to form the basis of a query. The Query Builder tool can then suggest possible join-type relationships, based on manually defined relationships and also based on the output of the relationship discovery process carried out by the Table Analyzer tool as described above.

Where automatically discovered relationships are used, the tool preferably also indicates information on the strength of the possible relationship, such as the CP or the rank computed previously. While the Table Analyzer may be run on demand after tables have been selected for a query, it may be preferable for performance reasons to run the Table Analyzer in advance (e.g. whenever new tables, or new data for existing tables, is imported into data lake 108), so that the relationship information is available when needed in the Query Builder.

The user can then inspect the proposed relationships, table metadata (and possibly also table contents) and select the appropriate join relationship for the construction of the query.

Figure 23A:
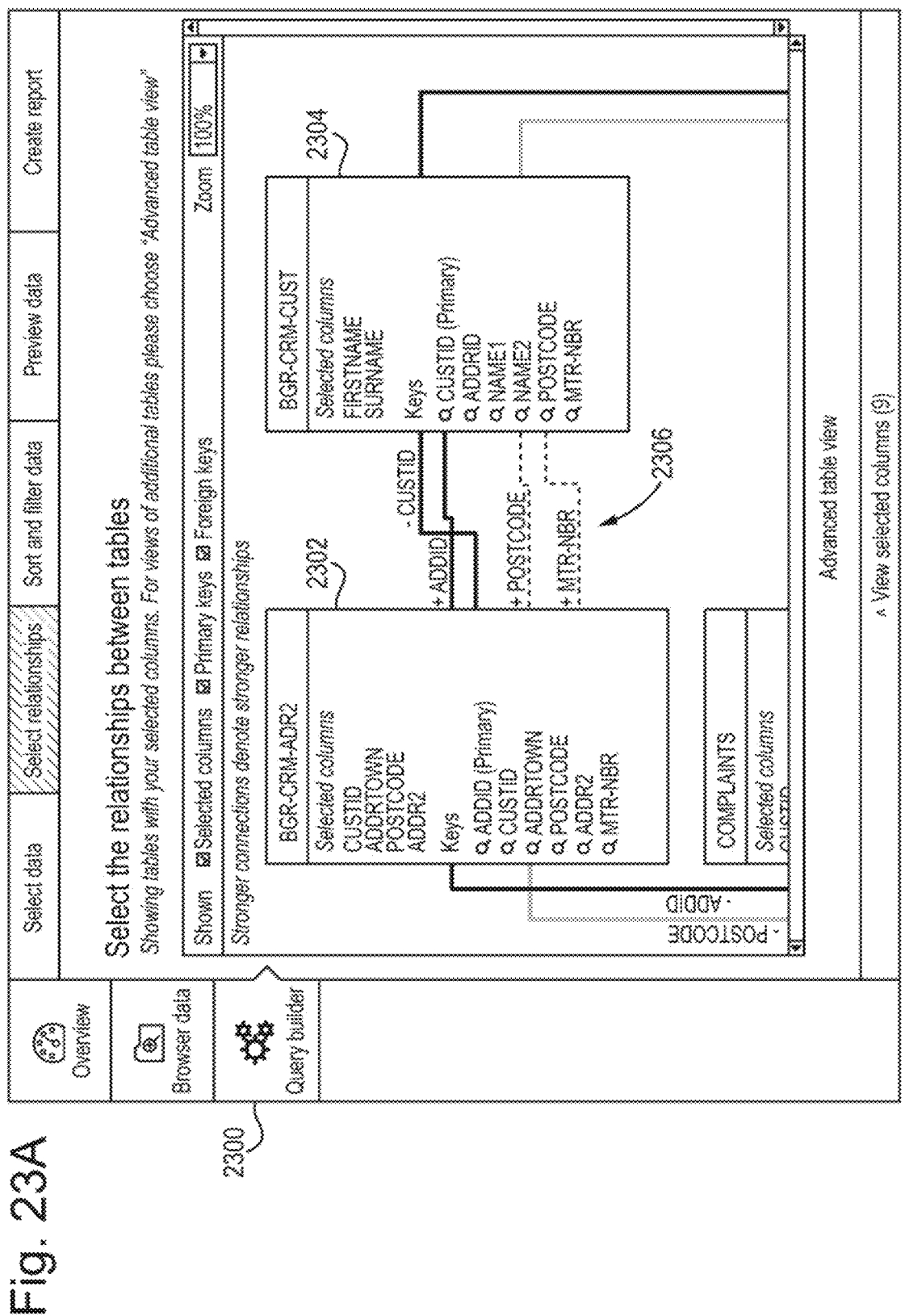
Figure 23B:
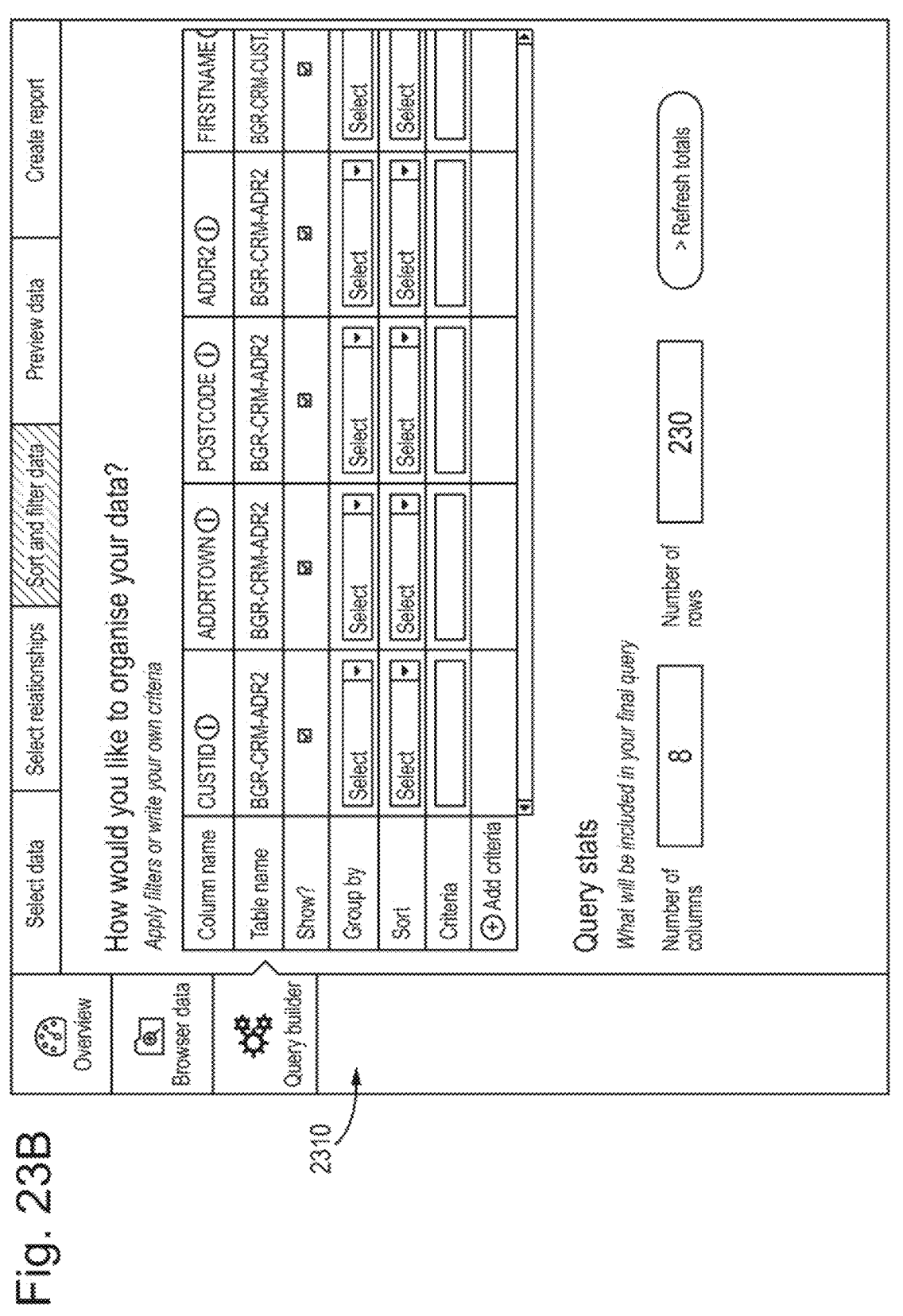

An example user interface of the Query Builder tool is depicted in FIGS. 23A and 23B. FIG. 23A illustrates an interface 2300 of the Query Builder displaying two tables 2302 and 2304 selected for the query by the user. These tables may have originated from different data sources and thus the relationships between the tables may not be known a priori. The interface also proposes a number of possible relationships 2306 between the tables which may have previously been discovered by the Table Analyzer (illustrated as labelled lines connecting the respective column/field names of the respective tables). A visual indication of the relationship strength (based on the data computed by the Table Analyzer as described above) is provided by way of the color and/or line weight used to represent the connections between tables—here a relationship between the CUSTID column of table 2302 and the CUSTID column of table 2304 is identified as the strongest relationship. The user may be able to view more detailed relationship information for each relationship, including collected metadata and/or the various statistical information computed by the Table Analyzer (e.g. by clicking on or hovering over a relationship in the interface).

The user then selects the required relationship e.g. by clicking on the link or label. At that point a second screen 2310 (FIG. 23B) may then be displayed to allow the user to specify additional parameters of the query, such as which columns to include in the query output, the query criteria, and any grouping/aggregation/sorting to be performed.

After defining the query the query can then be executed to retrieve data from the data lake. In preferred embodiments, based on the user input a query statement or script is generated in accordance with an appropriate data query language, e.g. HQL or SQL. The generated query includes a table join based on the selected relationship, i.e. with a join defined on the table columns to which the relationship relates (this may be done e.g. by adding a WHERE statement or similar, such as "WHERE T1.A=T2.13" to define a join condition between table 1 column A and table 2 column B). The join type (e.g. inner/outer and left/right/full join etc.) may be specified by the user or a default join type may be used.

The query is then executed, e.g. in the case of the Hadoop system by submitting the generated HQL statement to Hive. Hive executes the query and returns the results to Query Builder or other relevant component (e.g. data analytics component 112). The query results may also be transmitted to a user device 116 (e.g. PC terminal or mobile device) for display to the user, stored as a new table in the data lake 108, or transmitted to a remote computer system for further processing.

In addition to direct execution the query can be saved in the system and if appropriate published to make it available for other users. Once a query has been added to the system it may be processed by the Metadata Manager tool (i.e. by way of a metadata object representing the query which is added to the metadata repository and which is processed via the metadata collection/approval process as previously described).

While FIGS. 23A-23B illustrate a relatively simple query with two tables, more complex queries may be constructed including more than two source tables and/or multiple join relationships. Queries may also be combined by nesting (e.g. by using query output from one query as input to another query in place of a source table).

FIG. 24 illustrates various processes that may be performed utilizing the Query Builder tool (supported by the Query Builder user interface e.g. as depicted in FIGS. 23A-23B).

Firstly, information on existing queries held in metadata repository 2210 may be viewed, browsed and/or searched and queries may be selected in step 2402.

A new query creation process 2404 may be invoked and may include the following illustrative steps:
  Step 2406: Data for the query is selected—e.g. selecting particular tables from which data is to be obtained. The selection may be done utilising table metadata in repository 2210 (e.g. via a metadata search function).
  Step 2408: One or more relationships between the tables to serve as table joins for the query are specified—these may be predefined relationships or relationships found by the Table Analyser (in which case the relationship metadata in repository 2210 may be used to identify suitable relationships). Alternatively, join relationships may be explicitly specified by the user.
  Step 2410: Filter and Sort/Aggregation criteria and the like may be specified.
  Step 2412: A preview of the query output is preferably generated to assist the user in verifying correct operation.
  Step 2414: The query is saved (optionally being made available to other users for reuse).

The user may vary the order in which steps are performed, may omit some steps, and may at any point return to earlier steps to revise the query definition after completing later steps.

A query clone/edit process 2416 may be invoked for an existing stored query. In that case the query builder creates a copy of the query definition from the stored query and the process may then include the following illustrative steps:
  Step 2418: The data selection may be modified (e.g. adding, removing or changing selected source tables).
  Step 2420: The joins may be modified (e.g. by changing the relationship used as the basis for a table join).
  Step 2422: Sort/aggregation and filter criteria may be changed.
  Step 2424: An output preview is generated.
  Step 2426: The edited query is saved.

The user may vary the order in which steps are performed, may omit some steps, and may at any point return to earlier steps to revise the query definition after completing later steps.

A documentation and test process 2428 may include the following illustrative steps:
  Step 2430: Metadata is entered for the query.
  Step 2432: The query metadata is approved (steps 2430 and 2432 may be performed within the Metadata Manager tool).
  Step 2434: The query can be tested e.g. by executing the query and inspecting results.
  Step 2436: The query may be scheduled for execution e.g. at a particular time and/or periodically. For a scheduled query, the system then automatically executes the query in accordance with the specified schedule, with results stored for subsequent access, review, and processing.

The steps may be performed in a different order and not all steps may necessarily be performed (e.g. scheduling may only apply to certain queries).

System Architecture

Figure 25A:
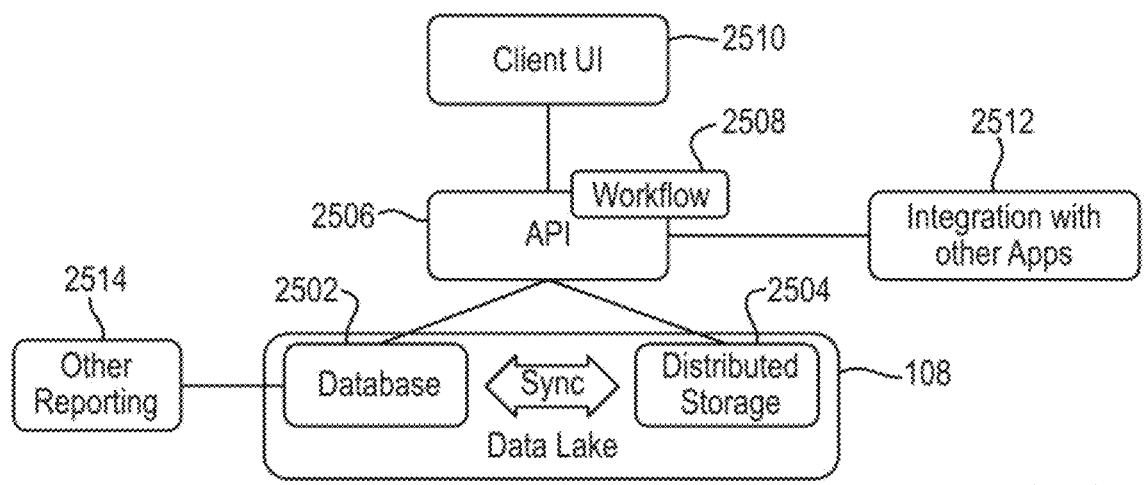
FIGS. 25A-25C illustrate software architectures for the data management system.

A high-level software architecture for implementing the described system (including the Data Tap, Table Analyzer, Metadata Manager and Query Builder tools) is shown in FIG. 25A.

The system is based around the data lake 108. This includes distributed storage 2504 for storing table data extracted from source databases by the Data Tap tool, and database 2502 for storing management data, such as the metadata repository containing metadata collected by the Metadata Manager tool, user data and other data used by the system.

An API (Application Programming Interface) 2506 is provided for interacting with the information stored in the distributed storage 2504 and database 2502. A set of workflow processes 2508 are implemented using the API, e.g. to implement the Data Tap data ingestion, Table Analyzer relationship discovery, and metadata collection/approval processes. A client user interface (UI) 2510 handles the user interactions. While a standalone client application could be provided, in preferred embodiments the client UI is preferably implemented as a web application running in a browser. Other applications 2512 may integrate with the system via API 2506. Reporting functions 2514 (e.g., a QlikView reporting solution) may access the database 2502 or other information in the data lake directly (though could alternatively also access the information through extensions to the API).

Metadata may be stored in versioned form in the database 2502, e.g. to allow changes to be undone or a history of changes to be inspected.

Figure 25B:
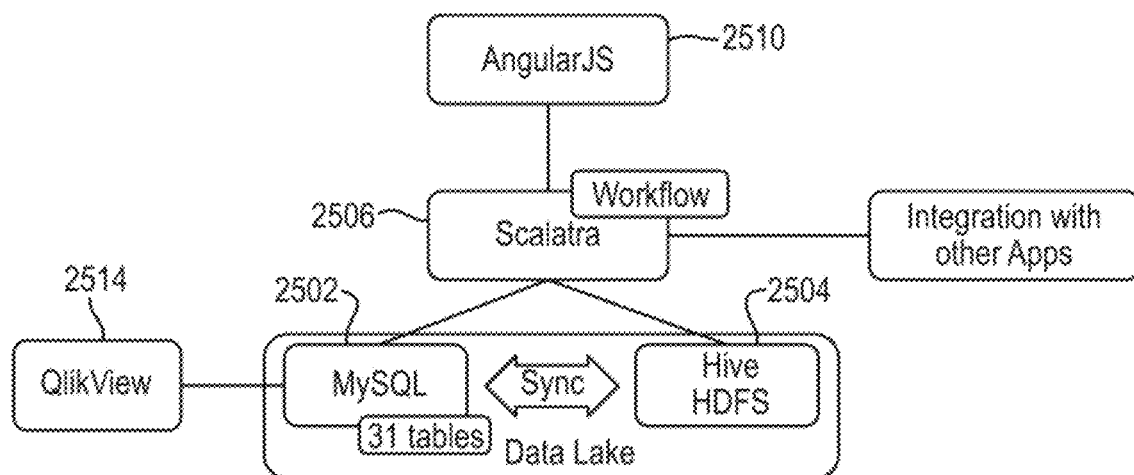
Figure 25C:
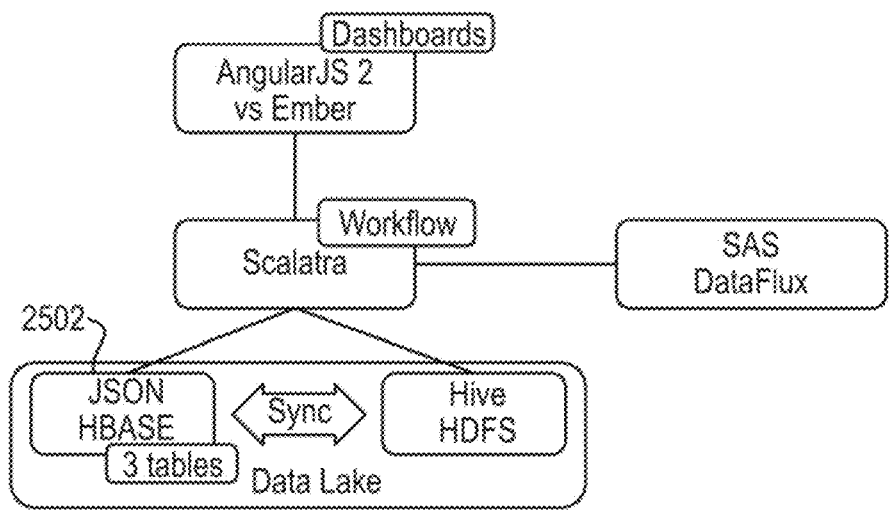

FIG. 25B illustrates a specific example of the above architecture. Here, the distributed storage 2504 is implemented via the Apache Hive HDFS as described previously. Database 2502 in implemented as a MySQL database. The API 2506 is implemented based on a Scalatra web microframework with the client UI 2510 implemented using the AngularJS web application framework. A QlikView reporting solution 2514 is provided. A variation of the architecture is shown in FIG. 25C, in which an Apache HBASE database is used as the database 2502 (which may reside in the Hadoop HDFS).

Aspects of the above system may be implemented on one or more computing nodes—e.g. a cluster of hardware servers.

Figure 26:
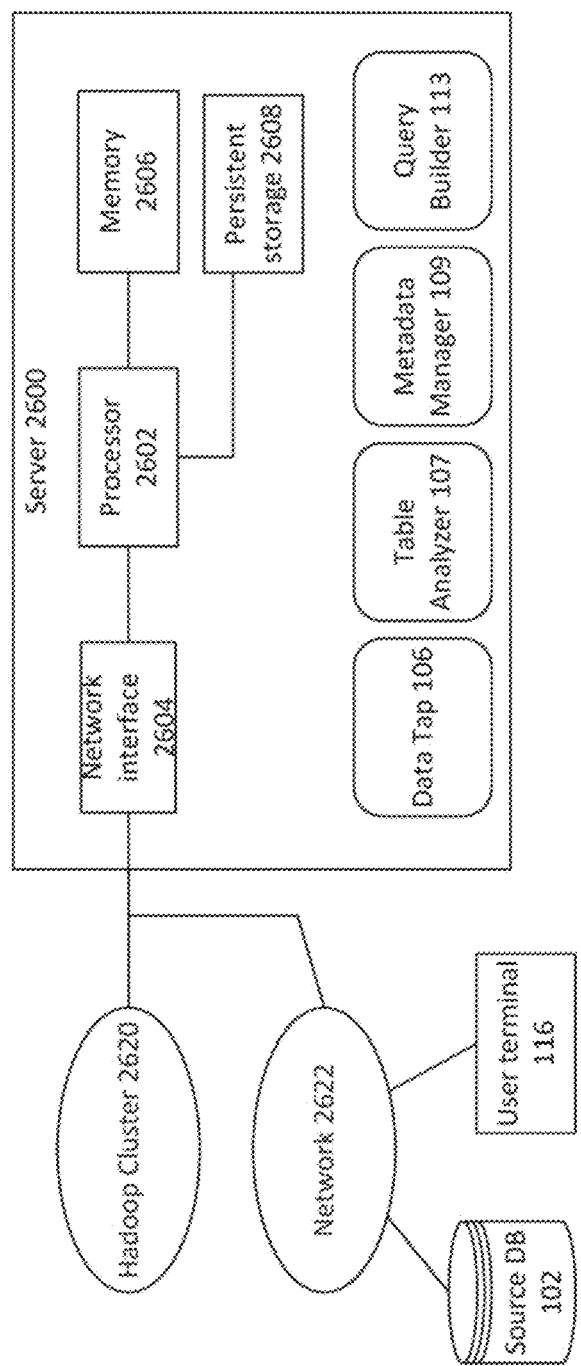
FIG. 26 illustrates an example of a hardware/software architecture of a computing node that may be used to implement various described processes.

FIG. 26 illustrates an example of a hardware/software architecture of a server node 2600 which may be used to implement methods and techniques described herein. The server includes one or more processors 2602 together with volatile/random access memory 2606 for storing temporary data and software code being executed.

A network interface 2604 is provided for communication with other system components (e.g. other servers in a Hadoop cluster 2620, where the server 2600 is operating as part of a cluster) and a wider network 2622 (e.g. Local and/or Wide Area Networks, including the Internet), for example, for connection to data sources 102, user terminals 116 and other devices.

Persistent storage 2608 (e.g. in the form of hard disk storage, optical storage, solid state storage and the like) persistently stores software for performing the various functions, including one or more of: a Data Tap module 106 for importing data from data sources 102 into the data lake 108, Table Analyzer module 107 for identifying table relationships using the methods set out above, Metadata Manager module 109 for implementing the metadata collection and approval processes described above, and Query Builder module 113 to enable creation and execution of queries based on the identified relationships.

The persistent storage also includes other server software and data (not shown), such as a server operating system. The server will include other conventional hardware and software components as known to those skilled in the art, and the components are interconnected by a data bus (this may in practice consist of several distinct buses such as a memory bus and I/O bus).

While a specific software and hardware architecture is shown in FIGS. 25A-25C and FIG. 26 by way of example, any appropriate hardware/software architecture may be employed and any suitable hardware, database, API and UI technologies may be used.

Furthermore, functional components indicated as separate may be combined and vice versa. While in this example, a range of different processes 106, 107, 109 and 113 are shown as implemented on the server, in practice these processes may be distributed across multiple servers, e.g. with different servers handling data import, table analysis and metadata collection functions. Thus, functionality may be distributed over any number of computing devices in any suitable manner. In preferred embodiments, where appropriate, modules may operate in a parallelized fashion (e.g. using Hadoop map-reduce) across multiple physical or virtual servers or compute nodes in a Hadoop cluster as already set out in more detail for the Table Analyzer tool.

The data lake 108 (FIG. 1) may be implemented as persistent storage distributed over a number of servers in the Hadoop cluster (e.g. in the form of a Hadoop distributed file system). Those servers may provide data storage only or may combine data storage with any of the previously described processing functions.

It will be understood that the present invention has been described above purely by way of example, and modification of detail can be made within the scope of the invention.

Script Samples

SAMPLE 1: The following is a sample Sqoop script for performing an initial load for the "TJ30T" source table 104 as depicted in FIG. 5B:

```
source $1
sqoop import -D oraoop.jdbc.url.verbatim=true -D
mapred.job.queue.name=${queueName} -D
mapred.job.name=TJ30T_SQOOP_INITIAL_LOAD -
Djava.security.egd=file:/dev/../dev/urandom -D mapred.child.java.opts="-
Djava.security.egd=file:/dev/../dev/urandom" --direct --connect
jdbc:oracle:thin:@//${host_name}:${port_number}/${db_instance} --username
${username} --password "${password}" --num-mappers ${sqoopMappers} --
hive-import --hive-overwrite --hive-delims-replacement " --null-string " --null-
non-string " --table sourcedb."TJ30T" --target-dir
/user/hdp_batch/sourcedb//initial/crm/crm_tj30t --map-column-hive
MANDT=STRING,STSMA=STRING,ESTAT=STRING,SPRAS=STRING,TXT
04=STRING,TXT30=STRING,LTEXT=STRING --hive-table
prod_landing_initial_area.crm_tj30t
```

SAMPLE 2: The following is a sample HQL script for creating a Hive table in the data lake corresponding to the FIG. 5B table:

```
USE ${hivevar:DATABASE};
CREATE ${hivevar:EXTERNAL} TABLE IF NOT EXISTS
crm_tj30t${hivevar:LABEL} (
${hivevar:ERRORS}
    jrn_date STRING COMMENT '',
    jrn_flag STRING COMMENT '',
    tech_closure_flag STRING COMMENT 'Utility filed for closure flag',
    tech_start_date STRING COMMENT '',
    tech_end_date STRING COMMENT '',
    mandt STRING COMMENT '',
```

```
    stsma STRING COMMENT '',
    estat STRING COMMENT '',
    spras STRING COMMENT '',
    txt04 STRING COMMENT '',
    txt30 STRING COMMENT '',
    ltext STRING COMMENT ''
) COMMENT ''
PARTITIONED BY (tech_datestamp STRING COMMENT 'YYYY-MM-DD on
which partition was created', tech_type STRING COMMENT 'OPEN, DELTA,
CLOSED', tech_num STRING COMMENT 'ops partition, sequence number of
the load')
ROW FORMAT DELIMITED
FIELDS TERMINATED BY '\001'
STORED AS SEQUENCEFILE TBLPROPERTIES(
    "mapreduce.output.fileoutputformat.compress"="true",
    "mapreduce.output.fileoutputformat.compress.type"="BLOCK",
    "mapreduce.output.fileoutputformat.compress.codec"="org.apache.ha
doop.io.compress.GzipCodec"
);
```

SAMPLE 3: The following is a sample HQL script for performing an initial load of the Hive table:

```
USE ${hivevar:DATABASE};
SET mapred.job.queue.name=${hivevar:QUEUE_NAME};
SET hive.merge.size.per.task=100000000;
SET hive.merge.smallfiles.avgsize=100000000;
SET hive.exec.parallel=true;
SET hive.exec.parallel.thread.number=50;
SET hive.exec.compress.output=true;
SET
mapred.output.compression.codec=org.apache.hadoop.io.compress.GzipCod
ec;
SET mapred.output.compression.type=BLOCK;
INSERT INTO TABLE crm_tj30t PARTITION
(tech_datestamp='${hivevar:DATESTAMP}', tech_type='ORIGINAL',
tech_num='${hivevar:NUM}') SELECT '${hivevar:DATESTAMP} 00:00:00.0'
as jrn_date, 'ORIGINAL' as jrn_flag, NULL as tech_closure_flag, NULL as
tech_start_date, NULL as tech_end_date, mandt, stsma, estat, spras, txt04,
txt30, ltext FROM ${hivevar:INITIAL_DB}.crm_tj30t;
```

Corresponding Sqoop and Hive scripts for performing subsequent delta loads would also be provided.

SAMPLE 4: The following is a sample HQL script for modifying a table definition to add a column:

```
USE ${hivevar:DATABASE};
ALTER TABLE crm_tj30t ADD COLUMN (COL1 STRING);
```

SAMPLE 5: The following is a sample updated Sqoop script for importing the modified table (initial load; a corresponding modified delta load script would also be generated):

```
source $1
sqoop import -D oraoop.jdbc.url.verbatim=true -D
mapred.job.queue.name=${queueName} -D
mapred.job.name=TJ30T_SQOOP_INITIAL_LOAD -
Djava.security.egd=file:/dev/../dev/urandom -D mapred.child.java.opts="-
Djava.security.egd=file:/dev/../dev/urandom" --direct --connect
jdbc:oracle:thin:@//${host_name}:${port_number}/${db_instance} --username
${username} --password "${password}" --num-mappers ${sqoopMappers} --
hive-import --hive-overwrite --hive-delims-replacement '' --null-string '' --null-
non-string '' --table SAPCRM."TJ30T" --target-dir
/user/hdp_batch/sapcrm//initial/crm/crm_tj30t --map-column-hive
MANDT=STRING,STSMA=STRING,ESTAT=STRING,SPRAS=STRING,TXT
04=STRING,TXT30=STRING,LTEXT=STRING, COL1=STRING --hive-table
prod_landing_initial_area.crm_tj30t
```

Corresponding modified HQL initial/delta load scripts could also be generated as needed.

SAMPLE 6: The following is a sample Sqoop template.

```
"sqoop import -D
mapred.job.name=${sqoop_table_name} SQOOP_INITIAL_LOAD -D
mapred.job.aueue.name=${queueName}"
    + "-Djava.security.egd=file:/dev/../dev/urandom"
    + "-D mapred.child.java.opts=\"\\-Diava.security.eqd=${sqoopSecurityFile}\"
   "
    + "--connect jdbc:oracle:thin:@//${sqoopSourceServer}/${sqoopSchema}"
    + "-username ${sqoopUsername} --password \"${sqoopPassword}\" "
    + "--num-mappers ${numOfMappers} --hive-import -hive-overwrite --hive-
    drop-import-delims "
    + "--null-string " --null-non-string " "
    + "--query 'SELECT ROW_NUMBER, ${sqoop col str tmp} FROM ( select
    ${ora hash str}$(sqoop col str tmp}"
    + "FROM ( select ${sqoop col str} FROM
    ${schemaName}.\"$(sqoop table name}\")) "
    + "WHERE $CONDITIONS' "
    + "--target-dir
    ${sqoopTargetDir}/initial/${sourceSystem}/${hive table name}"
    + "--split-by ROW_NUMBER --map-column-hive ${hive col str} "
    + "--hive-table ${tempLandingArea}.${hive table name}"
```

The template includes an invocation of the Sqoop tool with relevant parameters, including an embedded database query (here SQL) for retrieving the required data from the source database. The template includes placeholder variables of the format ${variable_name}. These placeholder variables are substituted during script generation with the applicable values. For example, ${sqoop_table_name} is substituted by the relevant table name and ${sqoop_col_str_tmp} is substituted with the list of columns being imported. Hive templates may be constructed in an analogous fashion.

Further Aspects and Features.

The following sets out further aspects and preferred features, which may be provided independently or combined with the aspects set out above and in the appended claims in any appropriate manner.

Data Tap

In one aspect of the invention, there is provided a computer-implemented method of importing data from a data source to a target storage system, wherein the data is stored at the data source in accordance with a source data schema, the method comprising: executing an automated data import process to retrieve data from the data source and update the target storage system based on the retrieved data, the automated data import process operating in dependence on the source data schema; detecting a change in the source data schema; in response to detecting the change in the source data schema, modifying the automated data import process based on the detected change; and executing the modified automated data import process to retrieve further data from the data source and update the target storage system based on the further retrieved data.

The data source may be a source database, e.g. managed by a database management system. The step of detecting a change in the source data schema preferably comprises retrieving metadata from the data source defining the source data schema for the data, and comparing the metadata to previously stored metadata for the data source to identify one or more changes to the source data schema. The metadata thus preferably relates to the configuration of the source database, in terms of the data schema (e.g. the structural organization of the source data). The method may comprise storing the retrieved metadata in a metadata repository. The previously stored metadata may have been obtained during a previous operation of the process, and may be stored in the metadata repository, which may be updated based on detected metadata changes.

The method preferably comprises configuring the automated data import process in dependence on the metadata. Preferably, the automated data import process is defined by a set of stored executable data import and/or manipulation instructions, the method comprising modifying or regenerating one or more of the executable instructions in dependence on the changed source data schema. The instructions may, for example, comprise instructions or statements in a data query/manipulation language and/or instructions to a data import program (e.g. as parameterized invocations of the data import program).

The stored executable instructions are preferably in the form of one or more import scripts (where a script may include one or more instructions). For example, the scripts may comprise scripts comprising data query language statements (e.g. SQL/HQL) and/or may comprise shell scripts (e.g. invoking a data import program) and/or may comprise scripts in any suitable scripting language. Scripts may generally (though not necessarily) comprise instructions in textual/human-readable form. Preferably, the method comprises modifying or regenerating the import scripts in dependence on the modified source data schema and/or the retrieved metadata.

The import scripts may comprise: a data retrieval script for retrieving data from the data source in accordance with the source data schema, and an update script for updating the target storage system in dependence on the retrieved data. The import scripts may comprise at least a first data retrieval script for performing a complete import of a source table of the data source, and a second data retrieval script for performing an incremental import of changes to the source table (e.g. changes since a last run of the import process). The import scripts may comprise at least a first update script for updating the target storage system by performing a complete import of a source table of the data source, and a second update script for incrementally applying a set of changes made to the source table to the target storage system (e.g. since a last run of the import process). In one example, data retrieval scripts may comprise Sqoop scripts and/or update scripts may comprise Hive Query Language scripts.

Preferably, modifying the automated data import process comprises generating one or more import scripts in dependence on the source data schema and/or retrieved metadata. The method may comprise generating the one or more import scripts based on retrieved metadata defining the source data schema and based on one or more script templates. For example, after identifying one or more appropriate stored script templates, the script templates (which may include incomplete sections and/or placeholders) may be populated based on retrieved metadata to form import scripts.

The method may comprise retrieving a script template from a plurality of stored script templates, each of the stored script templates associated with a given data source type, the retrieved script template selected based on the type of the data source from which data is being imported, preferably wherein the data source type indicates a database management system managing the data source; and modifying the template based on the retrieved metadata to generate a data import script.

The method may further comprise modifying a data schema for the target storage system in dependence on the detected change in the source data schema, wherein the modified automated data import process updates the target storage system based on the modified target data schema.

Preferably, the method comprises classifying a type of the change to the source data schema, and modifying the automated data import process in dependence on the type of change, the method optionally comprising: modifying a target data schema and/or an import script for a source schema change comprising one of: an addition of a column, a deletion of a column, and an index change. The method may comprise, for a given change type, not modifying a target schema and/or not modifying import scripts. Thus certain change types may be ignored during the import.

Executing the automated data import process preferably comprises acquiring difference information specifying changes to data stored in the data source (e.g. since a last run of the import process or since a last time difference information was generated or acquired). The difference information may be received from the data source, or the method may include generating the difference information. In the latter case, the method preferably comprises receiving a data set from the data source; comparing the received data set to a previously stored version of the data set and generating the difference information based on the comparison. The data set preferably comprises a set of records (e.g. in the form of a database table), the method comprising identifying one or more identifier fields of the set of records that uniquely identify respective records, preferably one or more primary key fields, and comparing the values of the identifier fields to values of said fields in the previously stored version of the data set to identify data changes. The comparing preferably comprises one or more of: in response to a record having an identifier field value not present in the previously stored version of the data set, identifying the record as an inserted record; in response to a record having an identifier field value present in the previously stored version of the data set, comparing the record to the corresponding previously stored record, and identifying the record as an updated record if they differ; in response to identifying a field value present in the previously stored version of the data set but not the retrieved data set, identifying the record as a deleted record. The data set may comprise a set of data records stored in a table in the data source. Preferably, one or more updates are generated based on the difference information and the updates are applied to the target storage system.

Preferably, the difference information comprises a plurality of data change entries, each data change entry relating to a changed record and specifying one or both of: an update type, the update type preferably selected from the group consisting of at least insert, update, and delete; and one or more (old or new) field values of the changed record.

Preferably, the data source comprises a relational database, the import operation relating to a given source table of the relational database, the detecting step retrieving metadata defining a data schema of the given source table, preferably wherein the automated data import process is configured to retrieve data from the given source table of the data source and update a target data structure at the target storage system corresponding to the given source table based on the retrieved table data.

The method may comprise partitioning the source table into partitions at the target storage system, the partitions optionally stored in separate data containers or files, preferably wherein the data import is performed in parallel by a plurality of import processes, each import process arranged to generate a respective partition at the target storage system. The method may comprise storing data in the target storage system in a directory structure, preferably wherein files corresponding to partitions of a given source table are stored in a common directory associated with the source table (e.g. this may involve storing files corresponding to different tables in different directories).

In an embodiment, data import is performed using a parallelized map-reduce algorithm.

The target storage system may comprise a storage system other than a relational database, preferably a storage system based on Hadoop and/or Hive.

The method may comprise maintaining at least two databases in the target storage system, the first database comprising a current version of data imported from one or more data sources, the second database comprising historical data of the one or more data sources, the method optionally comprising: updating, by the automated data import process, the first database based on data retrieved from a data source; and maintaining one or more past versions of data modified by the data import process in the second database.

The method may further comprise reordering columns of a source table during import such that one or more key columns are placed first in a column order of the imported data in the target storage system.

In a further aspect of the invention, there is provided a data import system for importing data from a data source to a target storage system, wherein the data is stored at the data source in accordance with a source data schema, the system comprising: an automated data import process configured to retrieve data from the data source and update the target storage system based on the retrieved data, the automated data import process adapted to operate in dependence on the source data schema; a data schema monitoring module adapted to detect a change in the source data schema; and a configuration module adapted, in response to detecting the change in the source data schema, to modify the automated data import process in dependence on the change. The system may be configured to perform any method as set out above.

Table Analyser

In a further aspect of the invention, there is provided a method of identifying relationships between data collections, each data collection comprising a plurality of data records, the method comprising: evaluating a plurality of candidate relationships, each candidate relationship defined between a first set of data values associated with a first data collection and a second set of data values associated with a second data collection, the evaluating comprising computing relationship metrics for each candidate relationship, wherein the relationship metrics for a candidate relationship provide a measure of a relationship between the first value set and the second value set, the computing comprising: computing a first metric indicating a degree of distinctness of values of at least one of the first and second value sets; and computing a second metric indicating a measure of overlap between values of the first value set and values of the second value set; the method further comprising identifying one or more relationships between data collections in dependence on the computed relationship metrics.

The first and second value sets preferably define respective first and second candidate keys of the respective data collections. The term candidate key preferably refers to data derived from a data collection that may be used in identifying data records, e.g. as a primary key or foreign key (whether or not actually defined or used as a key in the source data), and hence a candidate key may serve as a source or target of a relationship between data collections. Such a candidate key typically corresponds to a set of values taken (or derived) from a given field or combination of fields of a data collection (with respective key values taken/derived from respective records of the collection).

The term "degree of distinctness" preferably indicates a degree to which values of a value set (e.g. defining a key) are distinct (different) from each other (e.g. in other words this may relate to the degree of repetition of values within the value set). Thus, value sets having fewer repeated values (in absolute or more preferably relative terms) may be considered to have a higher degree of distinctness than value sets having more repeated values. The term "overlap" preferably refers to a degree to which values in one value set/key are also found in the other value set/key. The term "metric" preferably refers to any measure or indicator that may be calculated or otherwise determined (metrics may be expressed numerically or in any other way).

Preferably, each data collection comprises data records each having one or more data fields, and wherein the first and/or second value set (for a given candidate relationship) comprises: a set of values of one or more data fields of its associated data collection; or a set of values derived from one or more data fields of its associated data collection. The first and/or second value set may comprise (for a given/at least one candidate relationship) a combination or concatenation of field values of two or more fields of the associated data collection.

Preferably, the first and/or second value set comprises a plurality of values, each value derived from a respective record of the associated data collection, preferably wherein the values of the value set are derived from one or more corresponding fields of respective records. Corresponding fields are preferably fields that separate records have in common, e.g. they are the same field according to the data schema of the data collection (e.g. a value set may correspond to one or more particular columns of a table or one or more particular attributes of an object collection). One or more predefined values of the given field(s) may be excluded from the set of values forming a candidate key, e.g. null values or other predefined exceptions. Thus, in that case the analysis may be performed only in relation to non-null and/or non-excluded candidate key values.

Preferably, the data collections comprise tables (e.g. relational database tables), the records comprising rows of the tables, preferably wherein the first value set comprises a first column or column combination from a first table and wherein the second value set comprises a second column or column combination from a second table. In the context of relational database tables, the terms "row" and "record" are generally used interchangeably herein, as are the terms "column" and "field".

The method may involve evaluating candidate relationships involving (as candidate key) at least one, and preferably a plurality of different field/column combinations of the first and/or second data collections. Optionally all possible field/column combinations may be considered (e.g. up to a maximum number of fields/columns which in one example could be two or three; alternatively no limit could be applied). Possible combinations (e.g. up to the limit) may be filtered based on predetermined criteria e.g. to eliminate unlikely combinations and thereby improve computational efficiency.

Preferably, the method comprises computing a relationship indicator for one or more (or each) of the candidate relationships, wherein the relationship indicator for a candidate relationship is indicative of a strength or likelihood of a relationship between the value sets forming the candidate relationship and is computed based on the first and second metric for the candidate relationship.

Preferably, the first metric comprises a key probability indicator indicative of the probability of the first value set or second value set being (or serving as/capable of serving as) a primary key for its data collection. Computing a key probability indicator preferably comprises: computing, for the first and second value sets, respective first and second probability indicators indicative of the probability of the respective value set being a primary key for its data collection, and determining the key probability indicator for the candidate relationship based on the first and second probability indicators. The key probability indicator for the candidate relationship may be determined as (or based on) the greater of the first and second probability indicators. The method may comprise determining a probability that a value set is a primary key for its data collection based on a ratio between a number of distinct values of the value set and a total number of values of the value set (or the total number of records in the data collection). As mentioned above, null values and optionally other defined exceptional values may not be considered as valid key values and may not be counted in determining the number of distinct values and/or the total number of values in a value set. Thus, the term "key values" may be taken to refer to values of a key which are not null and optionally which do not correspond to one or more predefined exceptional values.

Preferably, the second metric comprises an intersection indicator indicative of a degree of intersection between values of the first and second value sets. Computing the intersection indicator preferably comprises: computing a number of distinct intersecting values between the first and second value sets, wherein intersecting values are values appearing in both the first and second value sets; and computing the intersection indicator for the candidate relationship based on a ratio between the number of distinct intersecting values and a total number of distinct values of the first or second value set. As before null values and optionally other defined exceptional values may be excluded from the counts of distinct intersecting values and/or distinct values of respective value sets.

Throughout this disclosure, the distinct values of a set are preferably considered the set of values with repeated values eliminated, i.e. a set in which each value differs from each other value.

Preferably, the method comprises: computing a first ratio between the number of distinct intersecting values and the total number of distinct values of the first value set; computing a second ratio between the number of distinct intersecting values and the total number of distinct values of the second value set; and computing the intersection indicator in dependence on the first and second ratios. The method may comprise computing the intersection indicator as (or based on) the greater of the first and second ratios.

Preferably, the method comprises computing the relationship indicator for a candidate relationship based on the product of the key probability indicator and intersection indicator.

The step of identifying one or more relationships may comprise identifying a possible relationship between value sets of respective data collections in response to one or more of the first metric, the second metric and the relationship indicator for a candidate relationship exceeding a respective predetermined threshold. Alternatively or additionally, the method may comprise ranking a plurality of candidate relationships in accordance with their relationship indicators and/or computed metrics, and/or associating a rank value with the candidate relationships.

The identifying step preferably comprises generating an output data set comprising information identifying one or more identified relationships, the output data preferably including computed relationship indicators, metrics and/or ranks.

In preferred embodiments, the data collections are data tables, the first and second value sets comprising columns of respective tables. The method may then comprise a plurality of processing stages including: a first processing stage, comprising mapping values appearing in the data tables to column locations of those data values; a second processing stage, comprising computing numbers of distinct data values for respective columns and/or numbers of distinct intersecting values for respective column pairs; and a third processing stage comprising computing relationship indicators based on the output of the second processing stage. The first processing stage may further comprise one or more of: aggregating, sorting and partitioning the mapped data values. One or more of the first, second and third processing stages may be executed by a plurality of computing nodes or processes operating in parallel. The method may be implemented as a map-reduce algorithm. For example, the first processing stage may be implemented using a map operation and the second processing stage may be implemented as a reduce operation.

Preferably, the method comprises using at least one of the identified relationships in the creation and/or execution of a data query to retrieve data from the one or more data collections, the data query preferably specifying a join defined between respective keys of the data collections, the keys corresponding to the value sets between which the relationship is defined.

In a further aspect of the invention (which may be combined with the above aspect), there is provided a computer-implemented data processing method, comprising: computing data indicative of relationships between columns of a plurality of data tables; receiving a user selection of at least a first table having a first set of columns and a second table having a second set of columns; providing indications of one or more suggested relationships between respective columns of the first and second tables to a user, each indication preferably indicating a strength or likelihood of a relationship between one or more columns of the first table and one or more columns of the second table based on the computed data; receiving a user selection of one of the suggested relationships; and creating a data query based on the selected tables and the selected relationship. The computing step may comprise performing any method as set out above.

In either of the above aspects, the data query may specify a join between the selected tables, the join defined with respect to the columns to which the selected relationship relates. The data query may comprise a data query language statement, preferably an SQL (Structured Query Language) or HQL (Hive Query Language) statement. The method may comprise executing the query to retrieve data from the data tables, and optionally storing the query output and/or transmitting the query output to a user device.

In a further aspect of the invention (which may be combined with any of the above aspects), there is provided a method of identifying relationships between data tables, each data table preferably comprising one or more rows corresponding to respective data records stored in the table, and one or more columns corresponding to respective data fields of the data records, the method comprising: computing a relationship indicator for each of a plurality of key pairs, each key pair comprising respective first and second candidate keys selected from respective data tables, wherein the relationship indicator comprises a measure of a relationship between data of the first candidate key and data of the second candidate key; and identifying one or more relationships between the data tables in dependence on the computed relationship indicators.

In a further aspect of the invention, there is provided a data processing system comprising: data storage for storing data tables (each data table preferably comprising one or more rows corresponding to respective data records stored in the table, and one or more columns corresponding to respective data fields of the data records); and a table analyser module configured to: compute a relationship indicator for each of a plurality of key pairs, each key pair comprising respective first and second candidate keys selected from the one or more data tables, wherein the relationship indicator comprises a measure of a relationship between data of the first candidate key and data of the second candidate key; the relationship indicator preferably computed based on a measure of distinctness of values of at least one of the first and second candidate keys and/or based on a measure of overlap between values of the first candidate key and values of the second candidate key; and output data specifying one or more relationships between candidate keys of the data tables in dependence on the computed relationship indicators. The system may further comprise a query module configured to create and/or execute data queries on the data tables using relationships specified in the output data. The system may be configured to perform any method as set above.

What is claimed is:

1. A computer-implemented method comprising the steps of:
    maintaining a data repository, the data repository storing data imported from one or more data sources;
    storing and managing, by a metadata management module, metadata, in a metadata repository, relating to the data in the data repository;
    constructing, using a query builder interface, a first data query, using first metadata from the metadata repository, for querying the data in the data repository;
    storing the first data query in the metadata repository;
    creating a first metadata object for the first data query in the metadata repository, and adding the first metadata object to a documentation queue;

constructing, using the query builder interface, a second data query, using second metadata from the metadata repository, for querying the data in the data repository;

storing the second data query in the metadata repository;

creating a second metadata object for the second data query in the metadata repository, and adding the second metadata object to the documentation queue;

searching existing queries based on existing metadata objects stored in the metadata repository, the existing metadata objects including the first and second metadata objects;

selecting one of the existing data queries based on its metadata object;

editing the selected data query to construct, using the query builder interface, a third query using third metadata from the metadata repository, for querying the data in the data repository;

storing the third data query in the metadata repository; and creating a third metadata object for the third data query in the metadata repository, and adding the third metadata object to the documentation queue, wherein the first, second and third metadata objects are stored in the metadata repository and are available for retrieval and execution or for retrieval and editing to create modified data queries.

2. A method according to claim 1 further comprising the steps of:
in response to receiving a selection of two tables as data sources for the first data query, identifying based on the stored metadata at least one relationship between columns of the selected tables, and providing an indication of the identified at least one relationship on the query builder interface.

3. A method according to claim 2, further comprising the step of displaying an indication of a relationship strength on the query builder interface.

4. A method according to claim 3, wherein the identified relationships comprise one or more relationships automatically identified by analysis of data in the data repository, the relationship strength indication being computed during the analysis.

5. A method according to claim 1, wherein the query builder interface comprises an interface for selection of data entities used in the first, second or third data query.

6. A method according to claim 1, wherein the query builder interface enables selection of:
one or more source tables for a data query; and
one or more table relationships between selected tables;
the method further comprising creating the first, second or third data query based on the selected tables and relationships.

7. A method according to claim 6, wherein a selected relationship is used to define a table join on selected tables.

8. A method according to claim 1, wherein the first, second and third metadata objects for the first, second and third data queries are available to other users of the data repository.

9. A method according to claim 1, wherein the query builder interface comprises a data entity selection interface for selection of data entities used in the first, second or third data query, the data entity selection interface displaying the metadata for at least one data entity stored in the metadata repository.

10. A method according to claim 1, further comprising at least one of the steps of:
executing the first, second or third data query;
transmitting the results of the first, second or third data query to a user device,
storing the results of the first, second or third data query in the data repository, or
transmitting the results of the first, second or third data query to a remote computer system.

11. A method according to claim 1, wherein each of the first, second and third data queries comprises more than two tables and/or multiple join relationships and/or a nested query.

12. A method according to claim 1, further comprising the steps of:
after receiving the first metadata, adding the first metadata object to an approval queue;
receiving a positive approval indication or a negative approval indication for the first metadata object from a second user via the metadata management user interface; and
in response to a positive approval indication, marking the first metadata object as approved in the metadata repository.

13. A method according to claim 12, comprising, in response to receiving the negative approval indication, adding the first metadata object to a dispute queue, the negative approval indication associated with dispute reason information entered by the second user.

14. A tangible non-transitory computer-readable medium comprising software code adapted, when executed on a data processing apparatus, to perform a method comprising the steps of:
maintaining a data repository, the data repository storing data imported from one or more data sources;
storing and manacling, by a metadata management module, metadata, in a metadata repository, relating to the data in the data repository; and
constructing, using a query builder interface, a first data query, using first metadata from the metadata repository, for querying the data in the data repository;
storing the first data query in the metadata repository;
creating a first metadata object for the query in the metadata repository, and adding the first metadata object to a documentation queue;
constructing, using the query builder interface, a second data query, using second metadata from the metadata repository, for querying the data in the data repository;
storing the second data query in the metadata repository;
creating a second metadata object for the second data query in the metadata repository, and adding the second metadata object to the documentation queue;
searching existing queries based on existing metadata objects stored in the metadata repository, the existing metadata objects including the first and second metadata objects;
selecting one of the existing data queries based on its metadata object;
editing the selected data query to construct, using the query builder interface, a third query using third metadata from the metadata repository, for querying the data in the data repository;
storing the third data query in the metadata repository; and
creating a third metadata object for the third data query in the metadata repository, and adding the third metadata object to the documentation queue, wherein the first, second and third metadata objects are stored in the metadata repository and are available for retrieval and execution or for retrieval and editing to create modified data queries.

15. An apparatus comprising a processor with associated memory storing instructions arranged, when executed by the processor, to configure the processor to:
   maintain a data repository, the data repository storing data imported from one or more data sources;
   store and manage, by a metadata management module, metadata, in a metadata repository, relating to the data in the data repository; and
   construct, using a query builder interface, a first data query, using first metadata from the metadata repository, for querying the data in the data repository;
   store the data query in the metadata repository;
   create a first metadata object for the first data query in the metadata repository, and add the first metadata object to a documentation queue;
   construct, using the query builder interface, a second data query, using second metadata from the metadata repository, for querying the data in the data repository;
   store the second data query in the metadata repository;
   create a second metadata object for the second data query in the metadata repository, and add the second metadata object to the documentation queue;
   search existing queries based on existing metadata objects stored in the metadata repository, the existing metadata objects including the first and second metadata objects;
   select one of the existing data queries based on its metadata object;
   edit the selected data query to construct, using the query builder interface, a third query using third metadata from the metadata repository, for querying the data in the data repository;
   store the third data query in the metadata repository; and
   create a third metadata object for the third data query in the metadata repository, and add the third metadata object to the documentation queue,
   wherein the first, second and third metadata objects are stored in the metadata repository and are available for retrieval and execution or for retrieval and editing to create modified data queries.

* * * * *